US010217120B1

United States Patent
Shin et al.

(10) Patent No.: US 10,217,120 B1
(45) Date of Patent: Feb. 26, 2019

(54) METHOD AND SYSTEM FOR IN-STORE SHOPPER BEHAVIOR ANALYSIS WITH MULTI-MODAL SENSOR FUSION

(71) Applicants: Joonhwa Shin, State College, PA (US); Rajeev Sharma, State College, PA (US)

(72) Inventors: Joonhwa Shin, State College, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 981 days.

(21) Appl. No.: 14/692,446

(22) Filed: Apr. 21, 2015

(51) Int. Cl.
  *G06Q 30/02* (2012.01)
  *G06Q 10/06* (2012.01)
  (Continued)

(52) U.S. Cl.
  CPC ... *G06Q 30/0201* (2013.01); *G06Q 10/06393* (2013.01); *H04N 5/232* (2013.01);
  (Continued)

(58) Field of Classification Search
  CPC ......... G06Q 30/0201; G06Q 10/06393; H04N 5/232; H04M 7/181; H04W 4/02
  See application file for complete search history.

(56) References Cited

U.S. PATENT DOCUMENTS 6,263,088 B1   7/2001   Crabtree
7,606,728 B2   10/2009  Sorenson
(Continued)

OTHER PUBLICATIONS

Deak et al., Computer Communications, Jun. 26, 2012, (1939-1954), vol. 35, Elsevier.
(Continued)

*Primary Examiner* — Sujay Koneru

(57) ABSTRACT

The present invention provides a comprehensive method for automatically and unobtrusively analyzing the in-store behavior of people visiting a physical space using a multi-modal fusion based on multiple types of sensors. The types of sensors employed may include cameras for capturing a plurality of images and mobile signal sensors for capturing a plurality of Wi-Fi signals. The present invention integrates the plurality of input sensor measurements to reliably and persistently track the people's physical attributes and detect the people's interactions with retail elements. The physical and contextual attributes collected from the processed shopper tracks includes the motion dynamics changes triggered by an implicit and explicit interaction to a retail element, comprising the behavior information for the trip of the people. The present invention integrates point-of-sale transaction data with the shopper behavior by finding and associating the transaction data that corresponds to a shopper trajectory and fusing them to generate a complete an intermediate representation of a shopper trip data, called a TripVector. The shopper behavior analyses are carried out based on the extracted TripVector. The analyzed behavior information for the shopper trips yields exemplary behavior analysis comprising map generation as visualization of the behavior, quantitative shopper metric derivation in multiple scales (e.g., store-wide and category-level) including path-to-purchase shopper metrics (e.g., traffic distribution, shopping action distribution, buying action distribution, conversion funnel), category dynamics (e.g., dominant path, category correlation, category sequence). The present invention includes a set of derived methods for different sensor configurations.

44 Claims, 48 Drawing Sheets

(51) Int. Cl.

| | |
|---|---|
| *H04N 5/232* | (2006.01) |
| *H04N 5/247* | (2006.01) |
| *H04N 7/18* | (2006.01) |
| *H04W 4/02* | (2018.01) |
| *H04W 64/00* | (2009.01) |

(52) U.S. Cl.
CPC ............ *H04N 5/247* (2013.01); *H04N 7/181* (2013.01); *H04W 4/02* (2013.01); *H04W 64/006* (2013.01)

(56) References Cited

U.S. PATENT DOCUMENTS

| | | | |
|---|---|---|---|
| 8,009,863 | B1 | 8/2011 | Sharma |
| 8,219,438 | B1* | 7/2012 | Moon ................ G06Q 30/0201 |
| | | | 705/7.29 |
| 8,320,624 | B2 | 11/2012 | Takahata |
| 8,325,982 | B1 | 12/2012 | Moon |
| 8,380,558 | B1 | 2/2013 | Sharma |
| 8,457,354 | B1 | 6/2013 | Kolar |
| 8,548,494 | B2 | 10/2013 | Agarwal |
| 8,570,376 | B1 | 10/2013 | Sharma |
| 8,615,254 | B2 | 12/2013 | Jamtgaard |
| 8,938,255 | B2 | 1/2015 | Tsruya |
| 8,953,567 | B2 | 2/2015 | Annamalai |
| 2006/0010027 | A1* | 1/2006 | Redman ......... G06Q 10/063116 |
| | | | 705/7.16 |
| 2006/0200378 | A1 | 9/2006 | Sorenson |
| 2008/0303901 | A1 | 12/2008 | Variyath |
| 2009/0105950 | A1 | 4/2009 | Arteaga |
| 2009/0268030 | A1 | 10/2009 | Markham |
| 2010/0103173 | A1 | 4/2010 | Lee |
| 2010/0185487 | A1 | 7/2010 | Borger |
| 2011/0200226 | A1* | 8/2011 | Takahata ............ G06K 9/00295 |
| | | | 382/103 |
| 2012/0044355 | A1* | 2/2012 | Jamtgaard ................. G01S 5/00 |
| | | | 348/159 |
| 2012/0252463 | A1* | 10/2012 | Zou ......................... G01S 5/021 |
| | | | 455/441 |
| 2013/0054310 | A1* | 2/2013 | Sickenius ............... G06Q 30/02 |
| | | | 705/7.39 |
| 2013/0132241 | A1* | 5/2013 | Sorensen ............. G06Q 10/087 |
| | | | 705/28 |
| 2013/0201338 | A1 | 8/2013 | Westmacott |
| 2013/0225199 | A1 | 8/2013 | Shaw |
| 2014/0195380 | A1* | 7/2014 | Jamtgaard ............. H04W 4/029 |
| | | | 705/26.61 |
| 2014/0213299 | A1* | 7/2014 | Marti ...................... G06F 3/048 |
| | | | 455/456.3 |
| 2014/0258061 | A1* | 9/2014 | Calman .................. G06Q 40/00 |
| | | | 705/35 |
| 2014/0278655 | A1* | 9/2014 | Sorensen ....... G06Q 10/063118 |
| | | | 705/7.17 |

OTHER PUBLICATIONS

Gu et al., "A survey of Indoor Positioning Systems for Wireless Personal Networks," IEEE Communications Surveys & Tutorials, 2009, vol. 11—No. 1, IEEE.

Pandey et al., "A Survey on Localization Techniques for Wireless Techniques for Wireless Networks," Journal of the Chinese Institute of Engineers, 2006, pp. 1125-1148, vol. 29—No. 7.

Bekkelien et al., "Bluetooth Indoor Positioning," Master's Thesis, Mar. 2012, University of Geneva.

Youssef et al., "Challenges: Device-free Passive Localization for Wireless Environments," in Proceedings of MobiCom'07, Sep. 9-14, 2007, Montreal, Quebec, Canada.

Hereman et al., "Determination of a Position in Three Dimensions Using Trilateration and Approximate Distances," 1995, Department of Mathematical and Computer Sciences, Colorado School of Mines; Golden, CO.

Paramvir et al., "Enhancements to the RADAR User Location and Tracking System," Feb. 2000, Microsoft Research Technical Report, Redmond, WA.

Wang et al., "Feasibility Study of Mobile Phone Wi-Fi Detection in Aerial Search and Rescue Operations," in Proceedings of the 4th Asia-Pacific Workshop on Systems (APSys '13), Jul. 29-30, 2013; New York, NY, USA.

Yang et al., "From RSSI to CSI: Indoor Localization via Channel Response," ACM Computing Surveys; Nov. 2013, vol. 46, No. 2, Article 25; New York, NY, USA.

Moustafa et al., "The Horus Location Determination System," In Proceedings of the 3rd international conference on Mobile systems, applications, and services (MobiSys '05); ACM; 2005, pp. 205-218; New York, NY, USA.

Brouwers, "Incremental Wi-Fi Scanning for Energy-Efficient Localization," in Proceedings of the IEEE PerCom'14, Mar. 24-28, 2014, pp. 156-162, IEEE.

Cook et al., "Indoor Location Using Trilateration Characteristics," in Proceedings of the London Communications Symposium, 2005, pp. 147-150, University College London Department of Electronic & Electrical Engineering; London, UK.

Fuchs et al., "Indoor Tracking for Mission Critical Scenarios: A Survey," Pervasive and Mobile Computing, Jul. 14, 2010; pp. 1-15, vol. 7; Elsevier; Amsterdam, The Netherlands.

Turner et al., "On the Empirical Performance of Self-calibrating W-iFi Location Systems," in Proceedings of the 2011 IEEE 36th Conference on Local Computer Networks (LCN '11), 2011, pp. 76-84, IEEE Computer Society; Washington, DC, USA.

Liu et al., "Push the Limit of WiFi based Localization for Smartphones," in Proceedings of the 18th Annual International Conference on Mobile Computing and Networking (Mobicom '12), 2012, ACM; New York, NY, USA.

Martin et al, "Precise Indoor Localization Using Smart Phones," in Proceedings of the International Conference on Multimedia (MM '10), 2010, pp. 787-790, ACM; New York, NY, USA.

Correa et al., "Room-Level Wi-Fi Location Tracking," CyLab Mobility Research Center Technical Report, Nov. 2008, CyLab Mobility Research Center; Mountain View, CA, USA.

\* cited by examiner

AN OVERVIEW ILLUSTRATION OF PERSON TRACKING BASED ON MOBILE SIGNAL AND VISUAL MEASUREMENTS

Traffic Distribution Quantitative Measurements 2014

| Store-wide Traffic Distribution by Category 2202 ||
|---|---|
| Category | Traffic Count |
| Category A | 45 |
| Category B | 23 |
| Category C | 78 |
| ... | ... |
| Category n | 68 |
| Store-wide | 207 |

| Category A Traffic Distribution by Sub-category 2204 ||
|---|---|
| Sub-category | Traffic Count |
| Sub-category A | 18 |
| Sub-category B | 23 |
| Sub-category C | 43 |
| ... | ... |
| Sub-category n | 11 |
| Category A | 79 |

FIG. 22

Shopping Distribution Quantitative Measurements 2324

| Store-wide Shopping Distribution by Category 2502 ||
|---|---|
| Category | Shopping Action Count |
| Category A | 46 |
| Category B | 22 |
| Category C | 79 |
| ... | ... |
| Category n | 66 |
| Store-wide | 204 |

| Category A Shopping Distribution by Sub-category 2504 ||
|---|---|
| Sub-category | Shopping Action Count |
| Sub-category A | 22 |
| Sub-category B | 46 |
| Sub-category C | 35 |
| ... | ... |
| Sub-category n | 13 |
| Category A | 83 |

FIG. 25

Buying Distribution Quantitative
Measurements 2624

| Store-wide Buying Distribution by Category 2802 | |
|---|---|
| Category | Buying Action Count |
| Category A | 32 |
| Category B | 26 |
| Category C | 74 |
| ... | ... |
| Category n | 63 |
| Store-wide | 198 |

| Category A Buying Distribution by Sub-category 2804 | |
|---|---|
| Sub-category | Buying Action Count |
| Sub-category A | 18 |
| Sub-category B | 13 |
| Sub-category C | 37 |
| ... | ... |
| Sub-category n | 33 |
| Category A | 76 |

FIG. 28

Dominant Path Quantitative Measurements 3120

| Dominant Path from Category X 3302 ||
|---|---|
| Category Name | Raw Numbers of Traffic |
| To Category A | 52 |
| To Category B | 76 |
| To Category C | 43 |

Total Traffic: 171

| Dominant Path from Category X 3304 ||
|---|---|
| Category Name | Percentage of Traffic |
| To Category A | 30.4% |
| To Category B | 44.4% |
| To Category C | 25.1% |

| Dominant Path from Category X 3306 ||
|---|---|
| Category Name | Transition Probability |
| To Category A | 0.35 |
| To Category B | 0.40 |
| To Category C | 0.25 |

FIG. 33

Category Sequence Quantitative Measurements

3502

|       | CAT. 1 | CAT. 2 | CAT. 3 |
|-------|--------|--------|--------|
| CAT. 1 |       | 12     | 25     |
| CAT. 2 | 6     |        | 17     |
| CAT. 3 | 31    | 26     |        |

3504

|       | CAT. 1 | CAT. 2 | CAT. 3 |
|-------|--------|--------|--------|
| CAT. 1 |       | 10.26% | 21.37% |
| CAT. 2 | 5.13% |        | 14.53% |
| CAT. 3 | 26.50% | 22.22% |       |

3702

|          | RANKING |||||
|----------|---|---|---|---|
|          | 1 | 2 | 3 | ... |
| CAT. SEQ. | (CAT. 3 to CAT. 1) | (CAT. 3 to CAT. 2) | (CAT. 1 to CAT. 3) | ... |
| %        | 26.5% | 22.22% | 21.37% | ... |

| Position in Sequence | Category 1 | Category 2 | Category 3 |
|---|---|---|---|
| Position 1 | 13 | 25 | 22 |
| Position 2 | 32 | 17 | 25 |
| Position 3 | 28 | 21 | 29 |
| Total | 73 | 63 | 76 |

3804

| Position in Sequence | Category 1 |
|---|---|
| Position 1 | 17.81% |
| Position 2 | 43.84% |
| Position 3 | 38.36% |

FIG. 38

METHOD AND SYSTEM FOR IN-STORE SHOPPER BEHAVIOR ANALYSIS WITH MULTI-MODAL SENSOR FUSION

BACKGROUND OF THE INVENTION

Field of the Invention

The present invention is a method and system for automatically and unobtrusively analyzing the in-store behavior of people visiting a physical space using a multi-modal fusion based on multiple types of sensors such as cameras and Wi-Fi sensors. The present invention further integrates point-of-sale transaction data to the shopper behavior by finding and associating the transaction data that corresponds to a shopper trajectory. The present invention then analyzes the behavior information of the shopper trips to yield exemplary behavior analysis including store-wide and category-level shopper metrics.

Background of the Invention

Understanding shopper behavior is an area of particular interest to consumer packaged goods companies (CPGs) and retailers since shopper behavior is critical to optimizing marketing strategies including store layout planning and package design. Many methods have developed to better understand in-store shopper behavior and its effect on purchasing decisions.

Traditional methods of shopper behavior analysis rely on shopper panels or small-scale lab testing. These traditional methods have the disadvantage of low sample size and require extensive manual operations. Furthermore, in the case of shopper panels or lab testing, shoppers are aware that their behavior is being analyzed, which introduces bias into the shopping behavior data.

Semi-automated and automated shopper behavior tracking and analysis have addressed some of the challenges of traditional methods. Several automated and semi-automated methods utilize vision-based tracking and, in the cases of semi-automated methods, vision-based tracking and manual annotation to track shoppers, extract shopper behavior characteristics and analyze shopper behavior within the retail environment. Vision-based tracking methods use visual features to track shoppers across multiple cameras or fields of view and then join the shopper paths belonging to the same person to generate a complete trajectory throughout the store. From the complete trajectory, the shopper path can be derived and analyzed for specific trip information. Shopper path characteristics, or trip information, include physical coordinates of the shopper trajectory along with time-stamps of those coordinates and time lengths of said physical coordinates. The shopper paths and their associated spatial-temporal characteristics are aggregated for deeper analysis into shopping behavior trends. From these spatial-temporal characteristics, the number of people who comprise traffic, shoppers, and buyers can be determined, and those measurements form the basis of shopper behavior metrics for a retail store. In addition, category-specific shopper behavior can be measured such as the number of shoppers that visited two particular categories and in what order were those categories visited, and the number of shoppers that took a dominant path from a category. From these measurements, category correlation, category sequence and dominant path metrics are derived.

However, the vision-tracking method has inherent limitations. In practice, tracking a single shopper across multiple fields of view and joining that person's shopper paths do not yield a complete, unbroken trajectory. Because computer vision algorithms are vulnerable to cluttered backgrounds or visually similar but irrelevant nearby objects, vision-based tracking often results in discontinuous tracking of a shopper and fragmented trajectories without a consistent identification. Because of trajectory fragmentation, store-wide analysis becomes more difficult and less accurate. In addition, because there is no consistent identification between the shopper trajectory fragments, this vision-based tracking method has no means of filtering shopper paths depending on the type of analysis desired. For example, it would not be possible to carry out a full-store shopper behavior analysis of only shoppers who visited a particular category. The phenomenon of trajectory fragmentation and the lack of identification to associate fragmented trajectories prevent filtering out people who did not visit the category.

The present invention incorporates Wi-Fi based tracking with vision-based tracking to address the challenges of vision-based tracking for in-store shopper behavior analysis. Although Wi-Fi based tracking has less accuracy and lower resolution than vision-based tracking, it has the advantage of providing a consistent identification across tracking in the form of a unique MAC address. When vision-based tracking and Wi-Fi based tracking are combined and yield a fused trajectory as explained in following sections, the present invention allows for consistent tracking on the store-level and enables filtering of shoppers and/or shopper groups for more specific analysis.

PRIOR ART

Sharma et al. of U.S. Pat. No. 8,009,863 (hereinafter referred to as Sharma) discloses a method and system for automatic measurement and analysis of shopper behavior based on the trip information of persons. Sharma captures and processes images of persons across multiple means of video, measures the trip information of the tracked persons based on their trajectory throughout the retail space, and completes an analysis of shopper behavior based on the trip information. Trip information includes both spatial and temporal attributes, and the measurements are aggregated over time for further analysis within a retail store. Analysis of shopper behavior comprises map generation, quantitative category measurement, dominant path measurement, category correlation measurement, and category sequence measurement.

Sharma does not disclose a method of using localization methods through wireless tracking in combination with video sensing capabilities. Because the method does not include wireless sensing capabilities, the method is susceptible to the errors commonly found in vision sensing technologies whereby continuous tracking of persons is disrupted by clutter backgrounds or visually-similar, irrelevant objects near the persons of interest. The disrupted tracking and the resulting broken trajectories can significantly deteriorate the quality of analysis of shopper behavior throughout the entire retail space such as store-wide layout optimization and path planning for targeted customers. Sharma also does not disclose a means of associating transaction log data with shopper trip information which further limits analysis of shopper behavior metrics.

Jamtgaard et al. of U.S. Pat. No. 8,615,254 (hereinafter referred to as Jamtgaard) describes a retail method which utilizes visual sensing and mobile sensing technologies to localize shoppers in a retail space. The method determines the identity and location of an object or persons within a retail space using a fusion of visual and wireless tracking. The applications of the method includes targeting content to mobile users within the store's Wi-Fi network and assisting mobile users with product and in-store information. Other applications include optimizing work flow for employees within the space, dwell time of shoppers within the store, and impact of in-store advertising.

Jamtgaard does not disclose the integration of point-of-sale (POS) data or transaction log data with shopper trip information. Therefore, the method cannot analyze the impact of in-store factors such as layouts, planograms, etc. on the purchasing behavior of shoppers within a retail space. Furthermore, Jamtgaard does not teach aggregating shopper trip information to arrive at analysis applications of shopper behavior such as map generation, quantitative category measurement, dominant path measurement, category correlation measurement, and category sequence measurement. These shopper behavior metrics deliver specific insight into optimization of layout and advertising for both retailers and consumer packaged goods companies.

Shaw of U.S. patent application Ser. No. 13/780,964 (hereinafter referred to as Shaw) is a method that analyzes the interaction between employees and customers using visual tracking of the customers and the wireless tracking of employees who carry RFID tags on their person. While Shaw utilizes the detailed tracking capabilities of visual sensing technologies and the localization capabilities of mobile sensing technologies within a retail space, the system described does not teach how to dually track persons within a retail space using both video and wireless tracking particular when persons are carrying mobile devices. Because the primary application of Shaw is to analyze interactions between store employees and customers, Shaw also does not disclose using POS data and shopper trip information throughout the store to analyze shopper behavior and its impact on purchasing decisions.

Existing shopping tracking methods associate shopper paths and behavior with transaction data. Borger et al. of U.S. patent application Ser. No. 12/356,823 (hereinafter referred to as Borger) teaches a system and method of automatic collection and correlation of retail metrics. Borger visually tracks shoppers within a retail space, collects the spatial and temporal information of the shopper path, and correlates POS data with the shopper path to further analyze shopper behavior. The correlation data comprises temporal, spatial and purchasing metrics within a retail space. Metrics include dwell time, sequence of categories, planogram optimization and conversion metrics.

However, Borger does not include a means for wireless tracking of shoppers in conjunction with visual tracking. As a result, Borger is vulnerable to the errors common to vision sensing technologies. Continuous tracking of persons is disrupted by cluttered backgrounds or visually-similar, irrelevant objects near the persons of interest. The resulting broken trajectories can significantly deteriorate the quality of analysis of shopper behavior throughout the entire retail space such as store-wide layout optimization and path planning for targeted customers. Borger also does not disclose the means by which the method associates the POS data with the shopper information. However it can be assumed that the method relies on video tracking which is prone to errors from discontinued tracking. Furthermore, as the checkout space is more cluttered and filled with more visually-similar, irrelevant objects than other areas of the retail space, so it can be assumed that the errors will be more common at the point of checkout. In addition, Borger does not disclose aggregating shopper path information for more accurate analysis of shopper behavior.

U.S. Pat. No. 7,606,728 of Sorenson (hereinafter referred to as Sorenson) discloses a method of tracking shoppers and analyzing shopper behavior using video. Sorenson uses tracking data as the foundation of its shopper analysis system which processes shopper path data, non-shopper path data, purchase data, product position data, and environment data. The system correlates purchase data with shopper path data in order to derive behavior metrics and analysis. Sorenson relies exclusively on video tracking and therefore is vulnerable to the tracking errors as described previously. Furthermore, Sorenson describes a step of receiving the user input via input devices, such as a pointing device or keyboard, which is inefficient for handling a large amount of video data in a large shopping environment with a relatively complicated store layout, especially over a long period of time. The manual input by a human operator/user cannot efficiently track all of the shoppers in such cases, not to mention the possibility of human errors due to tiredness and boredom. Also, the manual input approach is not scalable according to the number of shopping environments to handle.

Sorenson of U.S. patent application Ser. No. 13/684,347 (hereinafter Sorenson) discloses a method which associates transaction data of a person with the person's shopper path using a wireless sensing system. Sorenson comprises a two-part system including a wireless sensor system to track shopper paths and a data analyzer computing device to associate the signal data with the transaction data. The sensor system collects signal data for a shopper including spatial, temporal and shopper ID data. The sensor system then transmits the signal data to the data analyzer computing device, which receives the signal data in addition to the transaction data from a point-of-sale (POS) system. The data analyzer computing device then compares the signal data to available transaction data and matches the two datasets according to the time and place of the transaction and of the intersecting shopper trip. The transaction data, or purchased items, can also be mapped onto a probability map to represent areas where purchased items were likely picked up in the store and along the shopper path.

Sorenson discloses a method which only enables the integration of mobile signal data with transaction data. The disclosed method does not provide a means for integrating the detailed characteristics of video images for shopper paths with the transaction data. Furthermore, Sorenson matches shopper paths with transaction data using the intersection of time and location of the transaction and a corresponding shopper trip. However, due to the nature of shopper checkouts and mobile signal transmission, this method is prone to error. Mobile signal localization is accurate within 30 feet of the targeted object which makes the method disclosed prone to spatial error.

Sharma et al. of U.S. Pat. No. 8,380,558 (hereinafter Sharma) discloses an invention that comprise RFID sensing and video-sensing systems and can associate shopper behavior with transaction data. Sharma integrates video-sensing of shoppers with RFID sensing of RFID tags placed either in shopping carts or with shoppers. Video-sensing provides detailed images of shopper behavior, and RFID sensing enables a consistent identification associated with shopper paths. Sharma enables the association of transaction data with the consistent RFID identification associated with the shopper path. In addition, the disclosed method enables tracking shoppers' paths in configurations where RFID sensing is possible throughout the retail space and where video-sensing is possible only in certain areas of interest.

Sharma relies on tracking RFID tags throughout a retail space in order to consistently identify a shopper. RFID tags enable frequent transmission of wireless signals for consistent tracking, but they are more cumbersome for shoppers to carry than other mobile devices that may be carried. Furthermore, if RFID tags are embedded in the shopping cart, the shopper may leave the shopping cart in an aisle and the localization of the cart may differ significantly from the respective shopper path. Furthermore, this method presents a means of tracking wireless RFID signals throughout the store and tracking using video in areas of interest, but Sharma does not disclose a method for associating transaction data with shopper paths in situations where wireless sensing is possible only in certain areas of interest.

Takahata et al. of U.S. Pat. No. 8,320,624 (hereinafter Takahata) discloses a method for associating trajectory data of a shopper path with transaction data of the same shopper. The automated method matches trajectory image data with selling image data in order to perform the association. Takahata discloses a computer that extracts person images from selling images and compares the person in the selling image to all person images stored in a customer image database. The method associates a unique identification with the transaction data from the selling image and associates that identification with all images of the customer in the database.

Takahata relies on a method of associating image data with transaction data and does not allow for transaction data to be integrated with multiple-sensing systems. As a result, Takahata is not only limited to vision-sensing systems but also cannot provide the consistent identification found thoroughly wireless-sensing systems. Furthermore, Takahata is open to errors in vision-tracking whereby images of same persons may not be associated with one another reliably because of vulnerability to cluttered backgrounds or visually similar, irrelevant objects in image data.

BRIEF SUMMARY OF THE INVENTION

The present invention utilizes one or more of sensing modalities to reliably and persistently track in-store behavior of people (e.g., shoppers) in retail stores. Sensing modalities track visual measurements using cameras and Wi-Fi signal measurements from the mobile devices people carry on during their visit by using Wi-Fi sensors. The two types of measurements are integrated together to track the people throughout the store with accuracy of vision sensing and consistency of Wi-Fi signals. Due to the nature of Wi-Fi signals that embed unique device identifiers (i.e., the MAC address of the radio device for Wi-Fi based communication in the mobile devices), the unique ID can be associated with a shopper whose trajectory is estimated by integrating multiple sensing modalities. From the dual tracking, a complete and unique trajectory for a shopper is measured and generated which combines that accuracy of vision tracking and the unique identification which results from Wi-Fi tracking.

Because the complete shopper trajectories have the unique identification (ID), the corresponding transaction log data of the shopper when the shopper checked out at a cash register can be registered with the shopper trajectory by looking up the items in the transaction data and finding the best corresponding shopper trajectory. Physical attributes, contextual attributes, and shopper identifications are collected from the generated trajectory and the associated trajectory data. These characteristics form the TripVector, or the total trip information, for a shopper path.

Based on the TripVector, the present invention performs a course of shopper behavior analysis that derives a set of shopper metrics including traffic distribution, shopping action distribution, buyer distribution, and conversion rate. These shopper metrics can be derived for the entire store or only for specific pre-defined categories. In addition, these shopper metrics may be represented on a generate store map or through a series of quantitative measurements. The present invention also performs a course of shopper behavior analysis that yields category-specific metrics such as dominant path, category correlation, and category sequence measurements. These metrics are represented through a series of quantitative measurements that reveal shopping behavior trends among categories.

The dual sensing system using vision and Wi-Fi tracking enables tracking accuracy and persistency which improves the reliability of store-wide shopper behavior analysis. CPGs and retailers often have their own areas of interest in retail stores, which need to be closely monitored and analyzed with greater detail. However, the category-level metrics in which they are interested may still require analysis based on the whole TripVector of the shopper. In such situations, the whole TripVector may not necessarily have to be captured with the fine granularity which arises from vision tracking. For a custom project where the areas of interest may be defined differently according to the needs of a CPG or retailer customer, we can optimize the tradeoff between tracking accuracy and cost efficiency can be optimized. The tracking accuracy in the areas of interest to be closely monitored can be achieved by deploying cameras for the areas, while maintaining cost efficiency by carrying out the store-wide behavior analysis based on mobile signal sensors which are relatively less expensive than cameras. In the present invention, the configuration of vision and Wi-Fi sensors are adapted to accommodate such needs for analysis and cost-efficiency. The configuration of the vision and Wi-Fi sensors within a retail space yields different forms of shopper trajectories and resulting TripVector information comprising physical and contextual attributes and a unique shopper ID. Based on the available TripVectors of shopper paths, shopping behavior analysis generates modified shopper metrics.

BRIEF DESCRIPTION OF THE DRAWINGS

FIG. 22 shows an example of traffic distribution in the form of quantitative measurements.

FIG. 25 shows an example of shopper action distribution in the form of quantitative measurements.

FIG. 28 shows an example of buying action distribution in the form of quantitative measurements.

FIG. 33 shows an example of dominant path calculation represented in the form of quantitative measurements.

FIG. 37 shows an example of category sequence calculation represented in the form of quantitative measurements.

FIG. 38 shows another example of category sequence calculation represented in the form of quantitative measurements.

DETAILED DESCRIPTION OF THE INVENTION

Person Localization and Tracking

Figure 2:
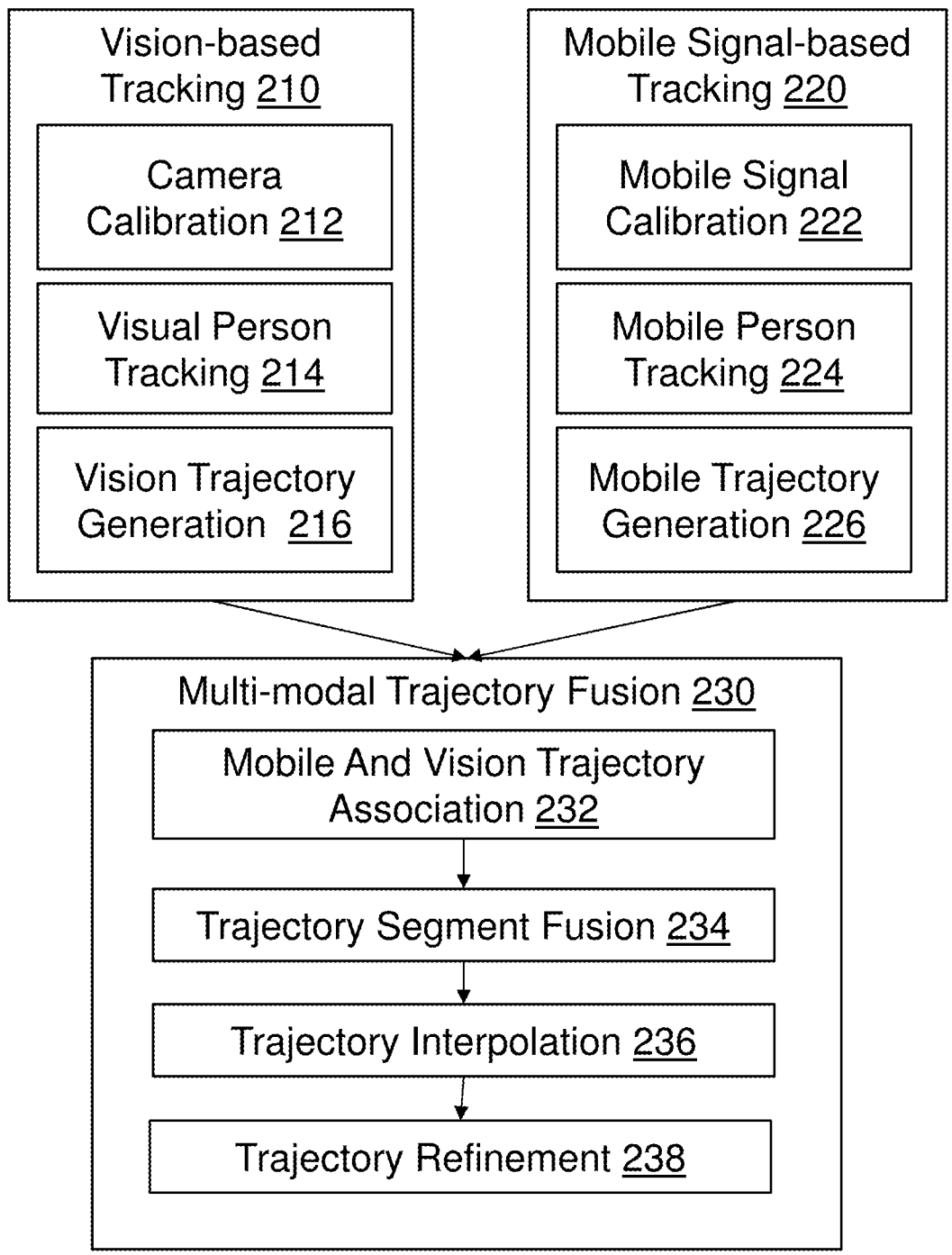
FIG. 2 shows a preferred embodiment of the multi-modal tracking method.

FIG. 2 shows an exemplary overview of the tracking system 200 in the present invention. Tracking occurs in the two modalities, vision-based tracking 210 and mobile signal-based tracking 220. The tracking results from both modalities are integrated and fused into a single trajectory for a shopper in the multi-modal trajectory fusion 230 module. Although the algorithms and methods are described with respect with to Wi-Fi signal-based tracking, it should be understood that the mobile signal-based tracking 220 can apply and extend to other mobile signals.

Figure 1:
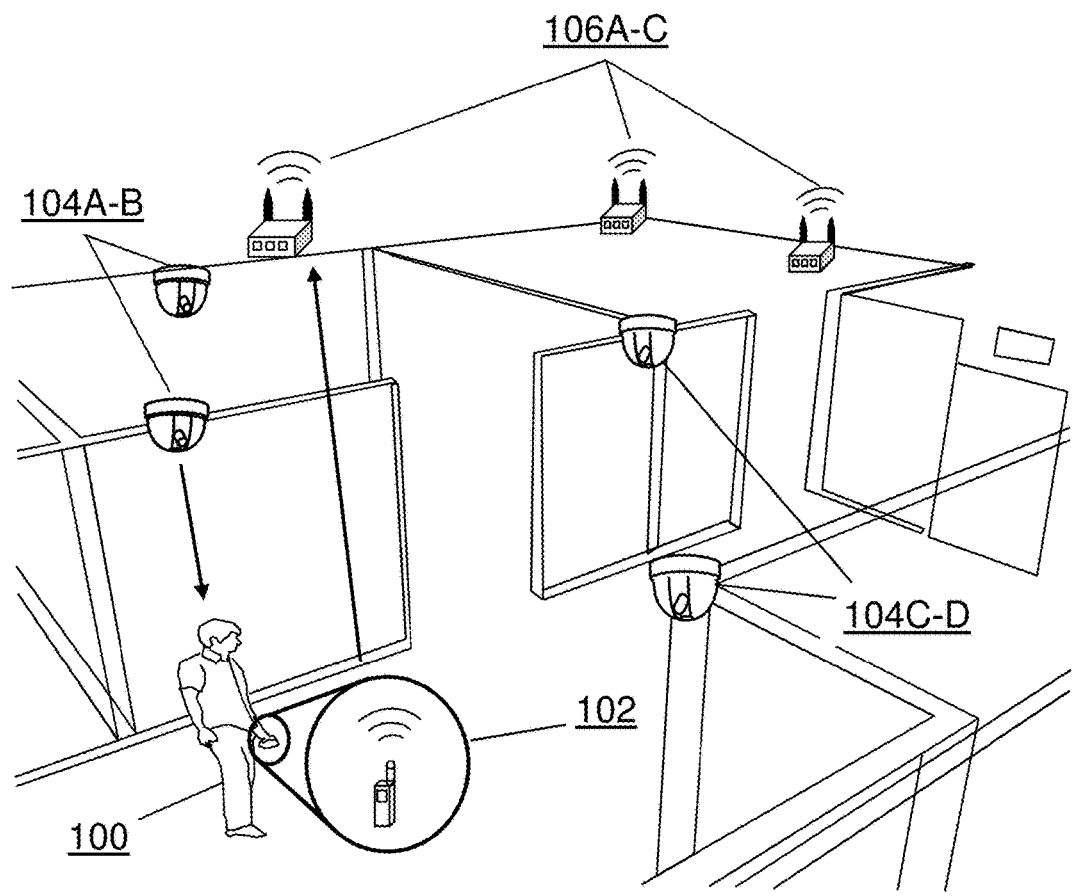
FIG. 1 shows an exemplary embodiment for tracking persons using multi-modal tracking.

FIG. 1 shows a preferred embodiment for deployment of sensors vision-based tracking 210 and mobile signal-based tracking 220. In this exemplary embodiment, a person 100 carrying a mobile device 102 is tracked using vision 104 A-D and Wi-Fi 106 A-D sensors.

Vision Tracking

For vision-based tracking 210, a set of cameras are deployed in an area of interest where the sensing ranges of the cameras 104 A-D as a whole can cover the area with a level of redundancy as shown in FIG. 1.

The cameras are deployed in such a way that the sensing range of a camera is at least partially overlapped with that of other cameras so that any given point in the area of interest is covered by at least a certain number of cameras at the same time. Such redundancy in camera coverage allows the cameras to better understand the environment and targets of interest through a collective reasoning, resulting in a more robust and accurate target tracking.

Vision-Based Tracking Algorithms

Figure 3:
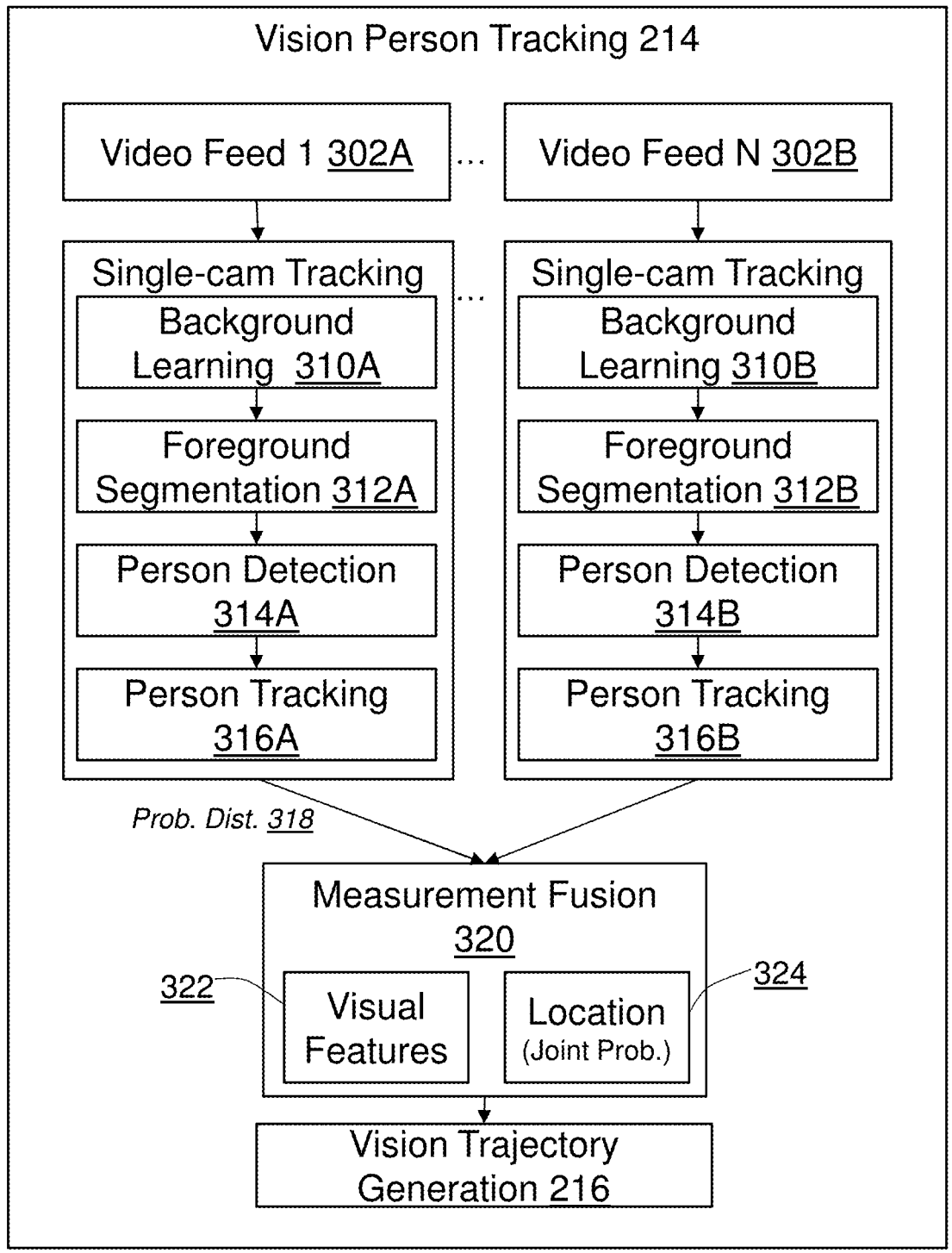
FIG. 3 shows an exemplary embodiment of a method for person tracking using vision sensors.

FIG. 2 shows an exemplary embodiment for the vision-based tracking 210 method. The deployed cameras 104 A-D are first calibrated in terms of the position and orientation with respect to the world coordinate frame as well as internal calibration parameters (e.g., distortion, focal length, etc.) in the camera calibration module 212. The vision-person tracking 214 with multiple cameras is then carried out. Then in the vision trajectory generation 216, a data fusion process is carried out for the measurements on the same target captured at the same time by different cameras, and then a vision trajectory is generated. FIG. 3 shows a detailed preferred embodiment for multi-camera tracking of a person. In an embodiment of the present invention, a computing machine uses each individual camera to perform foreground segmentation 312 A-B while learning the background over time 310 A-B. In the person detection module 314 A-B, using a person detection algorithm, each camera detects persons using a visual feature, for example, color histogram, a histogram of oriented gradient (HOG), SIFT, etc. to detect pedestrians or human faces. Then, in the person tracking module 316 A-B, the detected persons are tracked by using, for example, a stochastic tracker such as Kalman and Particle filter in the visual person tracking module 316A. In the case where multiple cameras are seeing the same person, the measurements from multiple stochastic trackers are combined in terms of the probability distribution of the persons' location resulting in a joint probability distribution 318. Then, in the measurement fusion module 320, visual features 322 of the person and the corresponding spatial probability distribution are fed into a tracker in order to estimate the optimal location 324. Based on the locations 324, the present invention generates the person trajectory in the vision trajectory generation module 216.

Limitations

Vision-based person tracking based on cameras uses visual features to identify each target. Although visual features are usually rich and unique for different targets, visual features of a single target may vary significantly depending on view angle changes and environmental factors such as light conditions. Computer vision algorithms are often susceptible to cluttered backgrounds or visually-similar, irrelevant objects near persons of interest. Such vulnerability in vision-based person tracking systems often causes frequent discontinuity in tracking a single person, resulting in fragmented trajectories with no consistent identification across the entire tracking. For wide-area person behavior analysis, such broken trajectories significantly deteriorate the accuracy of analysis which requires full-store trajectories such as store-wide layout optimization and path planning for targeted customers.

Wi-Fi Tracking

FIG. 1 shows an exemplary embodiment for Wi-Fi sensor deployment. For Wi-Fi based tracking 220, we also assume that a set of Wi-Fi signal sensors 106 A-D, which will also be referred to as access points or simply APs, are deployed in an area of interest where the sensing range of the set of APs 106 A-D can cover the area with a certain sensing density p, where the sensing density p is defined as the level of overlap of the sensing range of the APs 106 A-D of the area. If an area is covered by APs 106 A-D with a density p, then it will mean that any point in the area is covered by at least p number of APs at any time. The value of p is determined differently depending on the employed algorithms and environments. For example, for trilateration based Wi-Fi device localization schemes, p should be at least three while for triangulation based ones, p should be at least two. In a preferred embodiment where trilateration is used as a localization method, the APs 106 A-D are usually deployed with the value of p being four, which is empirically determined to be a balanced tradeoff between cost and robustness.

Figure 4:
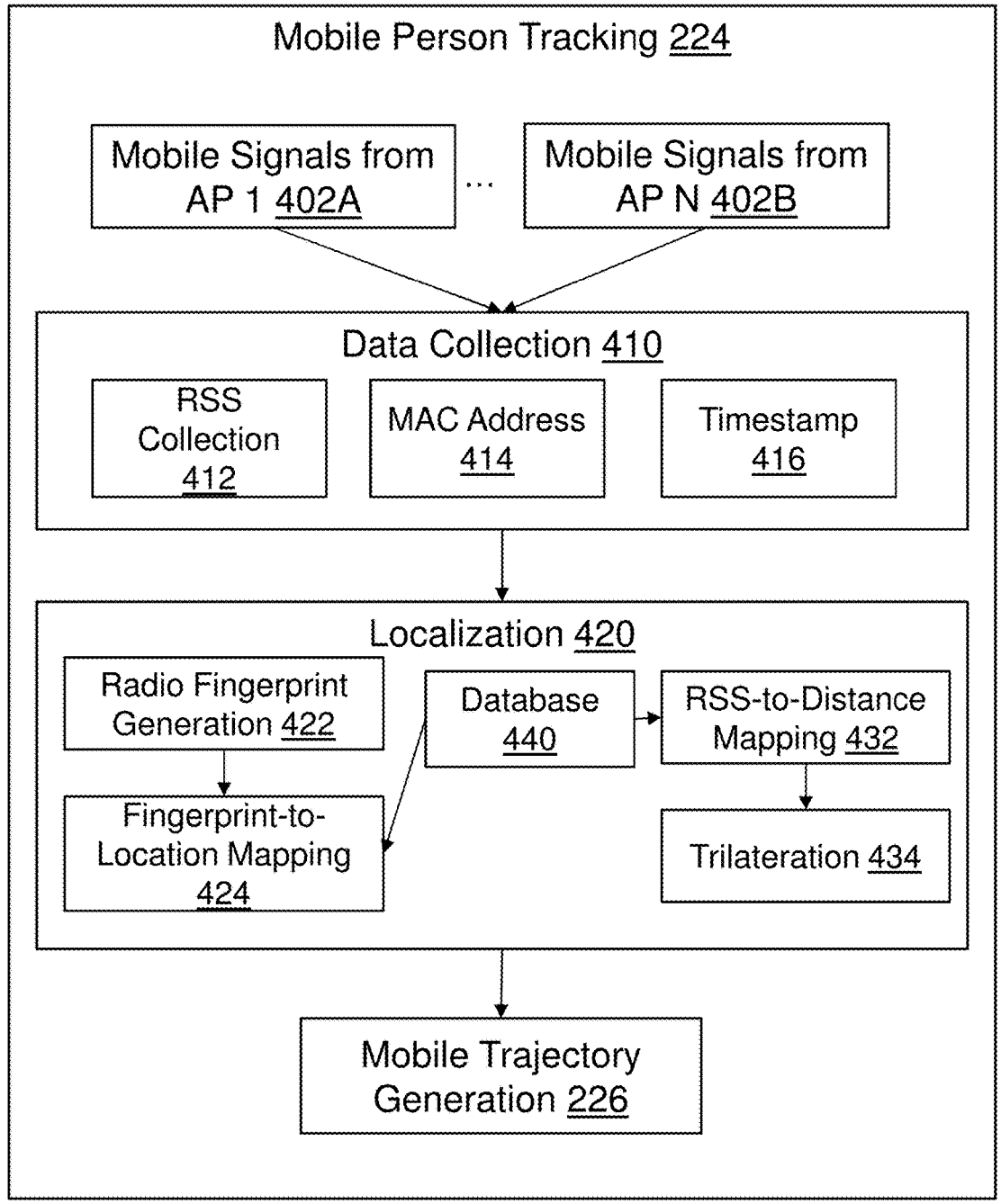
FIG. 4 shows an exemplary embodiment of a method for person tracking using mobile signal sensors.

In the mobile signal calibration module 222, the deployed APs 106 A-D are calibrated in terms of Received Signal Strength-to-distance, RSS-to-distance, or radio fingerprint-to-location mapping. Both RSS-to-distance and radio fingerprint-to-location mapping are methods well-known in the prior art. FIG. 4 shows an exemplary method of mobile person tracking 224. In one embodiment, localization can be calculated using an RSS-to-distance mapping 432. Due to the wireless signal propagation characteristics, the power of the signal decreases as the source of the signal gets farther. The relationship between the RSS and the distance from the source is estimated by constructing a mapping function based on a set of ground truth measurements. Using the RSS-to-distance mapping 432 function, a trilateration-based localization 434 can be performed if there are at least three RSS measurements available for a person at a given time instant. The RSS-to-distance mapping 432 may be learned without any prior data if a self-calibration method is employed, which takes advantage of already-known locations of APs and their signals. In another embodiment, a radio fingerprint for an area of interest can be generated using a set of measurements from multiple APs for a Wi-Fi source at known positions. The radio fingerprint-to-location mapping 424 can be used to localize a source of Wi-Fi signals.

Wi-Fi Based Tracking Algorithms

A computing machine and APs 106 A-D track the mobile signals 402 A-B of persons of interest in the mobile person tracking module 224 (FIG. 4). Given N number of APs 106 A-D deployed in an area of interest with a certain density p, each AP is constantly searching for wireless signals 402 A-B of interest in a certain channel or multiple channels simultaneously if equipped with multiple radios. The AP with a single radio may hop over different channels to detect such wireless signals 402 A-B that could be transmitted from mobile devices present in the area. APs 106 A-D search for wireless signals 402 A-B because mobile devices are likely to look for an AP for potential connection that may be initiated in the near future if the user of the mobile device attempts to use a wireless connection.

To get and maintain a list of nearby APs 106 A-D, most mobile devices 102 usually perform a type of AP discovery process if the wireless transmitter is turned on. The mobile devices tend to transmit a short packet periodically (i.e., Probe Request in the 802.11 standard) with a certain time interval between transmissions to discover accessible APs nearby. The time interval depends on (1) the type of the operating system (OS) of the mobile device (e.g., iOS, Android, etc.), (2) the applications that are currently running actively or in background, and (3) the current state of the mobile device, for example, whether the display of the mobile device is on or off. In general, if the display of a mobile device is on, then the OS puts the device in an active state, resulting in the interval getting shorter and transmission rate being increasing. If the display is off, then the OS would gradually putting the device into a sleep state through multiple stages.

Once a packet is transmitted from a mobile device 102 via wireless communications or mobile signals 402A-B, then a subset of APs 106 A-D detect the packet around the mobile device if the APs happen to be listening at the same or an adjacent channel. The APs 106 A-D at an adjacent channel may be able to detect the packet since a Wi-Fi channel spectrum spans wider than the frequency width allocated for a channel. When a packet is detected at an AP 106 A-D, a data collection 410 process occurs where the PHY layer and MAC layer information of the packet can be retrieved which includes the Received Signal Strength (RSS) 412, MAC address 414, and a timestamp 416 of the packet transmission of the sender. The value of the RSS may be available in terms of the RSS Indicator (RSSI), and this value may vary significantly even during a short time period due to various signal distortions and interferences. To reduce such noise and variation the RSS values undergo a noise reduction process during a set of consecutive receptions. In case of multiple mobile devices present, the unique MAC address 414 or ID of mobile devices 102 is used to filter and aggregate the measurements separately for each individual mobile device.

In the localization 420 method where RSS-to-distance mapping is used, the values of the RSS readings are converted to a real-world distance from each AP 106 A-D by utilizing the pre-learned RSS-to-distance mapping function for each AP 106 A-D, which was stored in a database 440. If there are distance measurements from at least three different APs 106 A-D available, then a single location can be estimated by employing a trilateration-based approach 434. The estimated current location is then fed into a tracker (e.g., Kalman filter and Particle filter) with the unique ID, the MAC address 414, so that the optimal current location and thus trajectory can be estimated in a stochastic framework in the mobile trajectory generation module 226.

Limitations

Because of unmanaged interference and multi-path fading caused by surrounding environmental structures, the practical achievable accuracy of indoor localization based on mobile wireless signals is limited (>10 feet on average) compared to video-based localization (usually <5 feet). In addition the time interval between two consecutive periodic packets from mobile devices is usually too large to perform detailed tracking; on average, the time interval is longer than 5-10 seconds. As a result, mobile signal-based tracking has the disadvantage of lower resolution and tracking accuracy than vision-based tracking but the advantage of more persistent tracking.

Multi-Modal Trajectory Fusion

Figure 5A:
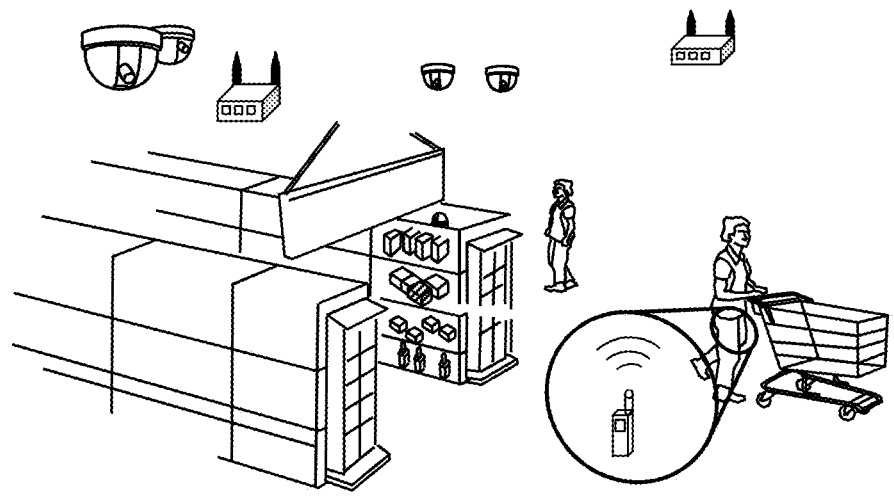
FIG. 5A shows an exemplary embodiment a person tracked through multiple modalities.
Figure 5B:
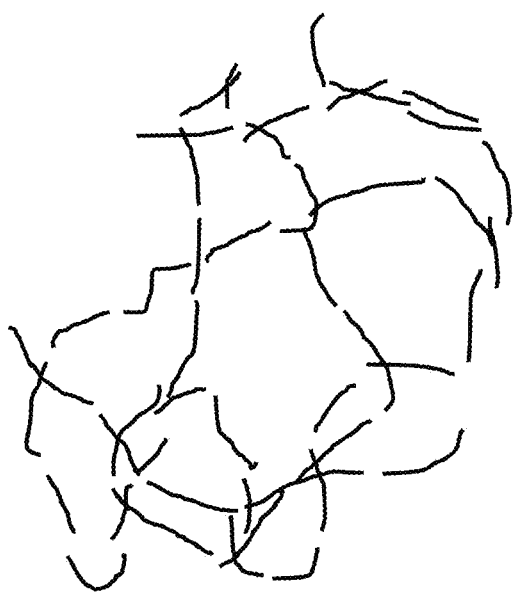
FIG. 5B shows an example of vision trajectories collected for a tracked person.
Figure 5C:
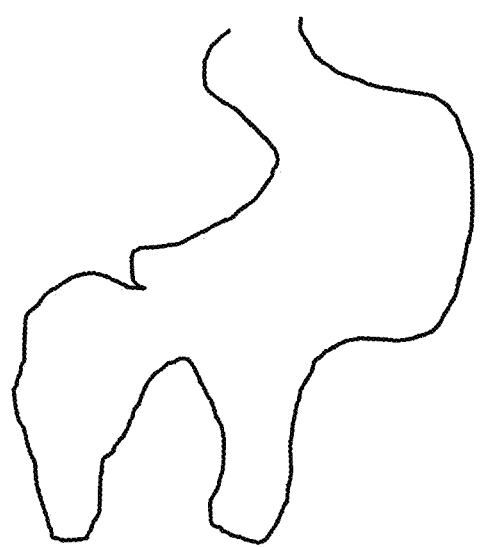
FIG. 5C shows an example of a mobile trajectory generated for a tracked person with a mobile device.

FIG. 5 shows an example of the tracking results from vision-based tracking 210 and mobile signal based tracking 220. FIG. 5A shows an example of person being tracked with her mobile device by vision and Wi-Fi sensors as described in FIG. 1. FIG. 5B reveal an example of tracking said person through vision sensors. The vision person-tracking 214 yields many trajectory fragments. Due to the dynamic nature of visual features of the same person in different environmental conditions, it is highly likely that the trajectories of the single person that are generated using vision-based tracking 210 (which will be referred to as the vision-based trajectories or simply VTs) are usually fragmented into multiple segments of partial trajectories with no consistent ID. In case of multiple persons in the same area, it is usually challenging to determine which VTs correspond to which persons. In spite that it is difficult to associate the same ID for a longer period of time across different cameras especially when there are cluttered backgrounds or visually-similar irrelevant objects nearby, the vision-based tracking provides high-resolution and accurate tracking. FIG. 5C shows an example of tracking said person using Wi-Fi sensors. The resulting trajectory is consistent and unbroken. However, Wi-Fi based trajectories (which will be referred to as the Wi-Fi based trajectories or simply WTs) resulting from the mobile trajectory generation 226 suffer from low sampling frequency and low spatial resolution although it is featured by a unique and consistent ID.

FIG. 2 shows an exemplary embodiment of the multi-modal trajectory fusion 230 process. By combining these two approaches using the multi-modal trajectory fusion 230 approach in a preferred embodiment of the present invention, multiple persons can be tracked more accurately in terms of localization error and tracking frequency and more persistently than would be possible by a single Wi-Fi or vision based tracking.

Given that a set of cameras 104 A-D and APs 106 A-D are deployed capturing measurements in an area of interest, the mobile signal-based tracking module 220 may detect when a person 100 carrying a mobile device 102 with its wireless transmitter turned on, which will be referred to as a mobile-carrying person, enters the area by detecting radio traffic from a new source and/or by confirming that the source of radio traffic enters a region of interest. Upon the detection of the entrance of a new mobile-carrying person, the system tracks the mobile-carrying person within the region of interest, e.g., the retail space of a mall. The mobile signal-based tracking 220 module can also detect the exit of the mobile-carrying person by detecting an event in which the period that the radio traffic is absent is longer than a threshold of time and/or the source of the radio traffic exits the region of interest. The trajectory in between the entrance and exit of the mobile-carrying person is inherently complete and unique due to the uniqueness of the MAC address of the mobile device.

Independent of the mobile signal-based tracking, any person who enters the area where a set of cameras are deployed may be tracked by each individual camera 104 A-D or by the multiple cameras 104 A-D collaboratively possibly while forming a cluster among them in the vision-based tracking module 210. A person can be persistently tracked with a certain level of uncertainty if there are no significant visually similar objects in the same field of view of the cameras resulting in a longer trajectory or more persistent tracking. Whenever a tracking failure occurs due to cluttered background or visually similar irrelevant objects, the trajectory may be discontinued, and the tracking may be reinitiated. Since the re-identification of the person may or may not be successful during the entire trip of the person within the area, multiple disjointed trajectories may be created for the same person with potentially no consistent ID across the trajectories. The tracking results are then stored in a database. In an embodiment, the tracking results may be in the form of a tuple of (x, y, t) with associated uncertainty or in the form of a blob data with its timestamp and visual feature vector.

Figure 6A:
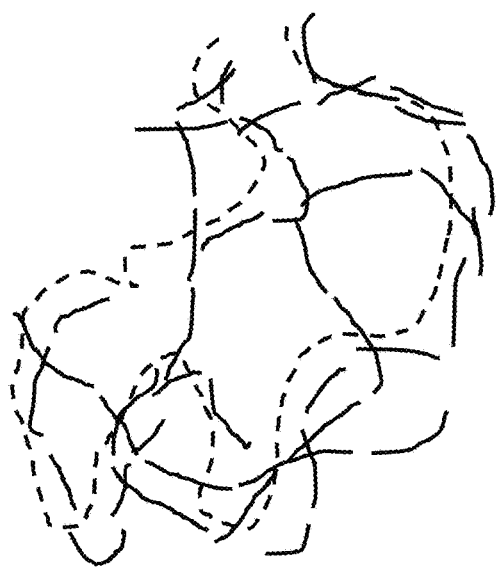
FIG. 6A shows a first step in the multi-modal trajectory association process.
Figure 6B:
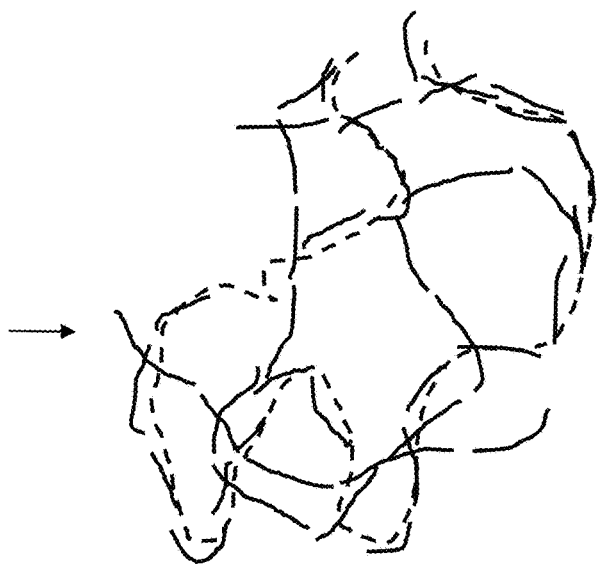
FIG. 6B shows a second step in the multi-modal trajectory association process.
Figure 6D:
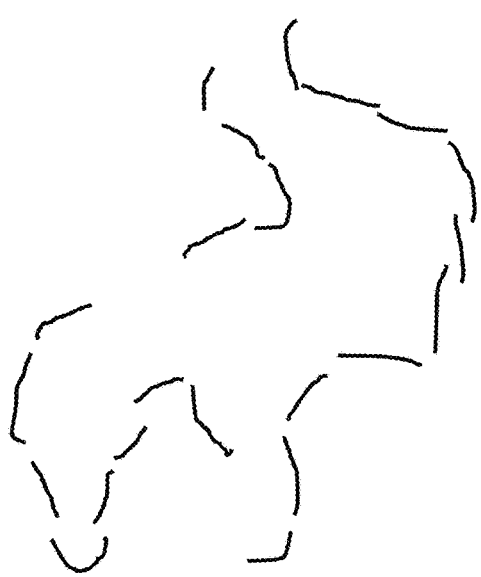
FIG. 6D shows a fourth step in the multi-modal trajectory association process.
Figure 6C:
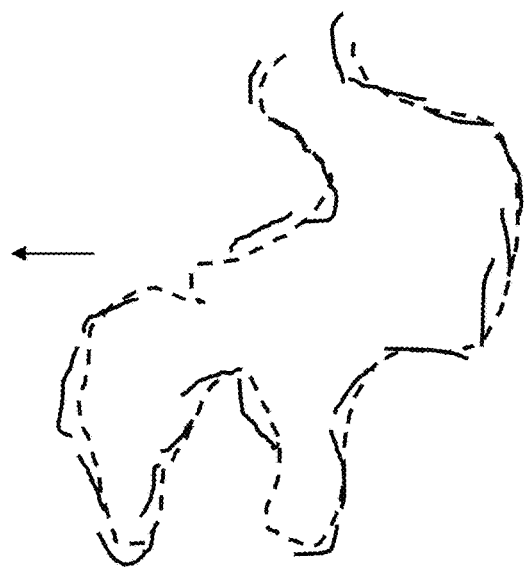
FIG. 6C shows a third step in the multi-modal trajectory association process.

Once the complete Wi-Fi based trajectory of a mobile-carrying person (i.e., a WT as defined earlier) is generated by the Wi-Fi based tracking 226 module, the system can identify and retrieve from a database the vision-based trajectories of persons (i.e., VTs as defined earlier) that are generated during when the WT is generated. These VTs form the pool of the candidates that potentially correspond to the WT. Then, a set of VTs are identified among the pool of the candidates by comparing the distance statistics of the VTs to the MT of the mobile-carrying person and also comparing the motion dynamics including direction and speed. This process assumes that the WT is an approximate of the actual trajectory of the mobile-carrying person and makes use of the WT as an anchor. Once the VTs corresponding to the WT is identified, then the unique ID of the MT is assigned to the set of VTs. This process of identifying a set of VTs that corresponds to a WT is called Multi-modal Trajectory Association 232. FIG. 6 shows a detailed example of the mobile and vision trajectory association 232. In FIG. 6A, a set of potential VT candidates are overlaid on the WT, which is represented by the dashed line. FIG. 6B shows an initial matching process between the VT candidates and the WT. FIG. 6C shows the matched VTs and the WT, which are then assigned to each other with a unique identification.

The VTs with the assigned unique ID are then used as the primary source to reconstruct the trajectory of the mobile-carrying person since they are more accurate than the MT. The identified VTs (which are actually a set of fragmented VTs for a single person) are then combined together to generate a single trajectory in case there are multiple vision measurements for the same target at the same time instance. In an embodiment, a Kalman or Particle filter may be used to combine multiple measurements. This process of integrating multiple VTs to reconstruct a single trajectory is called Trajectory Segment Fusion 234.

Vision measurements may not be available for longer than a threshold due to various reasons because, for example, (1) some of the correct vision measurements may be discarded in the ID association process, (2) some of the cameras may not be operated correctly, (3) the background may be changed abruptly, etc. In such cases, the combined trajectory that is constructed only from the vision measurements may have missing segments in the middle. The missing segments can be reconstructed by retrieving the missing segment from the WT stored in the database since the WT has the complete trajectory information although its accuracy may be relatively low. This process is called Trajectory Interpolation 236. Since the point-to-point correspondence between WT and VTs is found in the Multi-modal Trajectory Association 232 process, the exact segments in the WT corresponding to the missing segments can be identified. The found segments in the WT are excerpted and used to interpolate the missing parts of the combined trajectory resulting in a single and complete final trajectory, which will be referred to as the fused trajectory or simply FT. It can be made possible since in nature the MT is a complete trajectory of the person albeit with a low resolution.

The above Trajectory Interpolation process assumed that a Wi-Fi trajectory (i.e., WT) is generated with a low sampling frequency, yet it may be the case that there are multiple long periods of time where no Wi-Fi measurements are received. In practical cases, the pattern of Wi-Fi signal emission from a mobile device is a burst of multiple packets often followed by a long period of sleep due to the energy conservation schemes in the operating system of the mobile device. Thus, it is often the case that there are multiple periods where no Wi-Fi signals are detected for longer than, say, 30 seconds, resulting in missing holes in Wi-Fi trajectories.

In an embodiment, such missing holes may be estimated and interpolated by taking into account both the store layout and the other shoppers' trajectories in a database by inferring the most probable path taken based on the other shoppers who followed the similar path of the shopper that are actually measured before and after the missing parts of the trajectory.

Once the Trajectory Fusion and Interpolation process is completed, we may further refine the final trajectory taking into account the store floor plan and layout that describes the occupancy map of the fixtures and other facilities/equipments where shopper trajectories must not exist. In an embodiment, a shopper trajectory may be modified in such a way that it detours such obstacles with a shortest trip distance. If there are multiple such detours are available which has similar trip distances, the past history of other shoppers may be utilized to estimate more preferred and likely path that the shopper may take. This process is called Trajectory Refinement 238.

The results of the multi-modal trajectory fusion process enables a robust multi-modal person tracking by using advantages of both vision and mobile signal measurements to account for gaps in each form of tracking:

Vision-based tracking is more accurate than other sensors yet its person ID association over multiple cameras is usually not reliable.

Mobile signal-based tracking has low spatial localization accuracy due to noise and low temporal detection frequency, yet it can uniquely identify the trajectory of a particular person.

Trajectory-Transaction Data Association

Figure 7:
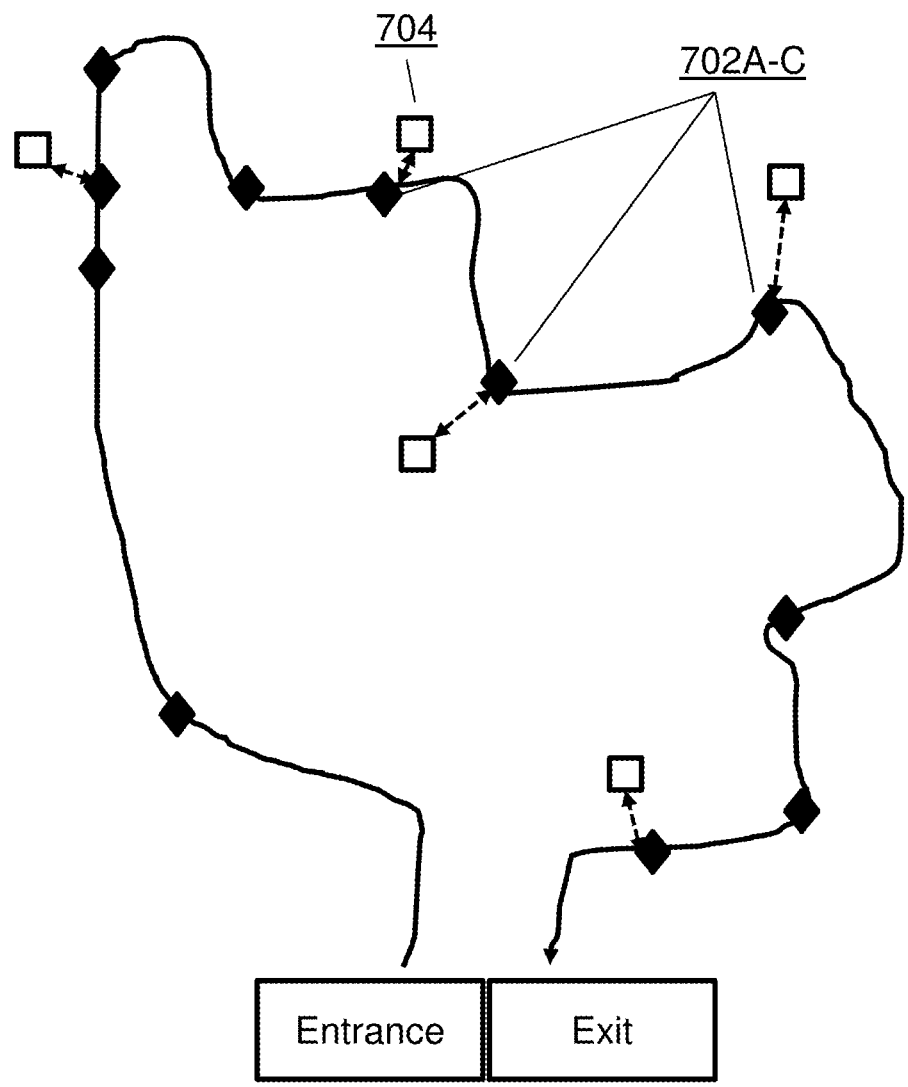
FIG. 7 shows a preferred embodiment of a method to associate transaction log data with a fused trajectory.

Given a complete trajectory of a shopper in a retail store that is obtained by Multi-modal Trajectory Fusion 232 (which will be referred to as MT Fusion) approach described in the previous section, to the present invention associates the given trajectory with a basket data, which also called as a transaction data or simply T-log data, that contains a list of items purchased by a shopper for further shopping pattern/behavior analysis, which will be referred to as Trajectory-Transaction Data Association 710 or simply TT Association. FIG. 7 shows a preferred embodiment of the trajectory-transaction data association 710 process.

While the trajectory data of a shopper indicates how the shopper navigates through a store and what marketing elements the shopper has been exposed to during the shopping trip, the T-log data of the shopper tells us what items the shopper actually purchased after a series of exposures to various marketing elements. The T-log data is crucial to understand what products wins and fails among the competition in the shelf and the final decisions that the shopper made through a course of decision process.

Despite the importance of T-log data in shopper behavior analysis as well as the trajectory data, it is a challenging problem to correctly associate a T-log data with the trajectory of a shopper who made the transaction due to the lack of a consistent ID between T-log data and the trajectory. Given the list of items purchased and the timestamp that the transaction is made, however, it may be possible to find the best corresponding pair between a given shopper trajectory and a set of candidate T-log data. In this section, we present how to find such best pair under the assumption that the entire store is covered by both vision and Wi-Fi sensors with a certain density for the system to be able to track shoppers in both modalities. In the later section, we will describe how this algorithm may be adapted to the cases where either modality's sensing coverage does not span the entire store.

Trajectory-Transaction Log Association—General Framework

The problem of TT association is defined as the following: Given that a given complete trajectory and a set of T-log data in a similar time frame, to the present invention seeks find the best corresponding pairs between them if exist.

To find a T-log data that most likely matches with the trajectory, a metric that represent the matching likelihood between the given trajectory and the T-log data needs to be defined.

Therefore, given a single complete trajectory and a single T-log data $T_j$, to the present invention computes the likelihood $P_j$ that all of the items in $T_j$ are picked up along this trajectory.

To compute the likelihood for all of the items to be picked up along the trajectory, the present invention defines a metric that measures the probability that a given item $I_i$ in a given T-log data $T_j$ is picked up along the trajectory, which is called $P(I_i|T_j)$. Then, we want to find $T_j$ such that $j=\text{argmax}_j P_j$, where $$P_j = \prod_{i=1}^{N} P(I_i | T_j)$$

When computing $P(I_i|T_j)$, the present method introduces a new term called shopping fixation. The shopping fixation refers to an event where there is a change of shopper's behavior, and the shopper's behavior appears to be triggered by a retail element. Shopping fixation is determined based on the motion dynamics of a shopper. If the shopper's motion gets slower and made a U-turn or stopped, then we will assume some item caught the shopper's attention, resulting in a shopping fixation 702A-C at the point while converting a passer-by into a shopper. $P(I_i|T_j)$ is computed only from the closest shopping fixation 702A-C (not a just closest point) in the trajectory to the item of interest $I_i$ 704.

In an embodiment, $P(I_i|T_j)$ may be defined as the following: if at least a shopping fixation (which will be referred to as S) exists within a visible and reachable range r from the item, then $P(I_i|T_j)$ will be equal to 1 and otherwise 0 to ensure that every item is picked up along the trajectory.

$$P(I_i | T_j) = \begin{cases} 1, & \exists S \leq r \\ 0, & \text{Otherwise} \end{cases}$$

In another embodiment, $P(I_i|T_j)$ may be defined to make $P_j$ robust to potential errors in shopping fixation detection and shopper tracking. To accommodate such errors, $P(I_i|T_j)$ may be defined as:

$$P(I_i | T_j) = \begin{cases} 1, & \exists S \leq r_1 \\ 0.5, & r_1 < \exists S \leq r_2 \\ \ldots \\ 0.1, & \text{Otherwise} \end{cases}$$

where $r_1 < r_2 < \ldots < r_K$.

Instead of using a probabilistic measure, we can also solve this problem using a geometric distance statistics. In this case, the probabilistic measure $P(I_i|T_j)$ is replaced by a distance metric $d_i^j$ that represents the distance from the item $I_i$ 704 to the closest shopping fixation 702A in the trajectory $T_j$. We then define the overall distance metric $D_j$ like the following:

$$D_j = \sum_{i=1}^{N} (d_i^j)^2$$

Using these metrics between a trajectory and a T-log data, the present invention iterates this process over all trajectory candidates and find the one with minimum distance or maximum probability for the given T-log data.

Given the complete trajectory and its associated T-log data of a shopper with a unique ID assigned by solving the TT Association problem, the present invention has outlined a full understanding of (1) how the shopper navigates through the store, (2) what part of the aisle or category caught the attention of the shopper, and (3) what items the shopper actually purchased.

Practical Deployment: Adaptation to Four Different Configurations

Figure 8:
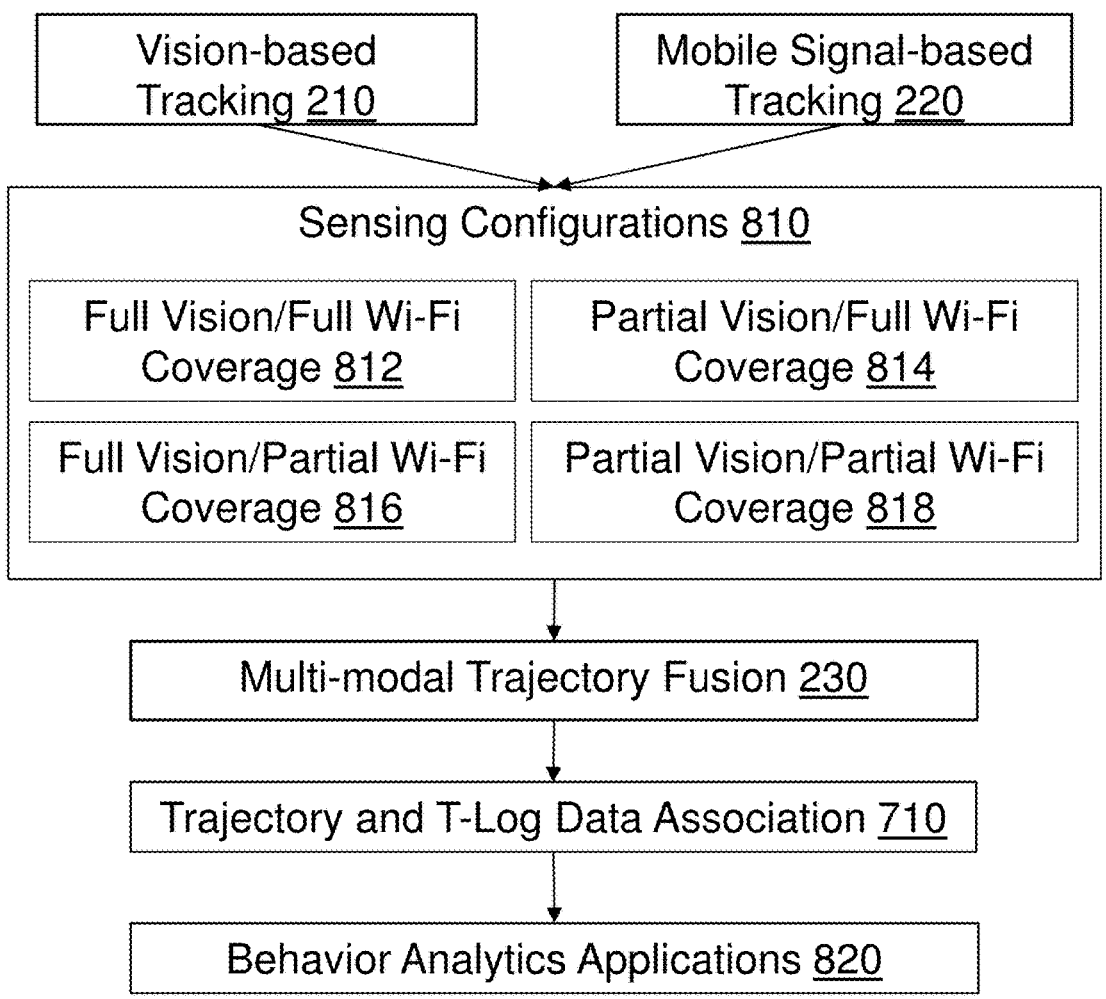
FIG. 8 shows an exemplary embodiment of the overview of sensor configurations within a retail space.

FIG. 8 presents an exemplary embodiment of the general framework of Multi-modal Trajectory Fusion 230 (which is referred to as MT Fusion) and Trajectory-Transaction Data Association 710 (which is referred to as TT Association) and the application of the frameworks to the cases of practical deployments of sensors. Depending on the business requirements and applications, the sensor deployment may have restrictions and/or different assumptions, which requires an adaptation of the algorithms accordingly to the specific sensor deployment configuration. The present invention adapts the framework to four different sensor deployment configurations 810 that may be frequently encountered in various real situations. However, there could be more diverse configurations in different applications where similar adaptation may be applied. The four sensor deployment configurations are listed and classified as shown in the following table:

|  |  | Vision Coverage | |
| --- | --- | --- | --- |
|  |  | Full | Partial |
| Wi-Fi Coverage | Full | (1) 812 | (2) 814 |
|  | Partial | (3) 816 | (4) 818 |

Full coverage means that the union of the sensing ranges of the sensors covers the entire store while partial means that the sensor network system covers only a part of the store such as entrance, exit, and an area of interest (e.g., an aisle or a category). FIG. 9-12 show four different types of such configuration with two different sensing modalities.

Figure 9:
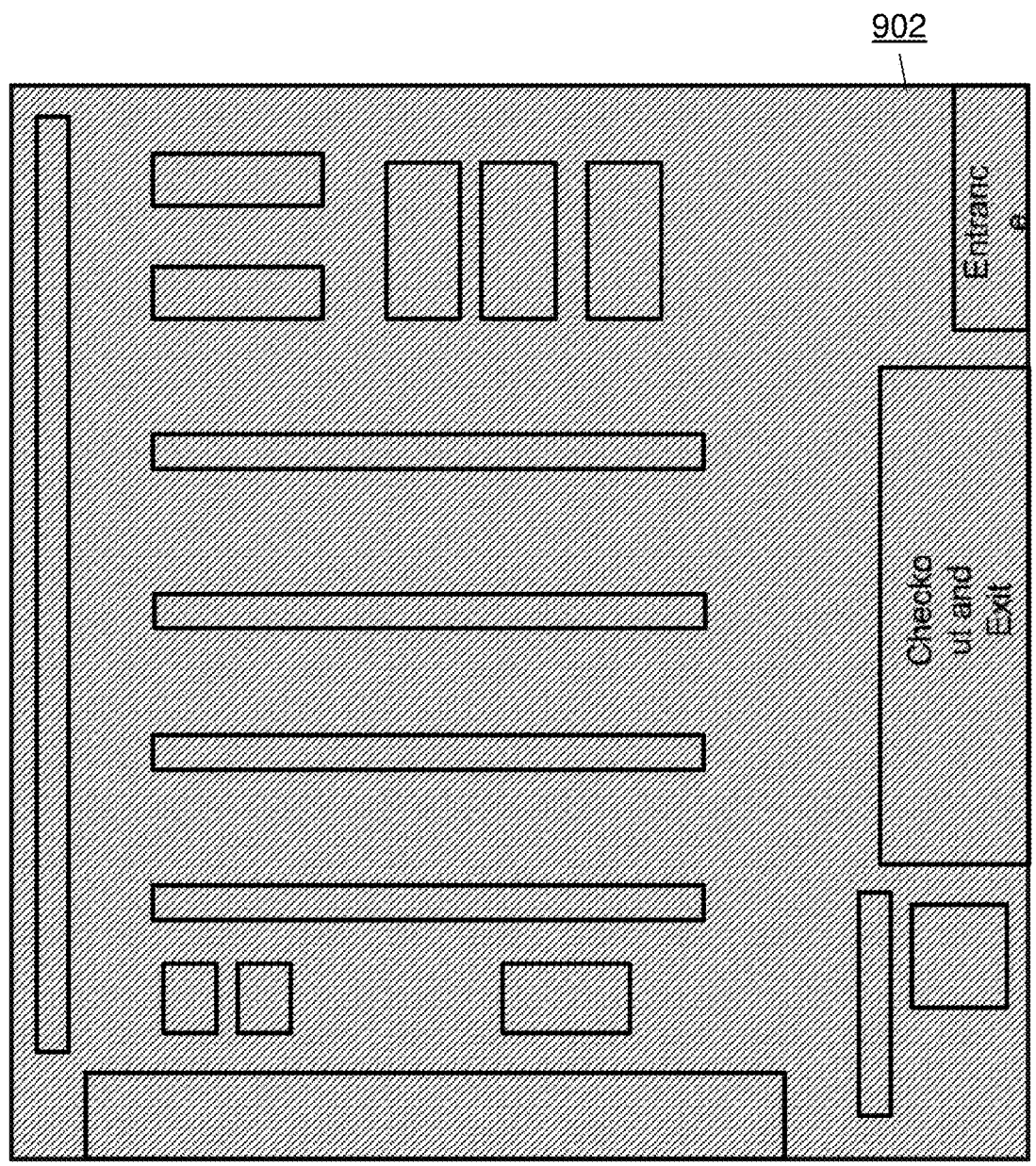
FIG. 9 shows an example of a sensor configuration where Wi-Fi and vision sensors are deployed so as to cover the entire retail space.
Figure 10:
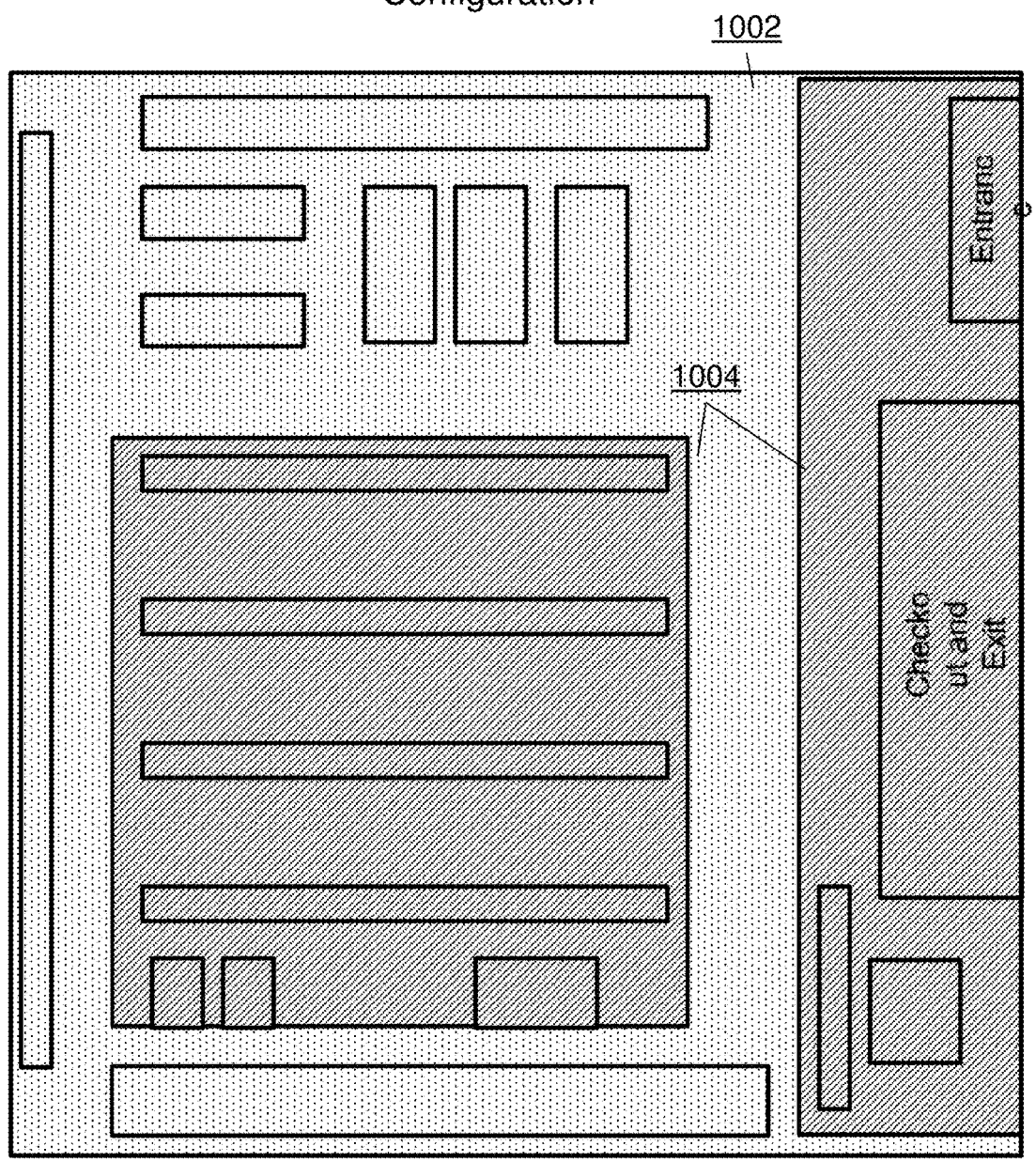
FIG. 10 shows an example of a sensor configuration where Wi-Fi sensors cover the entire retail space and vision sensors cover areas of interest.
Figure 11:
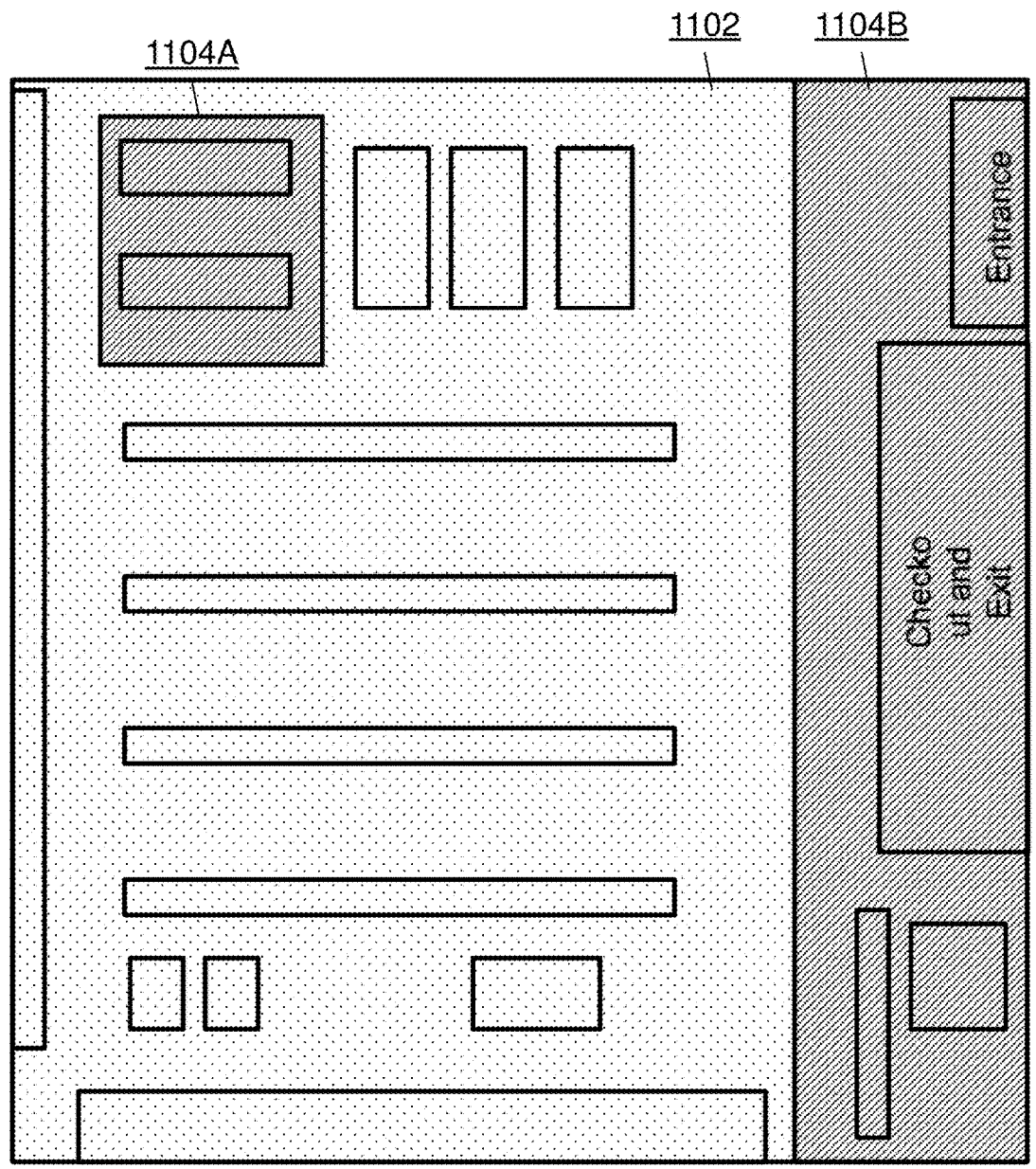
FIG. 11 shows an example of a sensor configuration where vision sensors cover the entire retail space and Wi-Fi sensors cover areas of interest.
Figure 12:
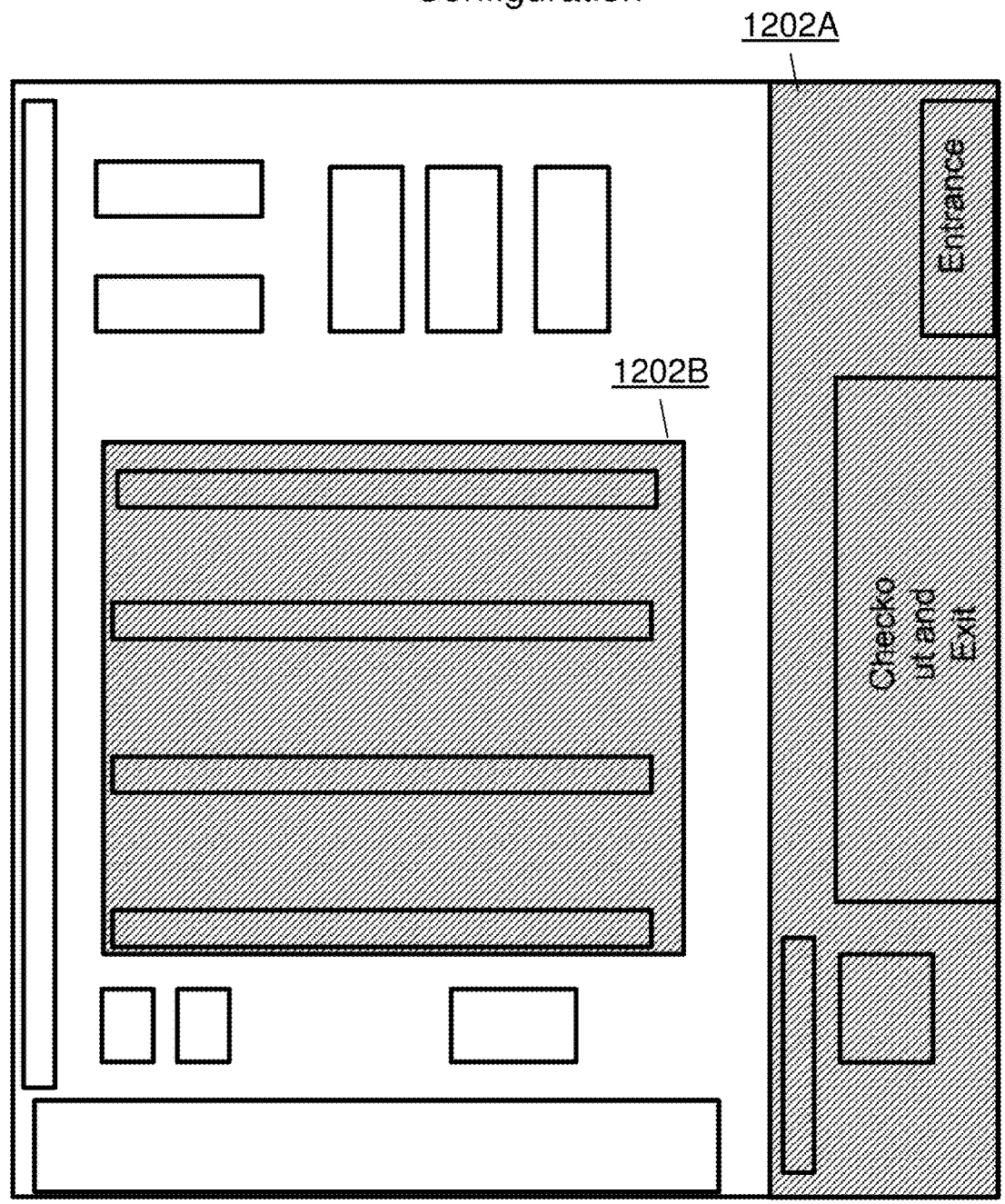
FIG. 12 shows an example of a sensor configuration where vision and Wi-Fi sensors overlap and cover areas of interest in a retail store.

FIG. 9 shows an example of a store layout covered entirely by Wi-Fi and vision sensors. The hatched lines 902 indicates overlapping coverage by Wi-Fi and vision sensors. FIG. 10 shows an example of a partial video and full mobile coverage configuration. In this configuration, the entire store 1002 is covered by Wi-Fi sensors and areas of interest 1004 including entrance, checkout and exit are covered by an overlapping coverage of Wi-Fi and vision sensors. FIG. 11 shows an example of a full video and partial mobile coverage configuration. In this configuration, the entire store 1102 is covered by vision sensors and areas of interest 1104A-B including entrance, checkout and exit are covered by Wi-Fi sensors. FIG. 12 shows an example of partial video and partial mobile coverage configuration. In this configuration, areas of interest 1202A-B including entrance, checkout, and exit are covered by overlapping Wi-Fi and vision sensors.

Full Vision Coverage and Full Wi-Fi Coverage

MT Fusion

Given the full vision and full Wi-Fi coverage the MT Fusion 230 is carried out by the exactly same approach as described in the in FIG. 2.

TT Association

Given a complete trajectory by the MT Fusion 230, the TT Association 710 is also carried out by the exact same approach described in FIG. 7 since the description of the TT Association 710 algorithm assumes the availability of full vision and full Wi-Fi coverages.

Once MT Fusion 230 and TT Association 710 is performed, then the data that we can collect for a shopper will include the T-log data and the complete trajectory of the shopper with its unique ID.

Partial Vision Coverage and Full Wi-Fi Coverage
MT Fusion

MT Fusion 230 is inherently designed to work with partial vision coverage since it takes a set of partial trajectory segments generated from vision tracking 220. The Trajectory Fusion 230 and Trajectory Interpolation 236 processes in MT Fusion 230 will address the limitations of partial vision coverage and generate a complete trajectory. The rest of the process will follow the same process described in FIG. 2 in the case of full vision and full Wi-Fi coverage.

TT Association

Figure 13:
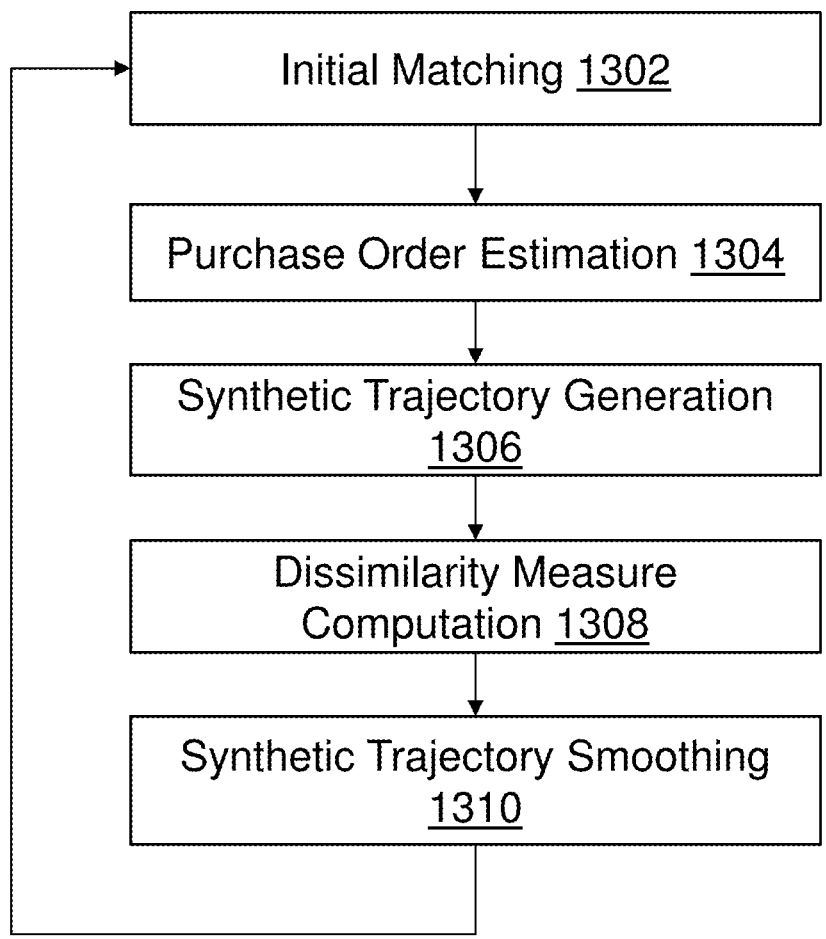
FIG. 13 shows an exemplary process for determining trajectory-transaction data association in a scale space.

Once the MT Fusion 230 of trajectories from both modalities is carried out, at least some part of the trajectory is reconstructed solely from the WT due to the partial vision coverage. The portion of the trajectory reconstructed solely from the WT is inherently generated with low sampling frequency and low accuracy due to the nature of Wi-Fi based tracking, which is therefore more smoothed and/or undersampled compared to the part generated with both modalities. FIG. 13 shows a preferred embodiment for TT association 710 in this configuration.

These characteristics of the trajectory require a more careful matching process in associating the T-log data to the trajectory. In an embodiment, The TT Association 730 is carried out by an iterative approach that computes a distance measure between a T-log data and a trajectory in a scale space as shown in FIG. 13. The process starts from estimating the order of the items being purchased by (1) first laying down the fused trajectory (i.e., FT) on the store floor plan with the location of the purchased items marked in the Initial Matching module 1302, (2) associating each purchased item with the timestamp of the closest shopping fixation point in the FT in the Purchase Order Estimation module 1304, and (3) creating a synthetic trajectory, which will be referred to as ST, by connecting the location of the purchased items in time order in the Synthetic Trajectory Generation module 1306. Once the ST is created, then the present invention (4) computes a similarity measure between the FT and the ST in the scale space of the ST. The scale space of the ST can be created by applying a Gaussian with multiple kernel widths to the ST. The method then (5) finds the minimum distance between the FT and the ST, which will be the dissimilarity measure between each pair in the scale space of the ST in the Dissimilarity Measure Computation module 1308. By (6) iterating this process for all the candidate STs with different smoothing factors after performing the smoothing in the Synthetic Trajectory Smoothing module 1310, the T-log data corresponding to the ST that has the minimum dissimilarity with the FT can be found.

Figure 14:
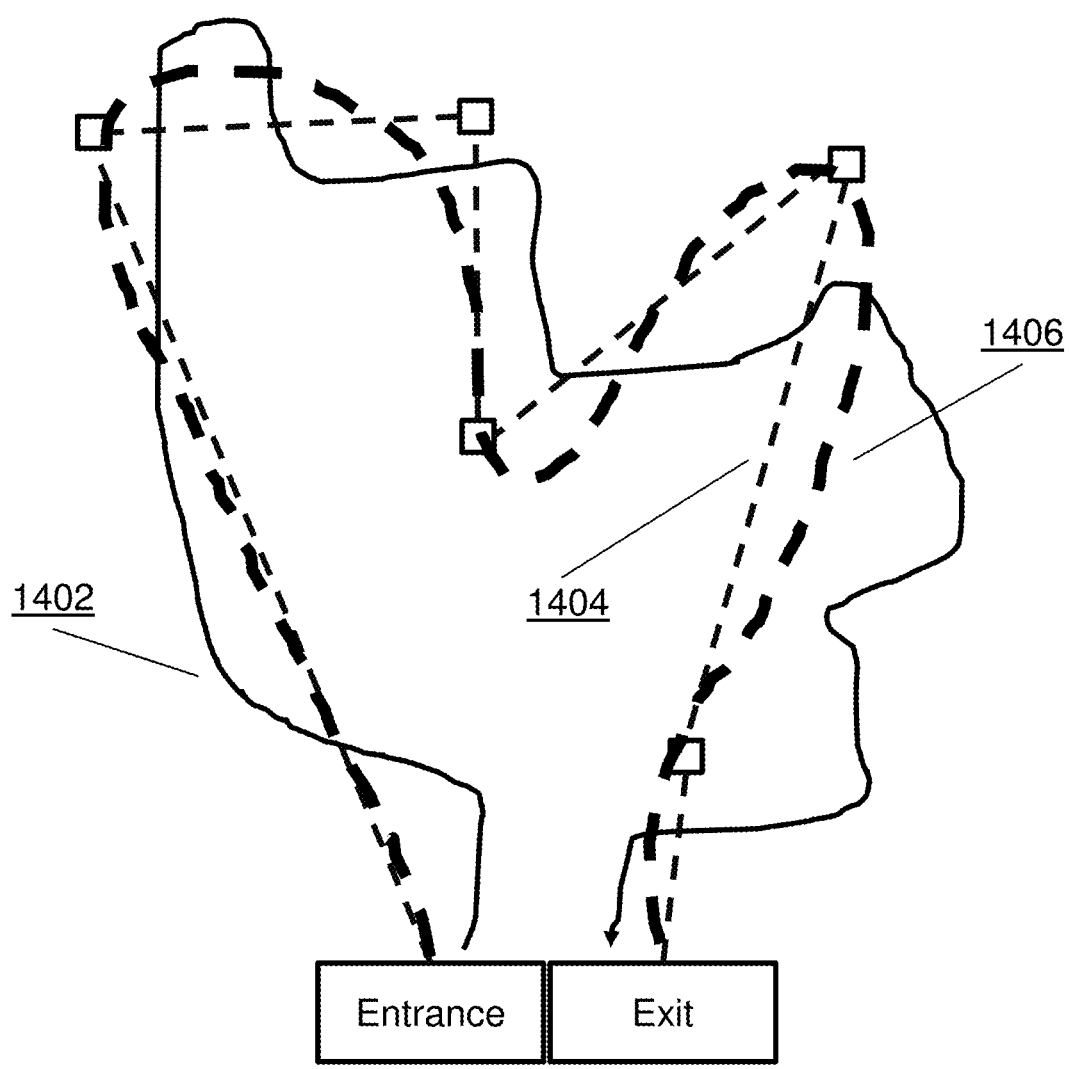
FIG. 14 shows an example and an exemplary method to determine the synthetic trajectory using transaction data.

In FIG. 14, an exemplary synthetic trajectory is shown in two scale levels: the thin dotted line 1404 stands for a synthetic trajectory with no smoothing while the thick dotted line 1406 does with a smoothing. An actual trajectory 1402 is laid down too for visualization purpose.

Once we perform MT Fusion and TT Association, then the data that we can collect for a shopper will be the same as the case of full vision and full Wi-Fi coverage case, such as the T-log data and the complete trajectory of the shopper with its unique ID.

Full Vision and Partial Wi-Fi Coverage
MT Fusion

Unlike the two previous cases, this configuration does not allow us to perform the store-wide MT Fusion 230 process since the present configuration cannot generate a complete trajectory that serve as an anchor to aggregate fragmented trajectories from vision-based tracking 210. We may still track shoppers with vision sensors to some extent although it will essentially have discontinuities due to the lack of unique and consistent IDs, which is inherent in visual features.

Figure 15:
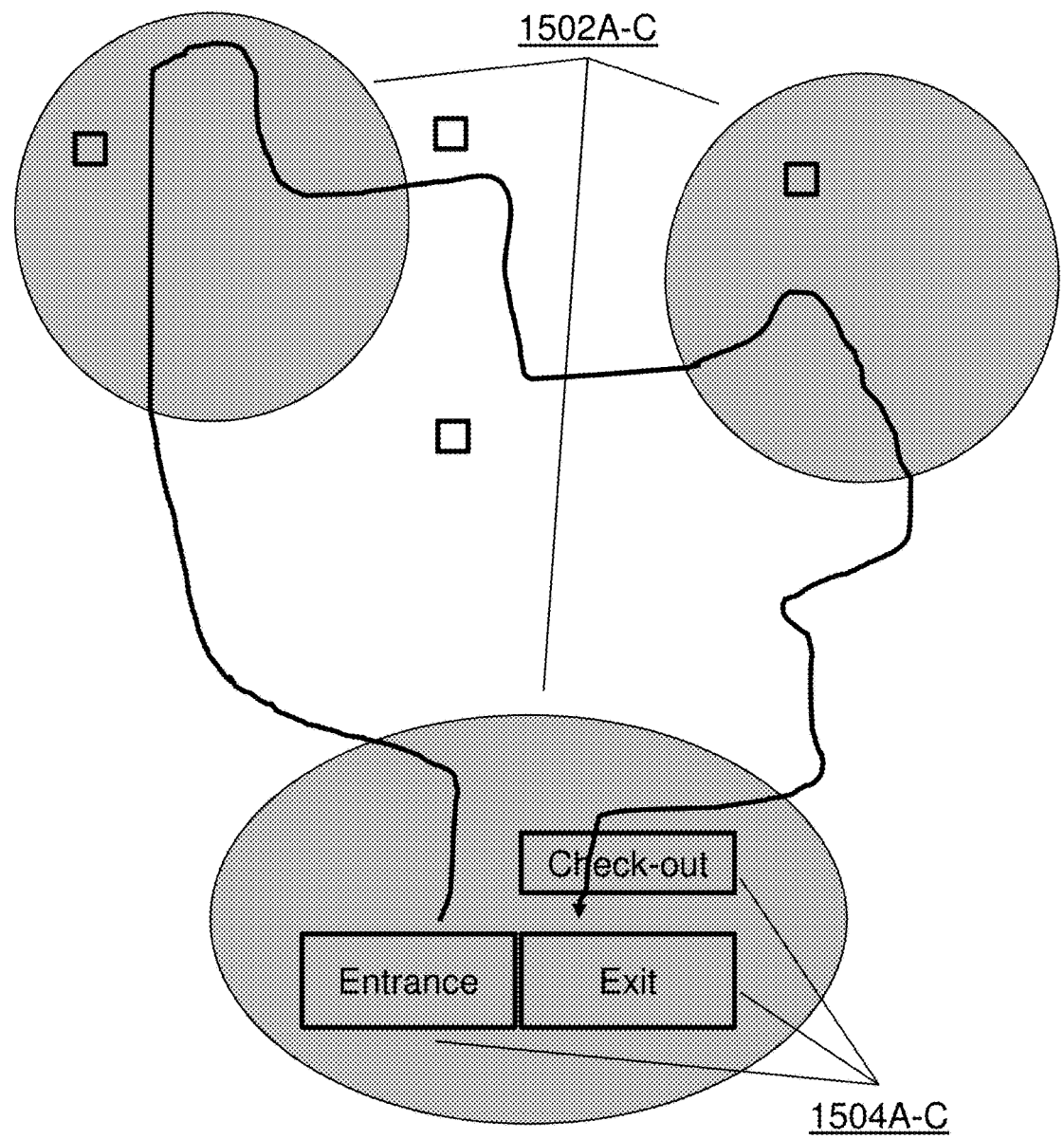
FIG. 15 shows an example of an adaptation of the trajectory-transaction data association for a configuration where tracking is not possible throughout the entire retail space.

FIG. 15 describes an example of an adapted trajectory-transaction data association 1500. Although the invention cannot perform store-wide tracking with Wi-Fi signals in this configuration, the present invention can detect Wi-Fi signals in the areas of interest 1502 and identify the visitor with the unique ID. Therefore, the present method can perform a comparison of the shopper count at entrance/exit 1504 with the shopper count at an area of interest 1502A where Wi-Fi sensors are deployed. In addition, the repeated visitors over time can be determined, enabling a long-term behavior analysis. Any data that can be obtained from vision-sensing systems are also available for further analysis.

TT Association

Due to the lack of association of the unique ID from Wi-Fi signals with vision trajectories, there may not be a complete trajectory of a shopper that we want to associate with the given T-log data. However, we can associate the T-log data with a unique ID (instead of a trajectory) of a shopper by detecting the shopper in multiple areas such as the entrance 1504A, exit 1504B, and the other areas of interest 1502. Due to the nature of Wi-Fi based localization, we are only able to have a relatively loose timestamp when the Wi-Fi signal of a shopper is detected around the entrance 1504A, exit 1504B, and the other areas of interest 1502. However, even with such loose time synchronization, we may associate a visual feature model that appeared in all of the areas of interest (i.e., entrance, checkout, and an aisle, for example) and a MAC address (i.e., a unique ID) of a mobile device that are also detected in all of such areas by estimating the correlation between them in a spatio-temporal domain.

In an embodiment, the system may (1-1) construct and store the visual feature model of a shopper for each vision trajectory segment with timestamps. Whenever a Wi-Fi signal is detected in any of the areas of interest, the system also (1-2) stores the MAC address 414 of the device with the timestamp. Once a shopper makes a transaction at the checkout 1502B, (2) the visual feature model of the shopper is again created and a list of the MAC addresses 414 of mobile devices present around the checkout 1502B is collected. (3) The visual feature model of the shopper is searched through the visual feature models that are already created in all of the areas of interest 1502. Once (4) the matched visual feature models are found in both the checkout and the areas of interest 1502, then the system (5) lists out the MAC addresses 414 of mobile devices detected in similar time frames in the same areas. (6-1) If there is a single MAC address 414 that appears in all or most of such areas, then it will indicate that a shopper with the MAC address 414 passes through all of the areas of interest and thus will be highly likely that this shopper is actually the shopper who just made the transaction at the checkout. In case there are multiple MAC addresses 414 that appear all the areas of interest, if they are (6-2) stored in a database, it may be used for further analysis especially when such data is accumulated in a high volume.

After the TT Association 710 module, the data collected for a shopper will be limited compared to the two previous configurations. The present invention will only be able to store the T-log data and the unique ID of the shopper, the MAC address 414.

Partial Vision and Partial Wi-Fi Coverage

MT Fusion

In this case, the present invention assumes that the partial coverages of vision and Wi-Fi sensing overlaps each other in the areas of interest, for example, the entrance, exit/checkout, an aisle of interest, etc. If the overlapped sensing coverage is relatively small compared to the entire store, the MT Fusion 230 again cannot be carried out. Therefore, what the system can measure when it comes to Wi-Fi based detection is same as the case of full vision and partial Wi-Fi coverage. In the partial mobile and full vision configuration, store-wide shopper detection and tracking can be done because of the full vision coverage despite the lack of consistent and unique ID from mobile signal based tracking. In this configuration, the present invention cannot measure any store-wide statistics except, for example, shopper count at entrance and exit.

TT Association

Although the store-wide statistics cannot be measured, the TT Association 710 can be carried out similarly as in the full vision and partial Wi-Fi case since the system can build the visual feature models of shoppers in all the areas of interest and detect the Wi-Fi signal. After we perform the TT Association 710, therefore, the data that we can collect for a shopper includes the T-log data and the unique ID of the shopper.

Shopper Behavior Analytics and Behavior Analytics Applications

Figure 16:
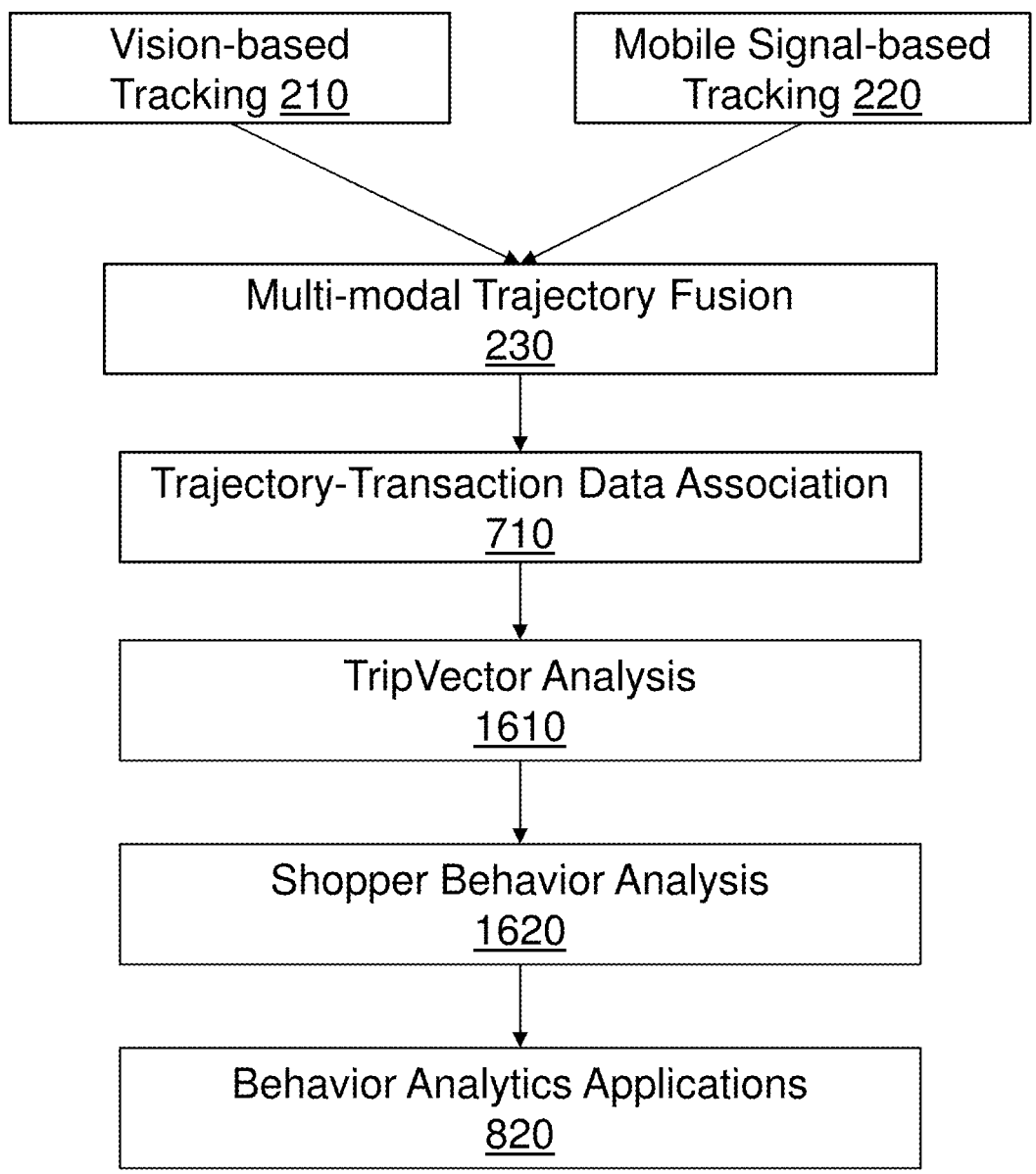
FIG. 16 shows a preferred method to determine shopper behavior analytics using multi-modal tracking.

FIG. 16 shows an exemplary overview of the Behavior Analytics Applications 820 module based on the given shopper trajectories from TT Association 710 module in the present invention. The vision-based tracking module 210 and mobile signal-based tracking module 220 undergoes multi-modal trajectory fusion 230 to yield a fused trajectory. The fused trajectory is associated with its respective transaction data in the trajectory-transaction data association module 710. Various dimensions based on the given shopper trajectories are collected and an intermediate representation of the entire shopping trip of shoppers in retail stores are collected in the TripVector analysis module 1610. A set of behavior analytics applications 820 are defined and derived and measured based on the TripVector 1810 in the shopper behavior analysis module 1620. Lastly, the present invention includes the adapted version of the behavior analytics applications 820 and their adapted ways of measurements in different sensor deployment configurations.

Figure 17:
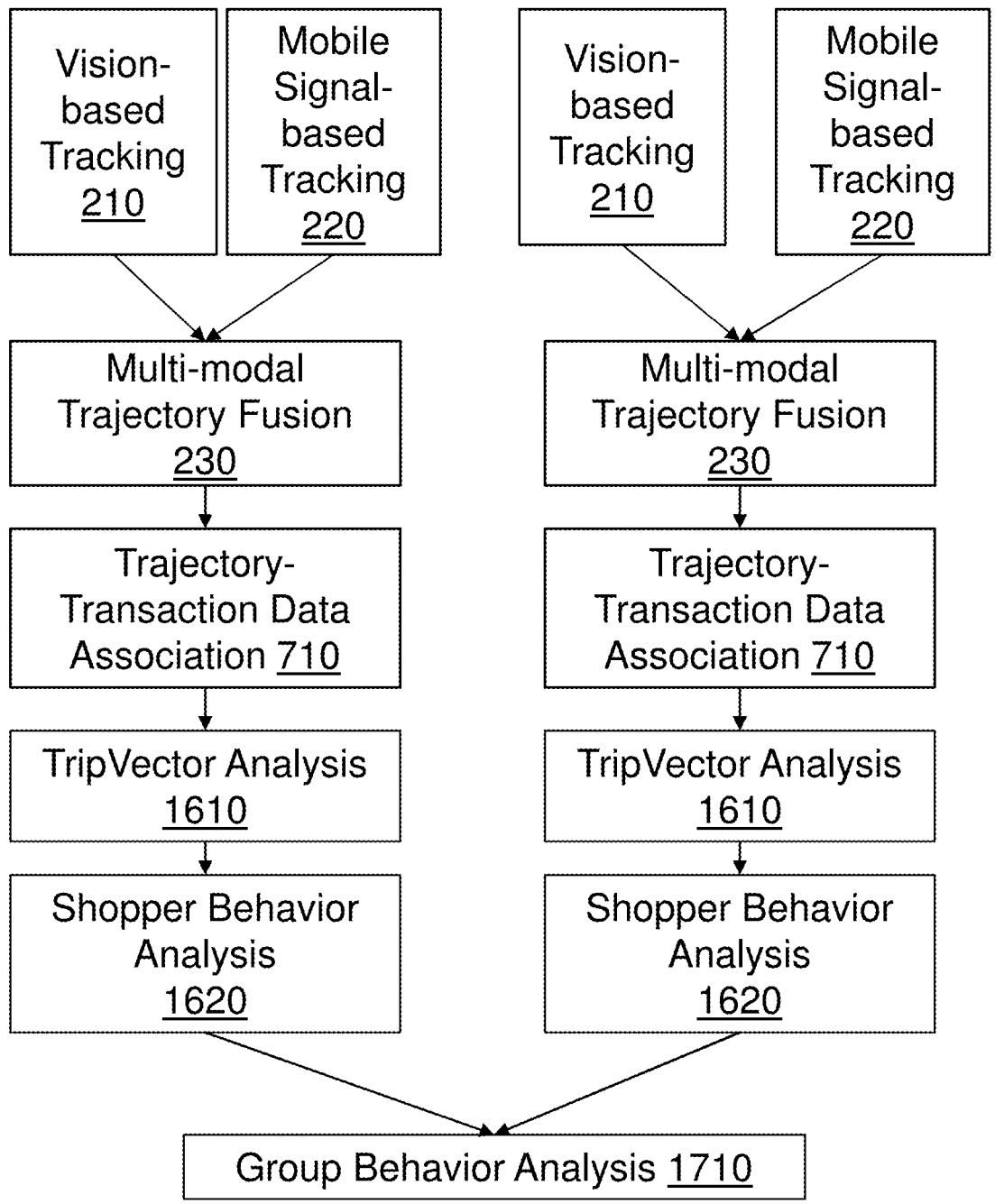
FIG. 17 shows a preferred embodiment for aggregate group behavior analysis.

FIG. 17 shows an exemplary embodiment of group shopper behavior analytics. In the embodiment, the shopper behavior analytics 1600 method is aggregated for multiple shopper trajectories in the group behavior analytics module 1710.

TripVector

Figure 18:
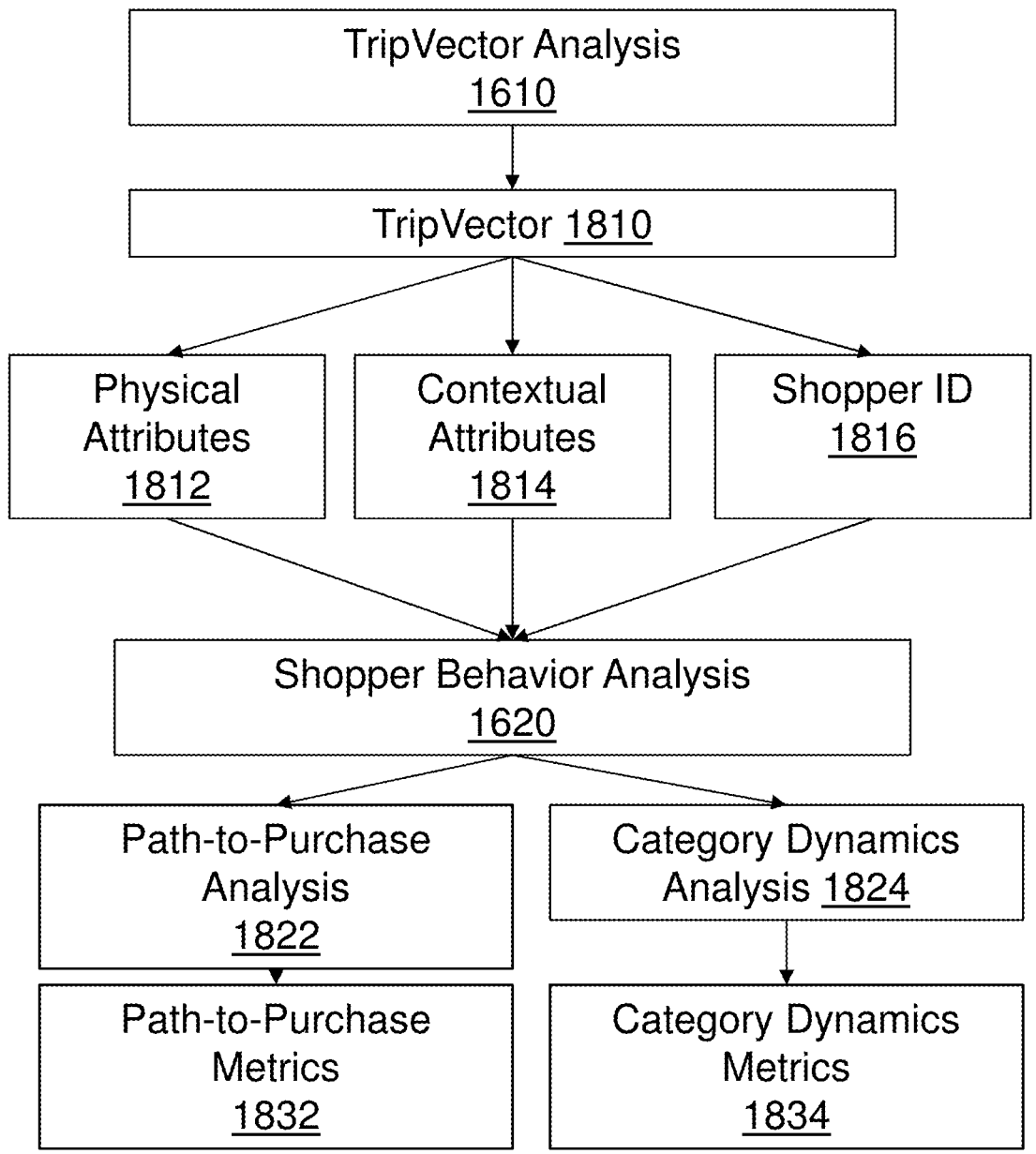
FIG. 18 shows an exemplary method for extracting an intermediate representation of the shopper trajectory and calculating a shopper behavior analysis.

In FIG. 18, an exemplar intermediate representation of the shopping trip of a shopper, the TripVector 1810, is calculated in the TripVector analysis 1610 module. The TripVector 1810 encodes the shopper's shopping experience during a visit to a retail store. The TripVector 1810 of a shopper consists of a sequence of the shopper's trip information at a given point, which includes the shopper identification, or shopper ID, 1816 and physical 1812 and contextual attributes 1814 of the shopper.

The shopper ID 1816 may be created by using the MAC address of the shopper's mobile device, a hashed code of the MAC address for better privacy protection, or any unique random number. In case that a full Wi-Fi coverage is provided, then there will be a consistent shopper ID for the entire trip, and thus the TripVector 1810 will encode the shopper's end-to-end shopping experience during the entire shopping trip. However, in other cases where shopper trajectories are fragmented and unable to associate a consistent ID for different trajectories for the same shopper, a random yet unique number is assigned to the shopper as the shopper ID 1816 in the TripVector 1810. In an extreme case where there's no tracking involved for a shopper, then the TripVector 1810 will have a random shopper ID 1816.

The physical attributes 1812 represents the shopper's current physical states, including the shopper's location, timestamp, head orientation, gesture, visual appearance, etc. The contextual attributes 1814 represent the shopper's interaction to the elements in the retail environment, including the shopper's (1) visual attention, (2) physical approaching or contact to a product or a display, (3) a set of pre-defined shopping actions such as holding a product, comparing different products, purchasing a product, etc. The contextual attributes 1814 of a shopper may be defined in various ways in different applications and also may be defined as a composite of multiple simpler actions. Whenever such an action is detected by the system using, say, a computer vision or machine learning algorithm, the action is marked in the TripVector 1810. In an extreme case where there is no tracking involved for a shopper, then the physical and contexture attributes of the TripVector 1810 may be determined based only on the detection results.

By definition, the TripVector 1810 summarizes how the shopper navigates in the store and what specific shopping events occur to the shopper at what time. This compressed representation will be used for shopper behavior analysis 1620. Shopper behavior-analysis 1620 comprises two types of analysis, path-to-purchase analysis 1822 and category dynamics analysis 1824 from which a set of path-to-purchase metrics 1832 and category dynamics metrics 1834 are derived and measured, which will be eventually analyzed further to generate deeper shopper insights.

Shopper Metrics

In this section, we introduce a set of shopper metrics that will form a basis for shopper insight generation. This set of shopper metrics can be derived and measured based on the collected TripVectors 1810. In this section, specific shopper metrics and how they are measured are described in further detail.

Path-to-Purchase Analysis

The present invention discloses a set of shopper metrics that represent the store-wide statistics and patterns of shopper behavior with regard to the performance of retail elements in generating sales. The shopper behavior leading to a buying in a retail store is also referred to as the Path-to-Purchase. The path-to-purchase 1832 and category dynamics shopper metrics 1834, which will be listed and defined in the following subsections, can be measured in the areas of interest in different levels such as store, categories, and sub-categories, resulting in store-wide, per-category, and per-subcategory shopper metrics. A categories is defined as a logical entity for a group of products, a group of product types, space, areas in a store, a display of a group of products, or a department with similar relevance. A subcategory is defined as a sub-group of elements in a category.

Figure 19:
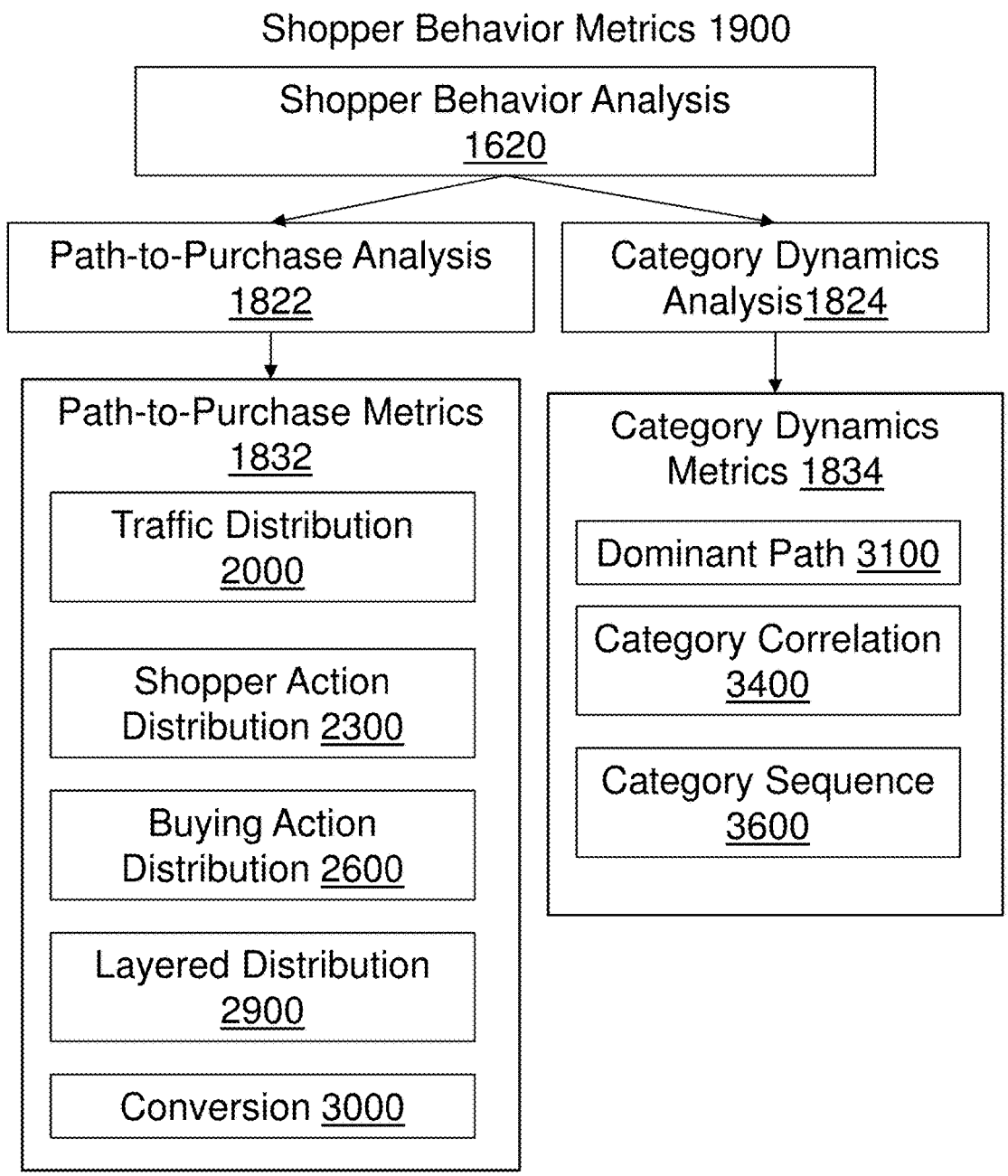
FIG. 19 shows an exemplary overview of the possible shopper behavior analyses and shopper behavior metrics in the present invention.

FIG. 19 shows an exemplary overview of the shopper behavior metrics 1900. The shopping behavior analysis module 1620 comprises path-to-purchase analysis 1822 and category dynamics analysis 1824. Path-to-purchase analysis 1822 yields path-to-purchase metrics 1832 which comprise shopper behavior metrics that pertain to store-wide analysis. Category dynamics analysis 1824 yields category dynamics metrics 1832 to more granular, category analysis. The path-to-purchase metrics 1822 comprises traffic distribution 2000, shopper distribution 2300, buying distributions 2600, layered distributions 2900 and conversion metrics 3000. The category dynamics metrics 1824 comprise dominant path 3100, category correlation 3400, and category sequence 3600 measurements.

Traffic Distribution

Figure 20:
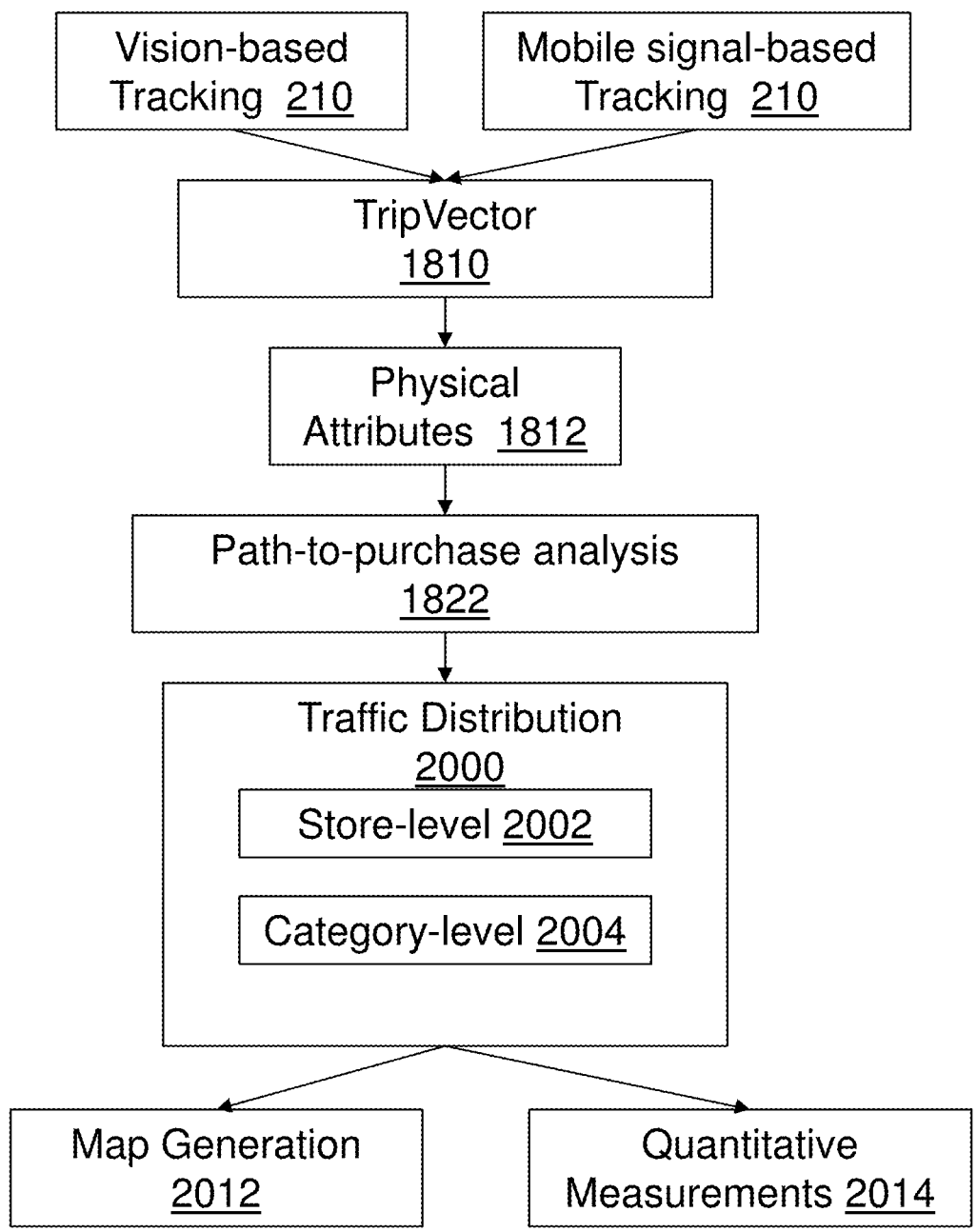
FIG. 20 shows an exemplary method for measuring traffic distribution.

In FIG. 20, the present invention measures the traffic distribution 2000 that is defined as the distribution (over an area of interest such as the entire store or a predefined zone) of the density of people who are expected to occupy a point in the area of interest at a given time frame. Measuring traffic distribution requires at least the physical attributes 1812 collected from a TripVector 1810. Therefore, the present invention can measure traffic distribution if at least mobile signal-based 220 or vision-based 210 tracking occurs. The path-to-purchase analysis 1822 yields the traffic distribution 2000 on the store-level 2002 and category-level 2004.

Figure 21:
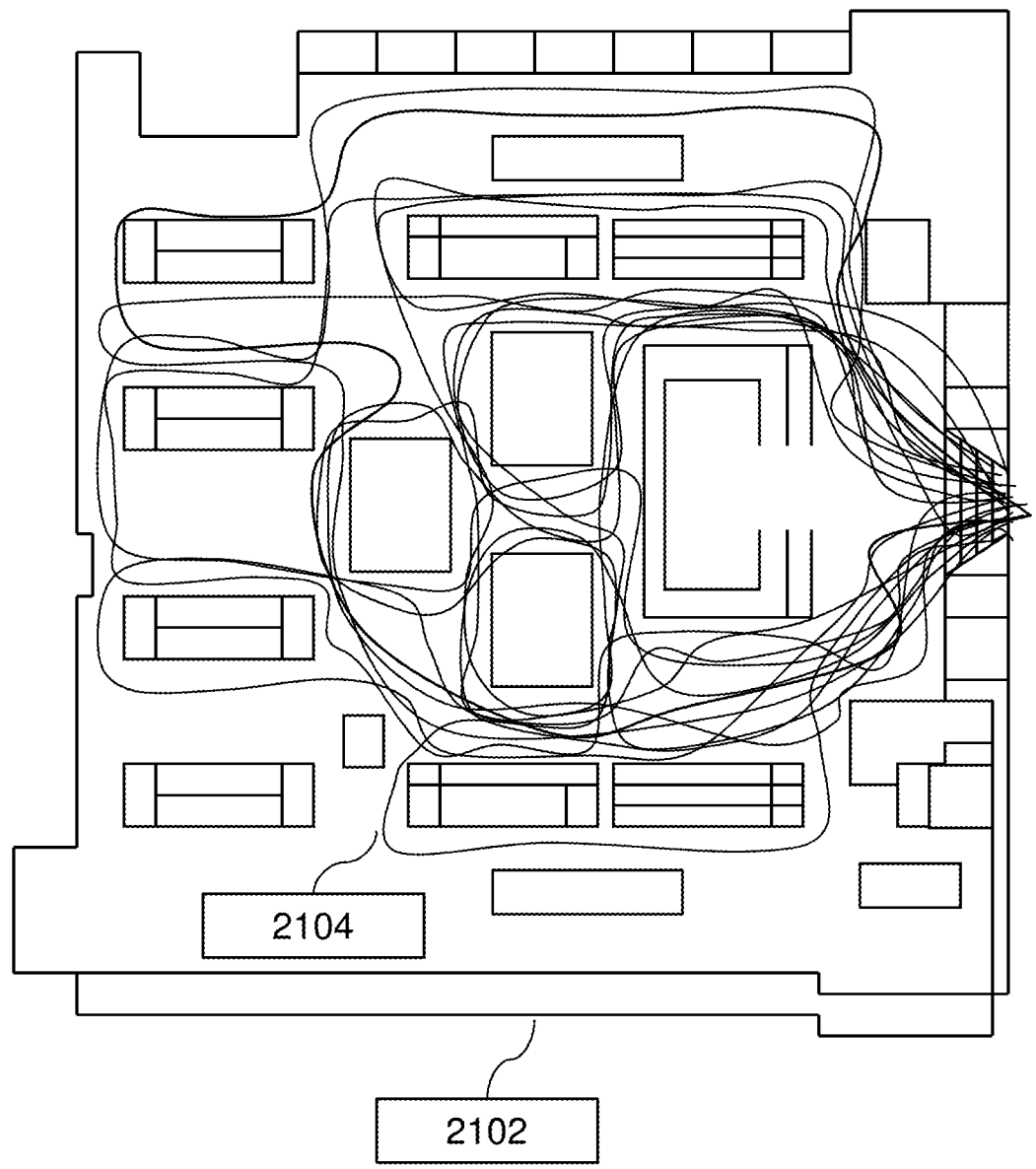
FIG. 21 shows an example of traffic distribution represented on a store map.

In the map generation module 2012, the traffic distribution 2000 may be visualized as a traffic distribution map 2100 of all the visitors to the area of interest over the area map as seen as FIG. 21. The traffic distribution 2000 is generated based on the physical attributes 1812 of the TripVectors 1810 of all the visitors. The traffic distribution 2000 can be overlaid in the form of trajectory lines 2104 on a map 2100 of the store-, category-, or subcategory-level planogram 2102 for a more granular look at traffic distribution.

Traffic can also be represented in terms of quantitative measurements 2014 such as the traffic counts for the entire store or for specific categories as seen in FIG. 22. In addition, quantitative measurements 2014 can include a ratio of category traffic count to total store traffic count or a comparison chart to other categories. In the case of categories, sub-category traffic counts can be compared to the overall category traffic count or to other sub-categories.

FIG. 21 shows an exemplary traffic distribution map 2100 for store-level traffic distribution. The aggregate of trajectories 2104 are mapped onto the store layout 2102. The overlaid trajectories will show areas of high concentration and areas of low concentration of traffic which can inform store layout optimization and marketing. In another embodiment, detection results as opposed to trajectories can be overlaid and used to represent traffic distribution on a generated map.

FIG. 22 shows exemplary tables of quantitative measurements for traffic distribution 2014. The first table 2202 shows quantitative measurements 2014 for store-level traffic distribution 2002. The total traffic count is segmented by category. The second table 2204 shows quantitative measurements 2014 for category-level traffic distribution 2004. The total traffic for the category is segmented by sub-category. Other exemplary quantitative measurements 2014 can also comprise of percentages of total traffic by category or percentages of total category traffic by sub-category.

Shopping Action Distribution

Figure 23:
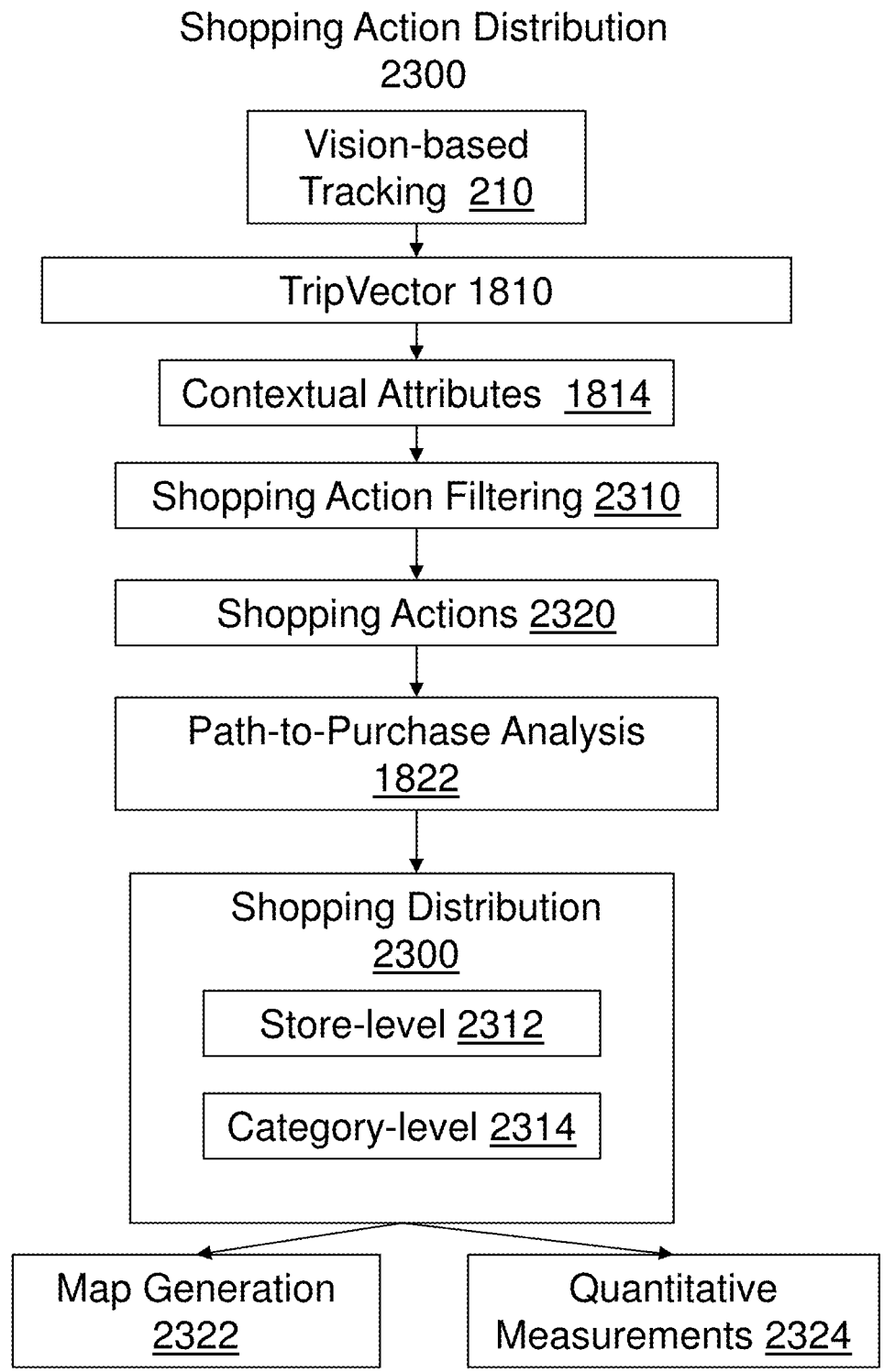
FIG. 23 shows an exemplary method for measuring shopper action distribution.

The present invention measures the shopping action distribution 2300 within the retail space as shown in FIG. 23. The shopping action distribution 2300 of a shopper is defined as the density of the expected occurrences of shopping actions over an area of interest, where a shopping action 2320 refers to an active interaction to a retail element, for example, visual attention, physical contact, purchasing, etc. A shopper refers to a person who is actively engaged in such a shopping action 2320 in the store whereas a passer-by or a general traffic refers to a person who is not actively engaged. A passer-by turns into a shopper when he/she starts being engaged with a shopping action 2320. The initiation of such shopping actions 2320 can be detected as a shopping fixation as defined in FIG. 7. Depending on the various types of shopping actions defined in different applications, the shopping fixation can be detected differently as in extracting the contextual attributes 1814 for the TripVector 1810.

Therefore, the shopping action distribution 2300 can be represented based on the contextual attributes 1814 of the TripVectors 1810 of all the visitors. In order to obtain the contextual attributes 1814, vision-based tracking 210 of the shopper must occur because of the level of detailed tracking required. The shopping action distribution 2300 can be defined or visualized for a single shopping action or a specific subset of shopping actions 2320 by filtering out other shopping actions in the shopping action filtering module 2310. The present invention can measure store-wide shopping action distribution 2312 or category-level shopping action distribution 2314. Shopping action distribution can be represented as map visualizations 2322 or as quantitative measurements 2324.

Figure 24:
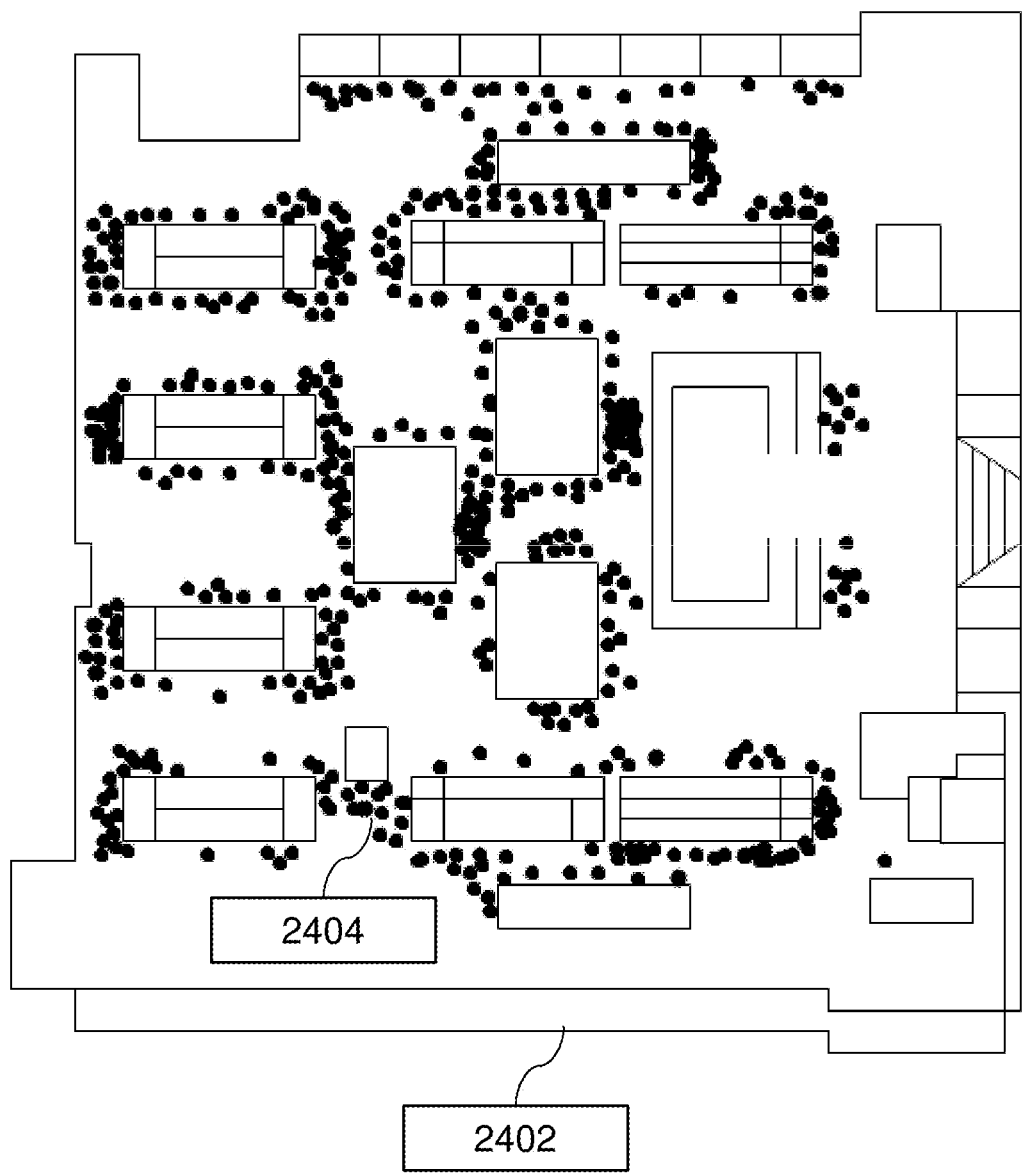
FIG. 24 shows an example of shopper action distribution represented on a store map.

In an embodiment as in FIG. 24, the store-wide shopping action distribution 2312 can be represented or visualized by being superimposed on a store map layout. The selected shopping actions 2320 are aggregated over a predetermined amount of time for all the shoppers and are overlaid on the store layout 2402 in the form of the black dots 2404. The generated map indicates areas of relatively high and low shopping activity which can then be used for store plan optimization and marketing strategy optimization. Map generation 2322 can be completed in different levels such as the store-, category-, or subcategory-level.

In FIG. 25, the shopping action distribution can also be represented using quantitative measurements on the store-level or category-level. The first table 2502 shows an embodiment of quantitative measurements 2324 for store-wide shopping action distribution 2312. The total shopping action count is segmented by category. The second table 2504 shows an embodiment of quantitative measurements 2324 for category-level shopping action distribution 2314. The shopping action count for a category is segmented by sub-category. In another embodiment, quantitative measurements can 2324 comprise the ratio of category-level shopping to total shopping or ratio of shopping for one category to shopping for another category. In another embodiment, the shopping action distributions 2300 can be measured and compared for sub-categories of one category.

Buying Action Distribution

Figure 26:
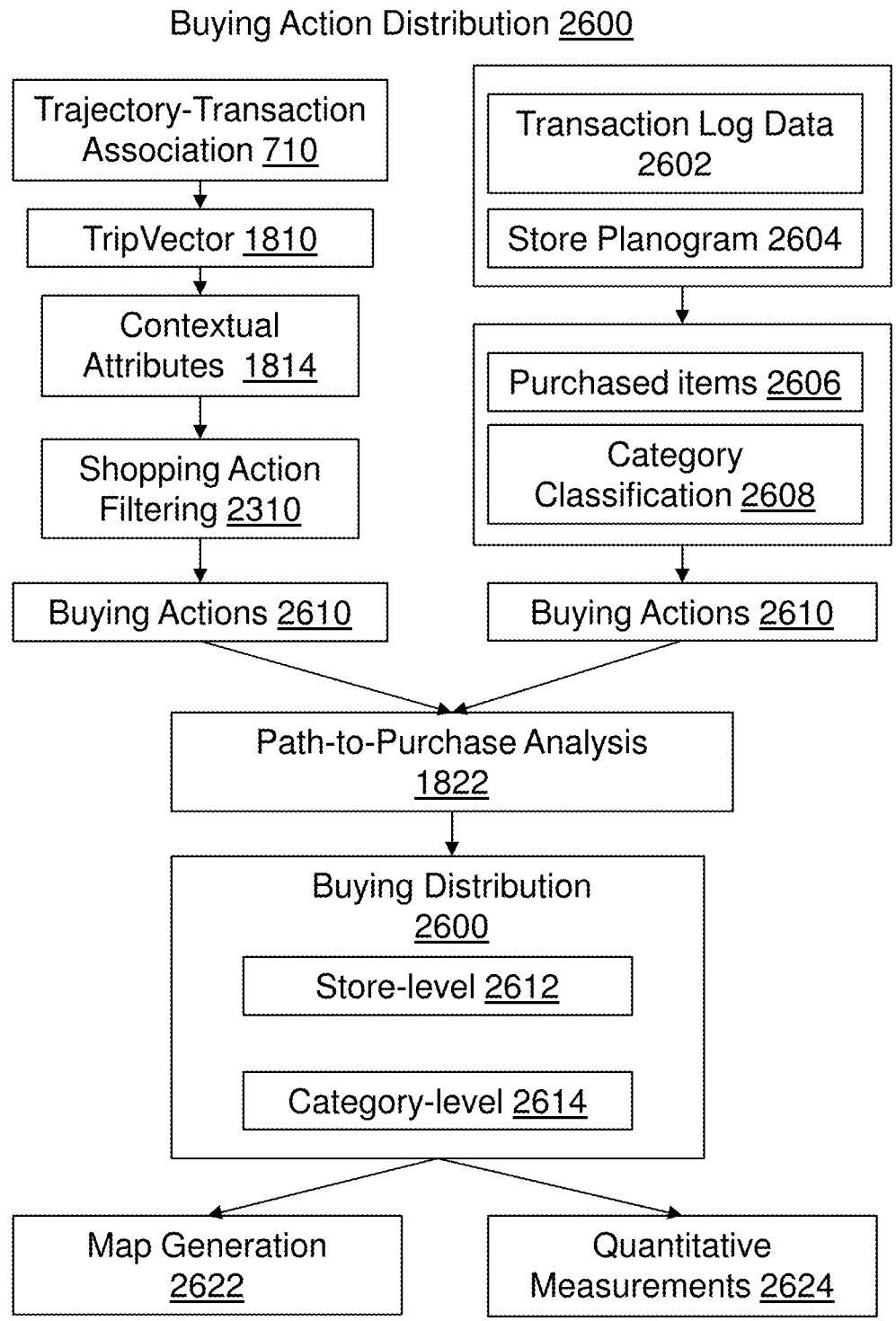
FIG. 26 shows an exemplary method for measuring buying action distribution.

FIG. 26 shows an exemplary embodiment for measuring buying action distribution 2600. In one embodiment, the buying action distribution 2600 is a special case of the shopping action distribution 2300, which represents the density of the expected occurrences of a buying action 2610 over an area of interest. This buying action distribution 2600 can be obtained by filtering only the buying actions 2610 among other potential shopping actions from the shopping action distribution 2300 in the shopping action filtering module 2310. In another embodiment, the present invention uses the transaction log data 2602 over a given length of time and the store planogram 2604 to identify purchased items 2606 and their category classification 2608. The purchased items 2606 represent buying actions 2610 and can be aggregated onto a map through map generation 2622 or into quantitative measurements 2624 to represent buying action distributions 2600.

Similar to the shopping action distribution 2300 in FIG. 23, the buying action distribution 2600 can be measured in different levels such as the store-level 2612 and category-level 2614. The buying action distribution can be represented through map generation 2622 or quantitative measurements 2624.

Figure 27:
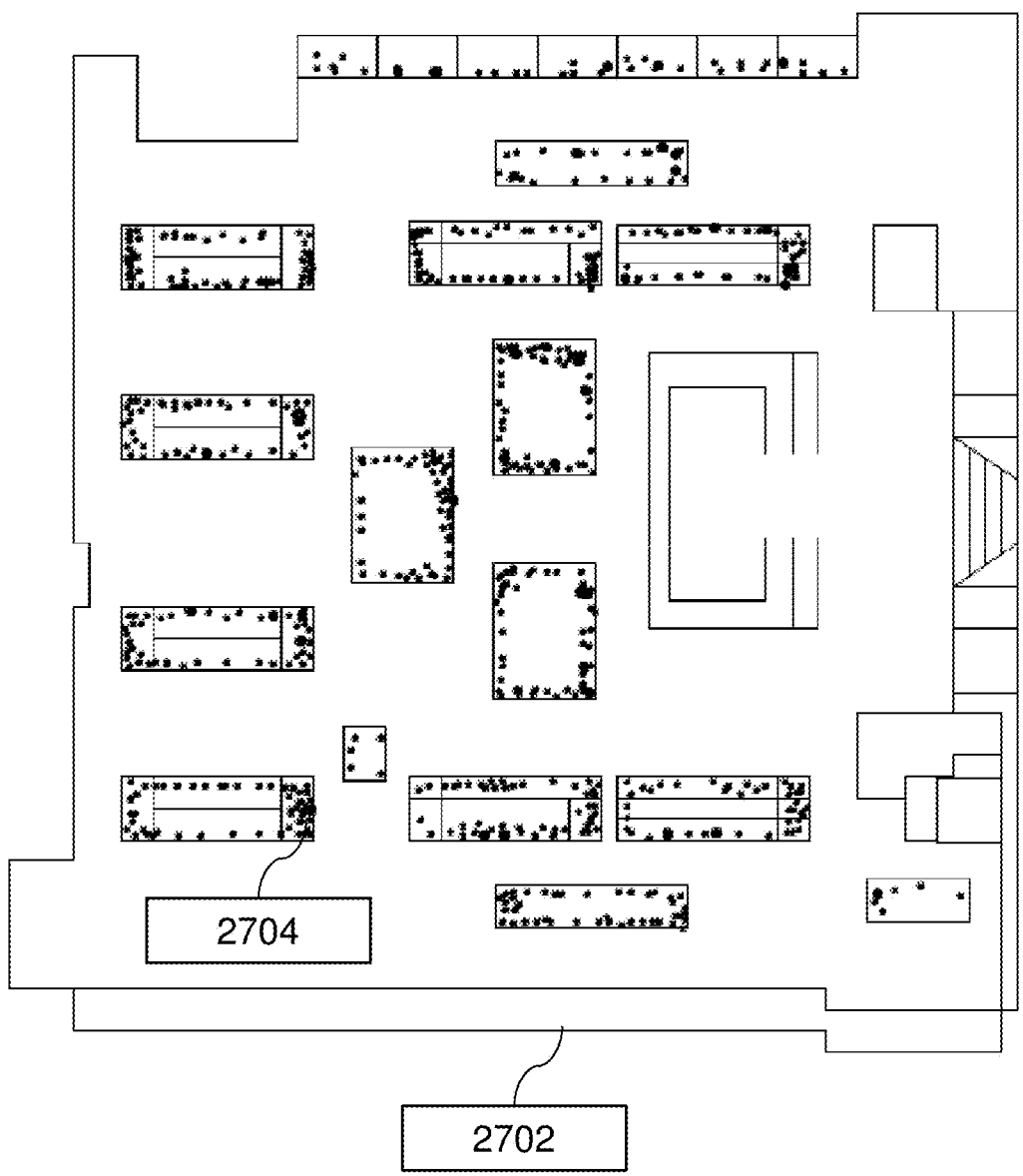
FIG. 27 shows an example of buying action distribution represented on a store map.

FIG. 27 shows an exemplary embodiment of a buying action distribution map 2700 for a store over a predetermined amount of time. The black dots 2704 representing buying actions 2610 are mapped onto a store layout 2702 by where the purchased items are found in the store as determined by the trajectory-transaction association 710. In another embodiment, the buying action distribution 2600 can also be represented on the category level 2614 using the same method. For category-level behavior analysis, the buying action distribution 2600 could reflect sub-category purchases for deeper insight into the decision making process.

FIG. 28 shows an exemplary embodiment for quantitative measurements 2624 for buying action distribution 2600. Buying action distribution 2600 can be represented using quantitative measurements 2624 at store-level 2612 or category-level 2614. On the store level 2612, the buying action distribution 2600 comprises the total and expected number of buyers, the total and expected number of buyers per category, and the ratios comparing buyers of one category to the total buyers, the buyers of another category, etc. for a pre-defined time period as seen in the table 2802. On the category level 2614, the buying action is distributed by sub-categories, meaning the buying counts for sub-categories can be compared to the total category buying counts or to other sub-category buying counts as seen in the table 2804.

Layered Map Generation

Figure 29:
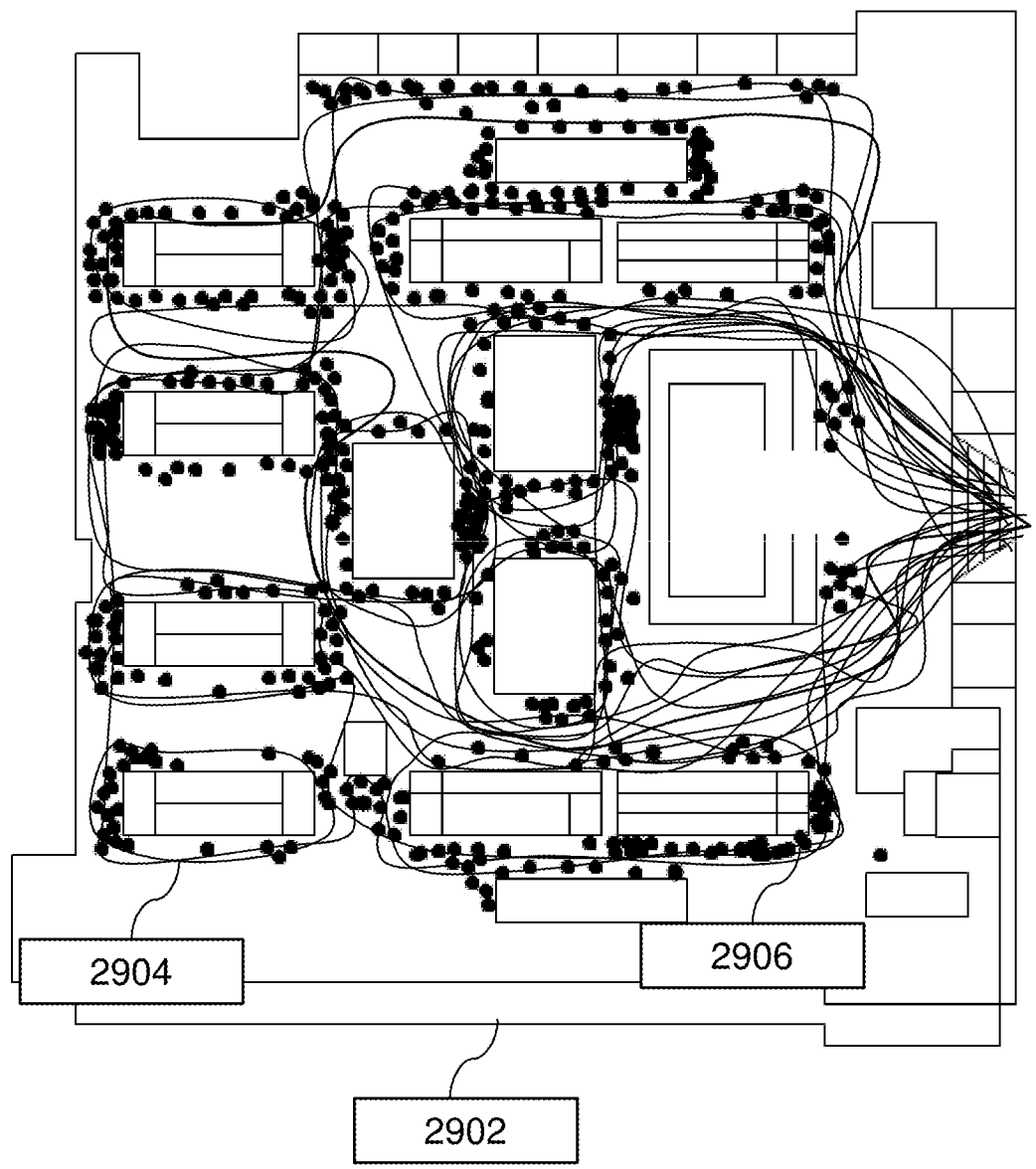
FIG. 29 shows an example of layered distribution represented on a store map.

While maps may be generated as individual visual representations of traffic, shopping action, and buying action distributions, an integrated map that contain all or a subset of the parameters can also be generated to compare traffic, shopping action, and buying action distributions. FIG. 29 shows an exemplary embodiment of layered distribution 2900 in the form of a map generation. Layers representing the aggregation of traffic, shopping action, and buying actions for a predetermined period of time are overlaid a map of the layout 2902 of the area of interest. These layers may be color-coded or otherwise differentiated to enable distinction from one another. In this embodiment, the layers comprise traffic 2000 and shopping action distributions 2300. Traffic distribution 2000 is represented by solid black lines 2904 and shopping actions are represented by solid black dots 2906. Comparison of the layers can further enhance behavior analysis applications and insights.

Conversion Calculation

Figure 30:
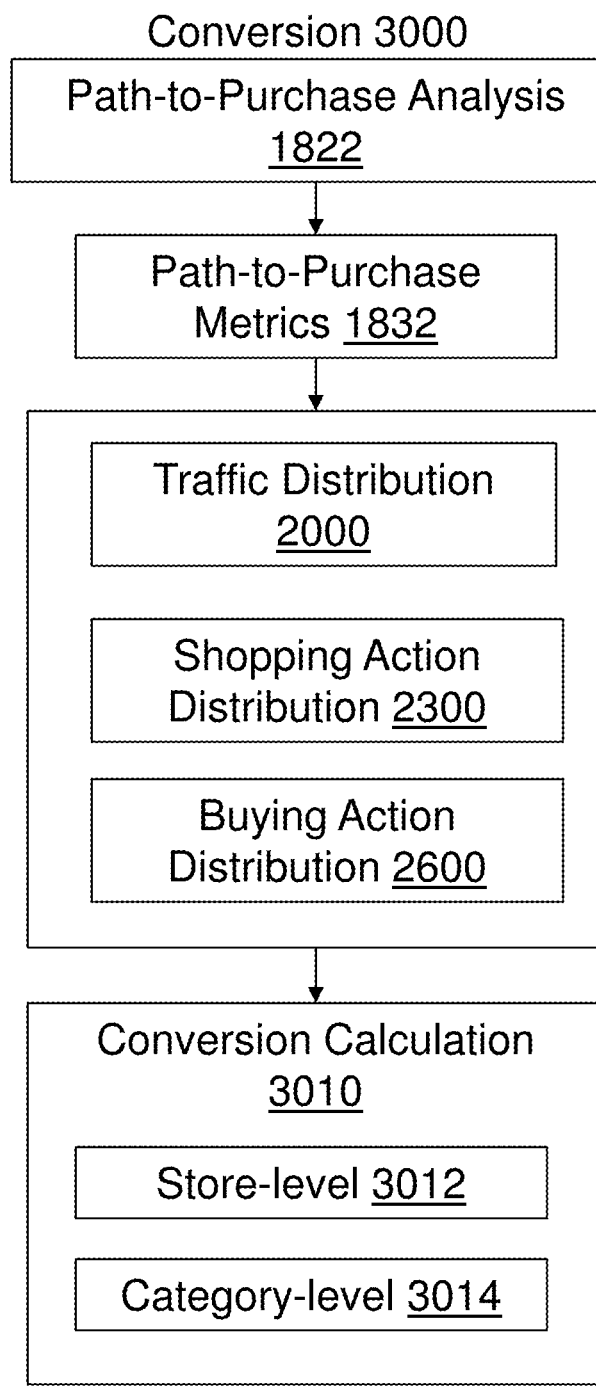
FIG. 30 shows a preferred method for calculating the conversion ratios based on traffic, shopping action, and buying action distributions.

FIG. 30 shows an exemplary process for determining conversion 3000 between traffic 2000, shopping action 2300, and buying action distributions 2600. In the conversion calculation module 3010, traffic, shopping, and buying numbers can be compared to one another using a sales funnel or conversion ratio whereby the numbers for traffic, shopping, and buying action distributions are compared directly to one another. The comparison reveals what share of traffic was converted to shoppers and what share of shoppers were converted to buyers. The present invention can measure the conversion ratios from traffic to buying for the store-level 3012 or can measure conversion on the category-level 3014 using the category-level traffic 2014, shopping action 2314, and buying action 2614 distributions already measured by the invention.

Category Dynamics Metrics

In the present invention, a set of shopper metrics are presented that represents the inter-category dynamics in terms of shopper behaviors. Category dynamics analysis 1824 yields a set of category dynamics metrics 1834. The category dynamics metrics 1834 comprise the estimation of dominant path, category correlation, and category sequence. The three metrics reveal insights about shopper behavior and decision-making on the category level and inform how store layout planning and marketing efforts can benefit from shopper behavior and decision trends on the category level.

Dominant Path

Figure 31:
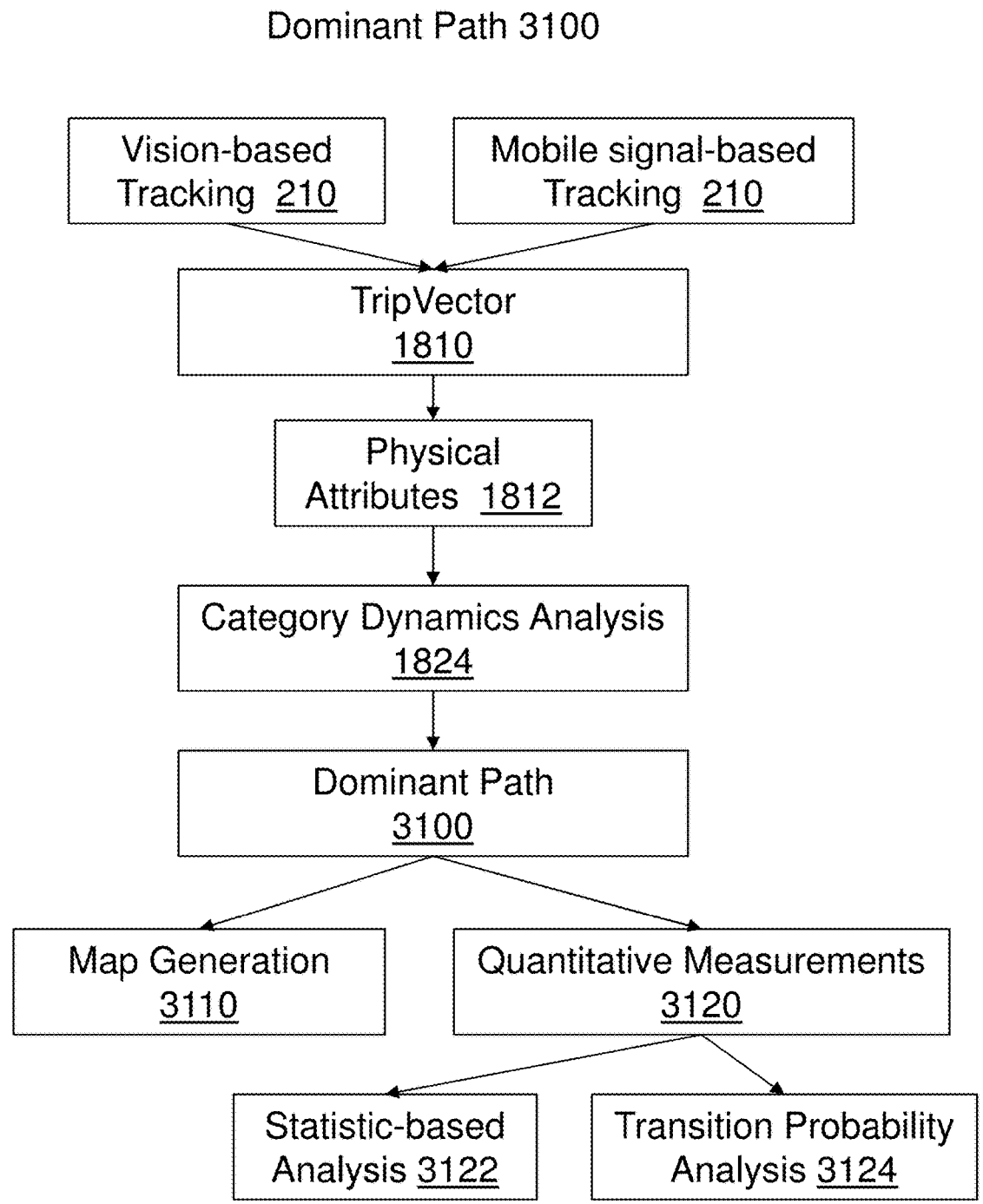
FIG. 31 shows a preferred method for determining dominant path.

FIG. 31 shows a preferred embodiment of a method to calculate dominant path 3100. Dominant path 3100 calculation determines the preferred path of shoppers when leaving a category. There are a finite amount of adjacent categories to which individuals can travel from a specific category. The present invention tracks the trajectories of shoppers in a specific category and calculates which surrounding category the most shoppers visit after leaving the original category. The TripVector 1810 for the shopper is collected and analyzed for physical attributes 1812. The physical attributes 1812 comprise the input data for the shopper behavior analysis module 1620 which calculates the dominant path 3100.

In one embodiment, the invention can measure either the raw number of people visiting another category. In another embodiment, the present invention measures the percentage of people who visit category n who then go to category A. The measurement of raw numbers and percentages of traffic constitute a statistics-based analysis 3122 of the dominant path.

In another embodiment, the dominant path can be measured in terms of transition probability in the transition probability analysis module 3124. The transition probability from a category to another category is modeled using a Hidden Markov Model (HMM). A store floor plan or layout can be usually divided into multiple non-overlapping categories, resulting in a disjoint set of categories. Allocating a state or a node to each category, we can build a HMM model based on a directed graph where an edge is created between two nodes based on their physical adjacency, resulting in two edges for a pair of adjacent states for two-way transition. The transition probabilities among the states of this HMM model can be trained using the past histories of the TripVectors of the visitors stored in a database.

The results can be viewed as a map 3200 created by the map generation module 3110 or as quantitative measurements 3120.

Figure 32:
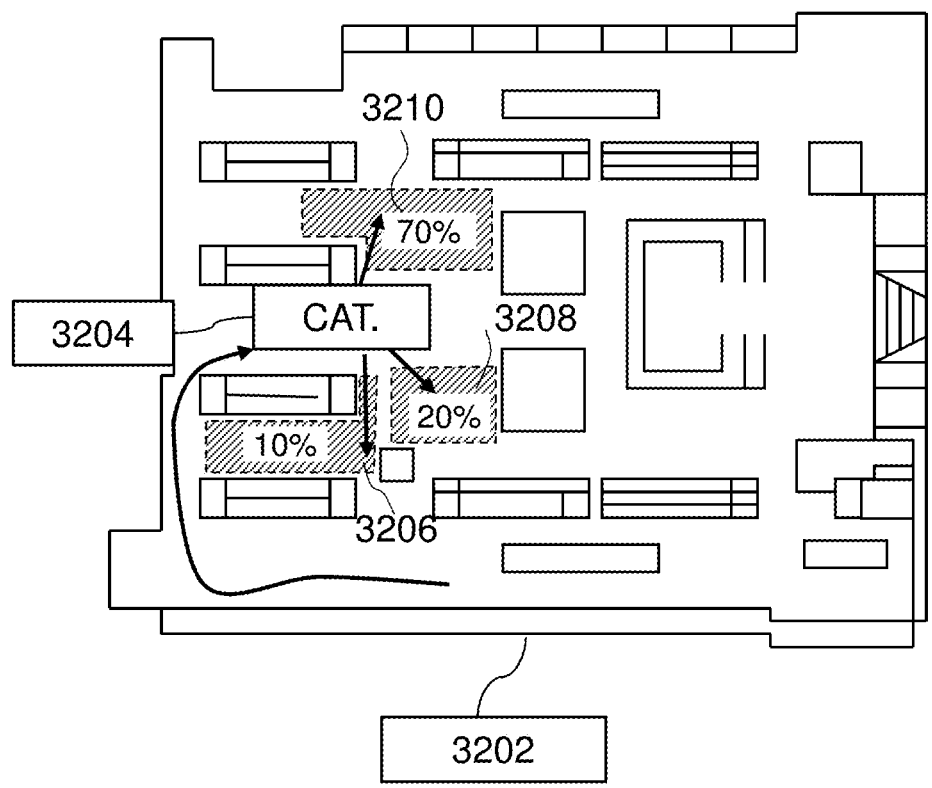
FIG. 32 shows an example of dominant path calculation represented on a store map.

FIG. 32 shows a preferred embodiment of dominant path measurements in a form of a map. On the map 3202 of a retail store, there is a category 3204 for which dominant path 3100 is measured. From the category 3204, shoppers can travel to Category A 3206, category B 3208, or category C 3210. Furthermore, the percentages of people who visited the original category XX and then visited category A 3206, category B 3208, or category C 3210 are placed for numeric representation of dominant path 3100. From the shopper behavior analysis 1620, the dominant path 3100 is calculated, and it is determined that the dominant path 3100 is to category C 3210, where 70% of shoppers who visited the original category traveled immediately after. In another embodiment, the trajectories for the shoppers who visited the original category 3204 are overlaid on the store map 3202 for a visual representation of dominant path 3100.

Alternatively, dominant paths 3100 can be represented using quantitative measurements 3120 in the form of a table as seen in FIG. 33. The first table 3302 shows the raw numbers of traffic who traveled to categories A, B, and C from category X. In the above example, the dominant path 3100 from Category X is determined to be Category B. Of the total 171 of visitors to Category X, 76 visitors visited Category B after visiting Category X, which is the highest raw number found among the categories.

In the second table 3304, dominant path 3100 is shown in terms of the percentage of people who visit category X. For example, 30.4% of people who visit category X visit category A; 44.4% of people who visit category X visit category B, and 25.1% visit category C.

In the third table 3306, dominant path 3100 is shown in terms of transition probability. The transition probability is calculated according to the method in FIG. 31. In the table 3306, the likelihood of a shopper to travel to category A is 0.35; the likelihood of a shopper to travel to category B is 0.40, and the likelihood of a shopper to travel to category C is 0.25 on a 1.00-scale.

Determining dominant path 3100 offers a starting point for understanding shopper behavior and decision-making. After visiting Category X, shoppers may want to purchase items in Category B, and further analysis can evaluate possible explanations or trends. Retailers can also benefit from understanding dominant path by placing targeted marketing elements along the dominant path to expose more people to in-store marketing efforts.

Category Correlation

Figure 34:
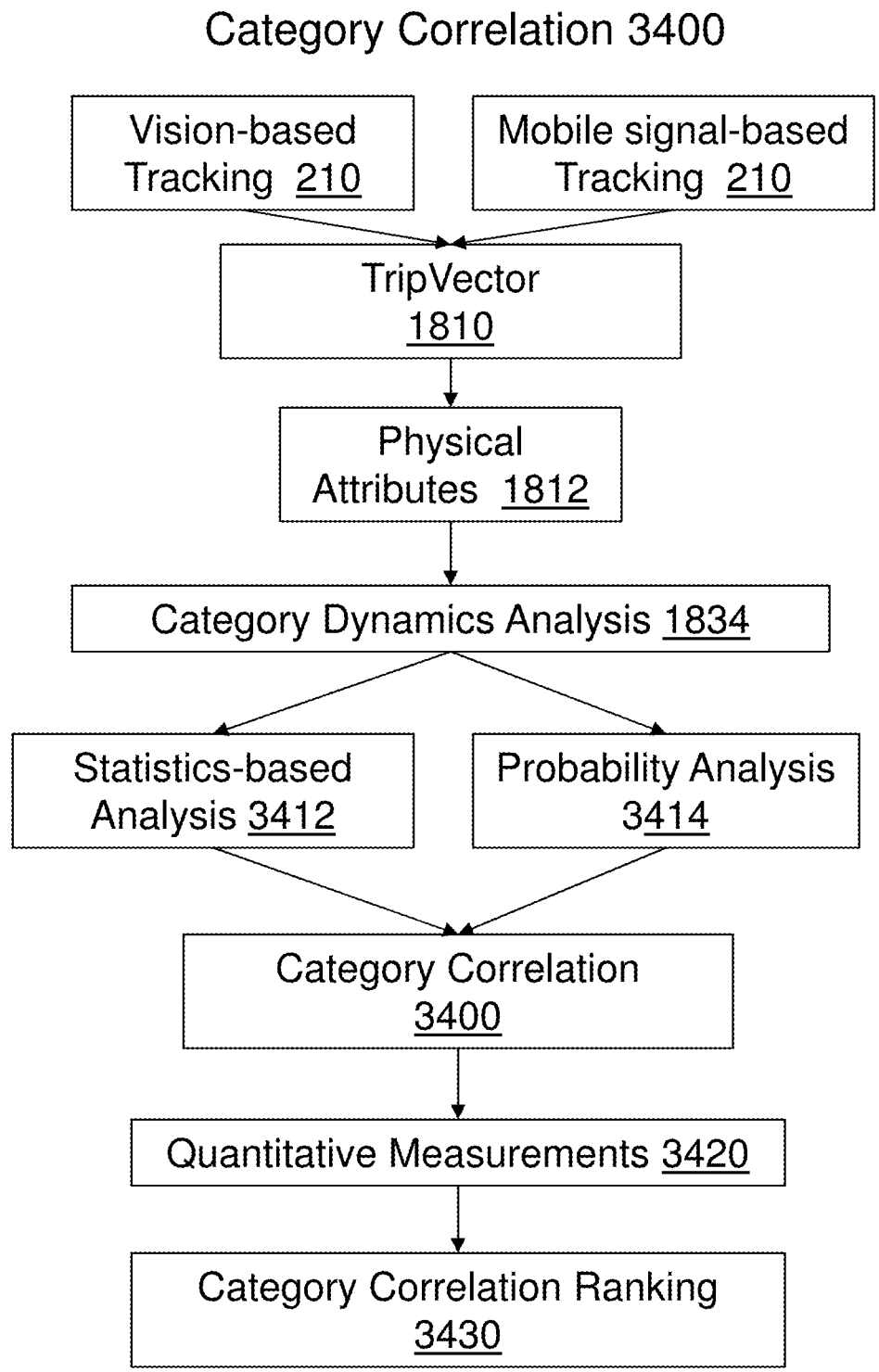
FIG. 34 shows a preferred method for calculating category correlation.

FIG. 34 shows an exemplary method for measuring category correlation 3400 between categories. Category correlation 3400 refers to as the frequency with which shoppers visit a group of categories together during one trip. The TripVectors 1810 of the visitors are used to measure the category correlation 3400. From the TripVector 1810 the physical attributes 1812 are collected for the shopper trajectory. The physical attributes 1812 may be collected from a TripVector 1810 collected from mobile signal-based tracking 220 or vision-based tracking 210 or both. The physical attributes 1812 of interest comprise the spatial coordinates for the shopper trajectories.

In the category dynamics analysis 1834, the spatial coordinates, are associated with the relevant categories on the store map, which indicates in which categories the individual shopped. In one embodiment, the category correlation is calculated using a statistics-based analysis 3412 using a method used for dominant path as described in FIG. 31. In another embodiment, the category correlation is measured using a probability analysis method 3414. In the probability analysis module 3414, the category correlation 3400 is directly derived from the HMM model trained with the past histories of the TripVectors 1810 of visitors stored in a database following a similar method as described in FIG. 31. The category correlation 3400 is then represented by the transition probability between a pair of adjacent category states.

The category correlation module 3400 yields quantitative measurements 3420. Categories that are shopped together can be represented in unordered 2-tuples categories or higher dimensional groupings.

The occurrences of a grouping of categories are then compared to other groupings of categories and then ranked according to frequency of occurrence in the category correlation ranking module 3430.

Figure 35:
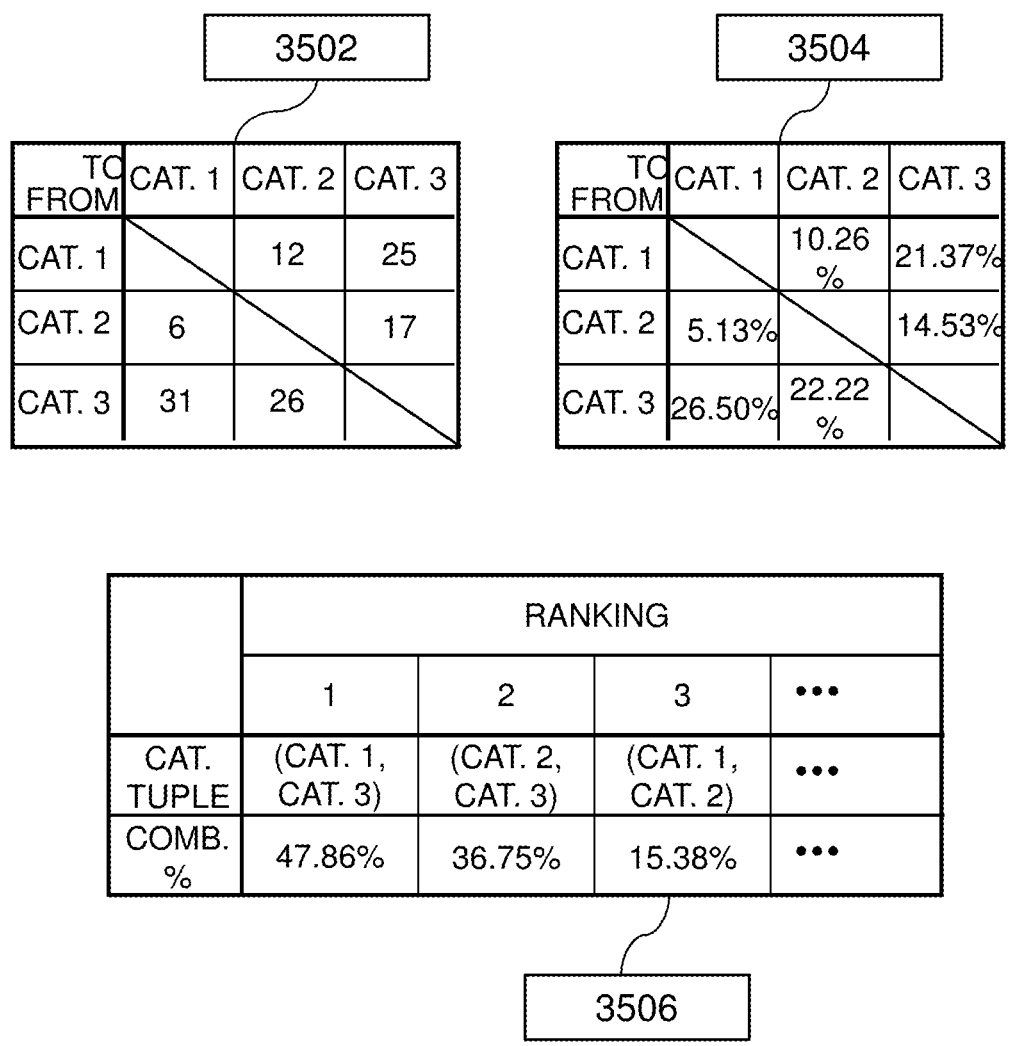
FIG. 35 shows an example of category correlation calculation represented in the form of quantitative measurements.

FIG. 35 shows exemplary method of using statistics-based analysis method to calculate quantitative measurement tables 3502, 3504, 3506 of 2-tuples of categories, or the trips made from one category to another category in the 2-tuples counted. In other embodiments, groupings can comprise more than two categories. The first table 3502 shows the unit count of two categories occurring in the same shopper trajectory over a predefined period of time. Table 3502 also indicates from category correlation taking into account sequential order of the categories visited in a trip. For example, 12 trips were made from Category 1 to Category 2, 25 trips were made from Category 1 to Category 3, and 6 trips were made from Category 2 to Category 1. The second table 3504 represents the same information in table 3502, but instead of unit counts, the table shows the percentage shares of the category groupings.

The two tables 3502, 3504 represent the method of calculating the occurrences of two categories in a single trip. From the first table 3502, the total number of trips made in these categories was 117, and the total number of trips is further broken down by category groupings. As seen in the first table CC, 12 trips were made from Category 1 to 2, and 25 trips were made from Category 1 to 3. 6 trips were made from Category 2 to 1, and 17 were made from Category 2 to 3. 31 trips were made from Category 3 to 1, and 26 were made from 3 to 2. From these results, the percentage of category grouping occurrences can be calculated as seen in the second table 3504. For example, from the above results, we know that 10.26% of the trips made were from Category 1 to 2, and 21.37% of trips made were from Category 1 to 3.

Using these percentages, the ranking of categories can be calculated as seen in the third table 3506. From the rankings table 3506, it appears that the occurrence of Categories 1 and 3 in a single trip are the most frequent of trips made. The rankings table 3506 takes into account both trips made from Category 1 to 3 and from Category 3 to 1 and therefore reflects an unordered grouping or a category correlation. One application of the ranking system is to then optimize distances from Category 1 and 3 to take advantage of the correlation. Another application is to using marketing elements in Category 1 for products found in Category 3 or vice-versa.

Category Sequence

Figure 36:
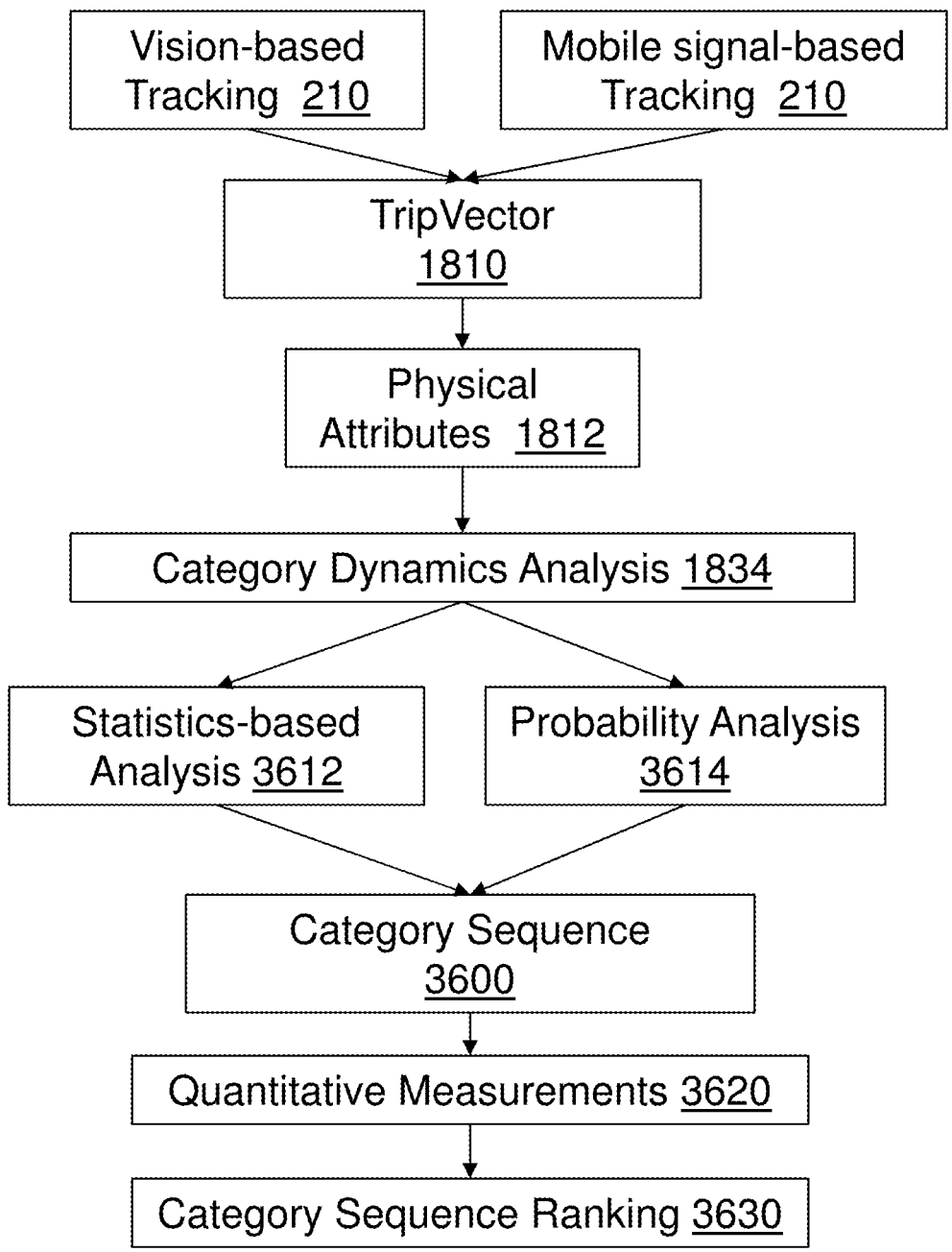
FIG. 36 shows a preferred method for calculating category sequence.

FIG. 36 shows an exemplary method for measuring category sequence among multiple categories. The category sequence measurement process analyzes trip information for shoppers in terms of order of categories visited. The purpose of category sequence measurement is to measure what is the most frequent occurrence of two or more categories in a single shopping trip taking into account the order of the categories visited. The method for measuring category sequence is similar to the method of calculating category correlation as found in FIG. 34. From the TripVector 1810, the physical attributes 1812 comprising the spatial coordinates of a shopper are collected. The physical attributes 1812 may be collected from a TripVector 1810 collected from Wi-Fi or vision-based tracking or both.

In the case of a TripVector 1810 calculated from vision-based tracking, the category sequence 3600 can be directly derived from the aforementioned HMM model trained with the past histories of the TripVectors 1810 of visitors stored in a database. It made possible since the HMM model is based on a directed graph that inherently possesses the directionality between categories. In the case of Wi-Fi based tracking, category sequence 3600 can be measured by tracking occurrences of the unique MAC address of a shopper's device and the associated timestamps by category. The occurrences and the associated timestamps are stored in a database for later category sequence analysis.

In the category dynamics analysis 1834, the spatial coordinates, are associated with the relevant categories on the store map, which indicates in which categories the individual shopped. In one embodiment, the category sequence is calculated using a statistics-based analysis 3612 similar to the method used for dominant path in FIG. 31. In another embodiment, the category sequence 3600 is measured using a probability analysis method 3614. In the probability analysis module, the category correlation 3600 is directly derived from the HMM model trained with the past histories of the TripVectors 1810 of visitors stored in a database using a similar method to that described in FIG. 31. The category sequence 3600 is then represented by the transition probability between a pair of adjacent category states.

The category sequence module 3600 yields quantitative measurements 3620. Categories that are shopped together can be represented in ordered 2-tuples categories or higher dimensional groupings. The occurrences of a grouping of categories are then compared to other groupings of categories and then ranked according to frequency of occurrence in the category sequence ranking module 3630.

FIG. 37 shows an exemplary embodiment of the statistic-based analysis method 3612 which yields quantitative measurements 3620 necessary for category sequence ranking 3630. Identical to the category correlation embodiment found in FIG. 35, the first table 3502 shows the unit count for grouping of trips made from a category to another category. The second table 3504 shows the percentage share of the groupings. The two tables 3502, 3504 are the same as found in the category correlation module for quantitative measurements 3620, and the methods for their calculation are the same. However the ranking system accounts for sequence of categories, as seen in the table 3702.

In this ranking system, the percentages reflect the sequences of categories. In this example, shoppers traveled from Category 3 to 1 the most frequently, from Category 3 to 2 second most frequently, etc. An application for the category sequence measurement might be optimizing marketing elements to market items found in Category 1 in the Category 3 area to take advantage of the most frequent shopper trip sequence.

In another exemplary embodiment, the present invention also measures the frequency with which a certain category is visited first, second, third . . . nth, in a shopping trip. FIG. 38 represents an exemplary embodiment of category sequence measurement.

The table 3802 presents the raw number of visits in the position of sequence for each category. For example, in Category 1, for 13 trips, Category 1 was the first category visited in the sequence of the trip, and for 28 trips, Category 1 was the third category visited in the sequence of the trip. From the table 3802, the frequency with which Category 1 appears in Position 1, 2, 3, etc. can be calculated.

The table 3804 shows the percentage of Category 1 appearing in each position of sequence. In this case, Category 1 is most frequently the second category visited in a given shopping trip. With this information, retailers can better plan store layouts or marketing efforts.

Filtering- and Segmentation-Based Shopper Metrics

Figure 39:
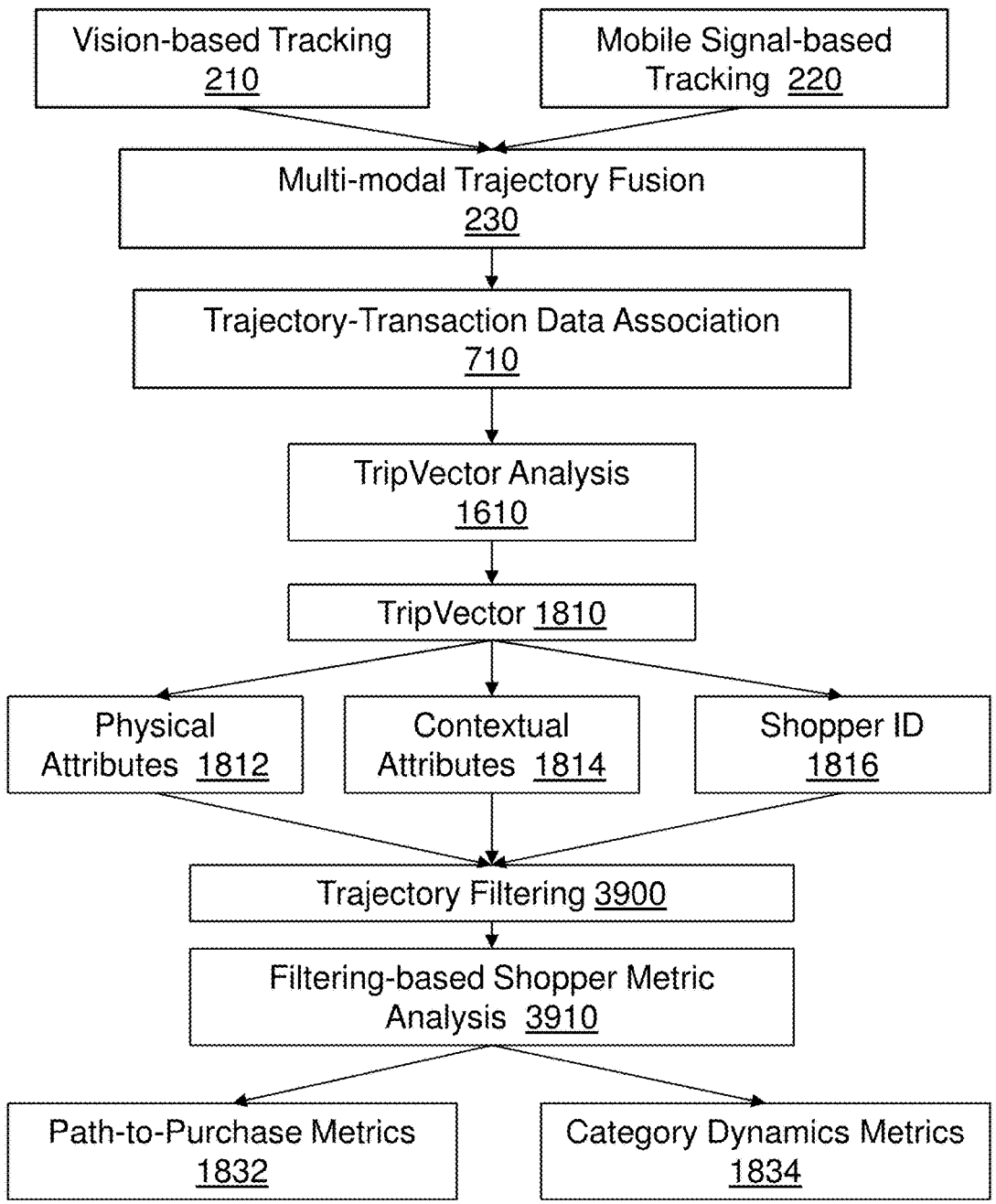
FIG. 39 shows a preferred method for trajectory filtering and filtering-based shopper metric analysis.

FIG. 39 shows an exemplary embodiment for trajectory filtering 3900 used in a filtering-based shopper metric analysis 3910. In cases where both mobile signal-based 220 and vision-based tracking 210 is possible, the shopper trajectories which come from the multi-modal trajectory fusion 230 process are uniquely identified by the MAC address and its associated transaction data through the trajectory-transaction data association 710 module. In the TripVector analysis 1610 module, the resulting TripVector 1810 is collected for the shopper trajectories and comprise a set of physical 1812 and contextual 1814 attributes and a unique shopper ID 1816 based on the trajectory-transaction data association 710 module. Because of this unique identification 1816, the present method is able to associate other sources of information to the TripVector 1810 for a shopper trajectory such as loyalty data, demographics, purchase history, transaction data, etc. For example, many retail chains use loyalty card programs which keep track of household and shopper information and associate those information sets with transaction data. The present invention can filter out trajectories based on an associated data in the trajectory filtering 3900 module. For example, in this module, the retailer may want a comparison of shopping action distributions of people who purchased from Category 1 compared to the shopping action distributions of total visitors in the store. The present invention can filter the transaction data and the associated trajectories for people who only purchased items from Category 1. The trajectories that, in this case for shoppers who purchased from Category 1, undergo filtering-based shopper metric analysis 3910 to generate path-to-purchase metrics 1832 or category dynamics metrics 1834. Filtering-based shopper metric analysis 3910 uses the same methods of shopper behavior analysis 1620 described in FIG. 18, but the TripVectors 1810 have undergone trajectory filtering 3900. It would be possible then to analyze the shopping action distribution of that subset of shoppers in comparison to the shopping action distribution of the total traffic in the store.

Figure 40:
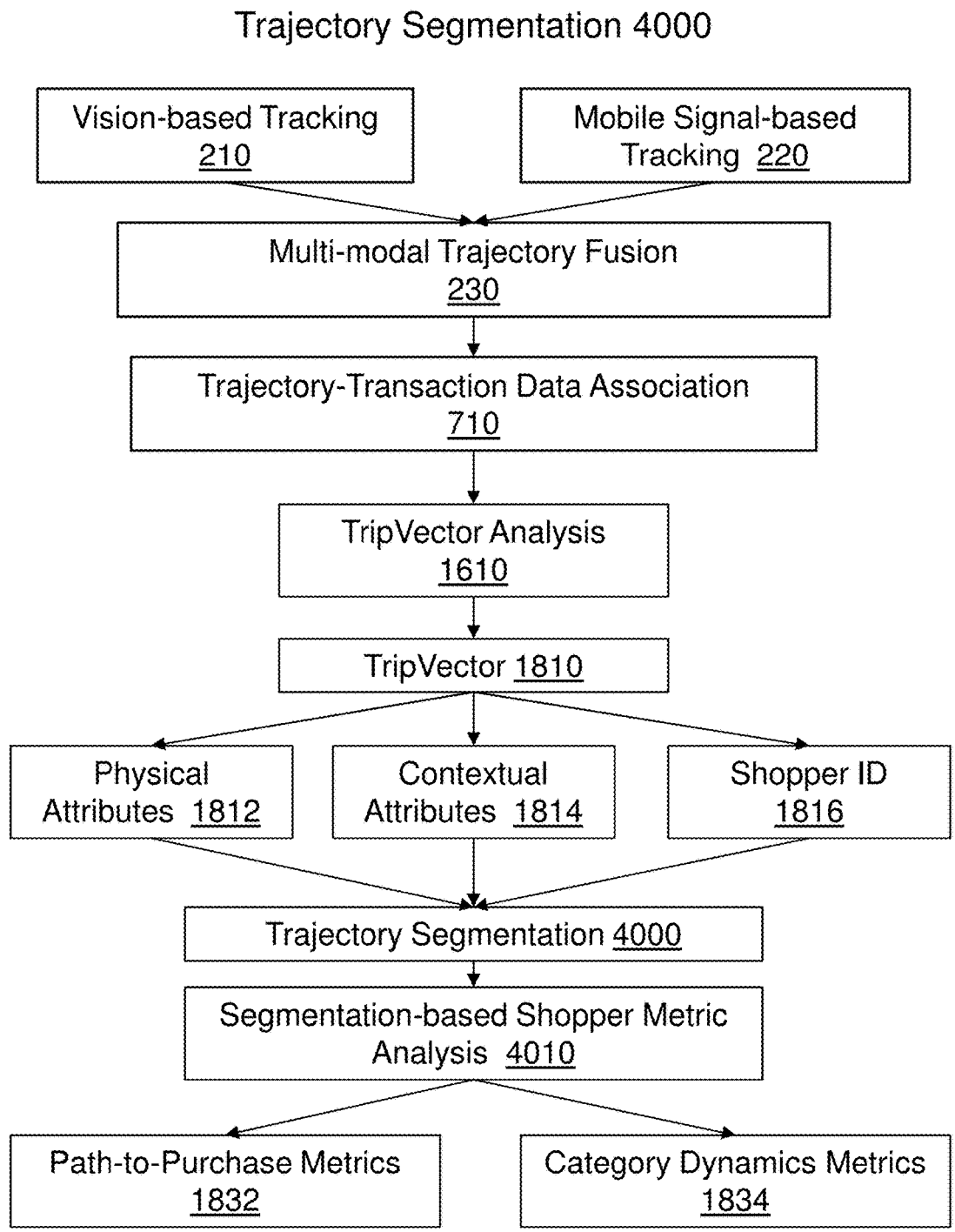
FIG. 40 shows an exemplary method for trajectory segmentation and segmentation-based shopper metric analysis.

FIG. 40 shows a preferred method for segmentation in the present invention. Similar to the trajectory filtering 3900 method in FIG. 39, the trajectory segmentation 4000 method relies on a unique identification, the MAC address, associated with the TripVector 1810, which is collected in the TripVector analysis 1610 module. The TripVector 1810 is associated with the unique shopper ID 1816 in addition to any other relevant data sets such as loyalty card information, transaction data, etc. gathered from the trajectory-transaction data association 710 module. Based on these datasets, in the trajectory segmentation 4000 module, the TripVectors 1810 of shopper trajectories are labeled by group classifications in order to segment the TripVectors 1810 and the associated shopper trajectories by groups. For example, the TripVectors 1810 may be segmented by trip types such as stock-up, milk run, etc., which are determined from the transaction data which can help determine the purpose of the trip.

Once segmented in the trajectory segmentation 4000 module, the TripVectors 1810 undergo segmentation-based shopper metric analysis 4010 to generate path-to-purchase metrics 1832 or category dynamics metrics 1834. Segmentation-based shopper metric analysis 4010 uses the same methods of shopper behavior analysis 1620 described in FIG. 18, but the TripVectors 1810 have undergone trajectory segmentation 4000. In this embodiment, shopper behavior metrics are segmented according to the TripVector 1810 group classification. Trajectory segmentation 4000 of TripVectors 1810 enables more granular analysis and comparison between different shopper groups.

Shopper Behavior Analytics: Use-Cases of Four Different Configurations

In this section, the shopper behavior metrics described in the above section are adapted for the four different sensing configurations in terms of Wi-Fi and vision-based tracking coverage.

Full Video/Full Mobile Configuration

Figure 41:
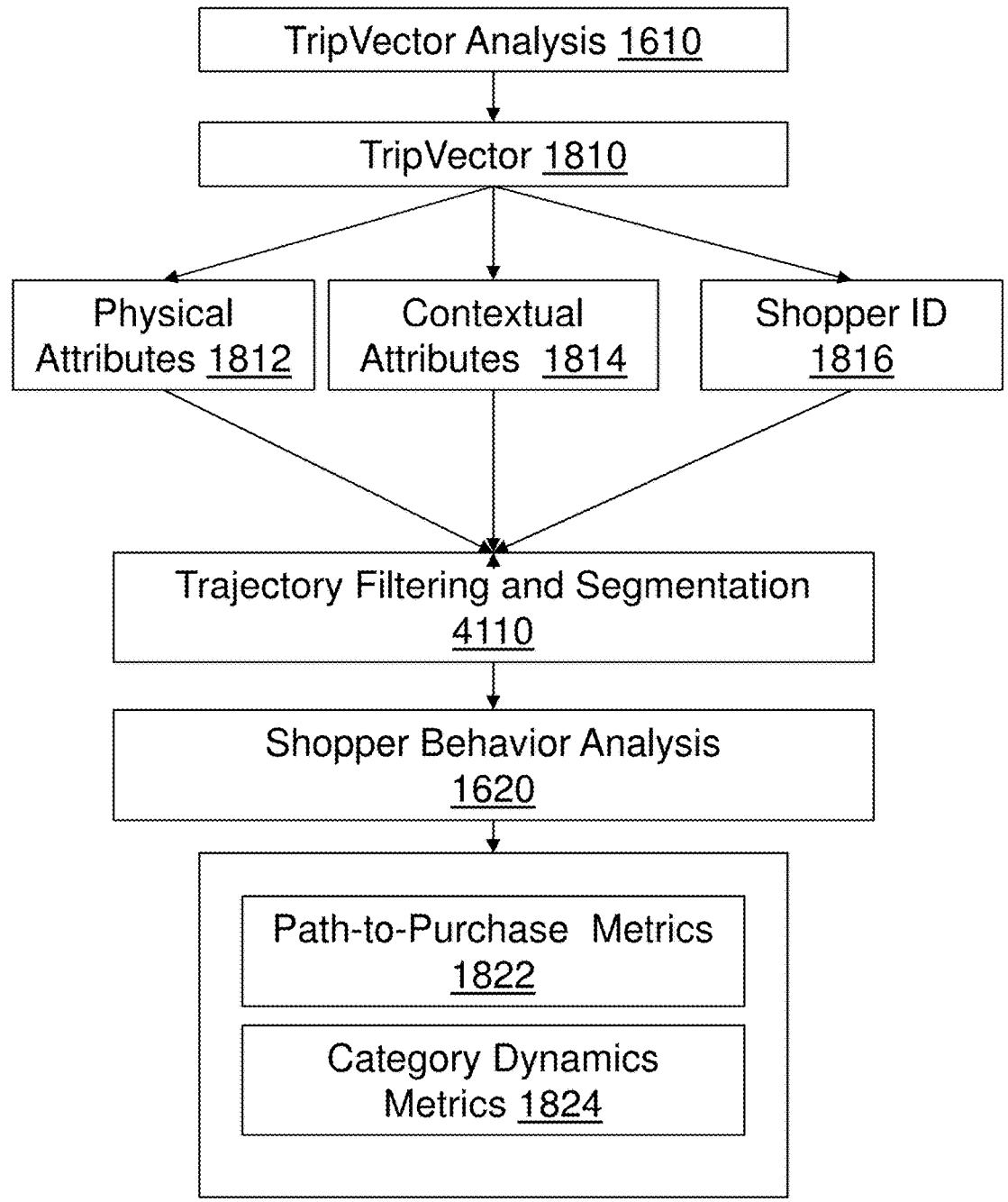
FIG. 41 shows an exemplary method for shopper behavior analysis in a full mobile and full video sensor coverage configuration.

FIG. 41 shows a preferred embodiment of the shopper behavior analysis 1620 overview for a configuration of sensors where mobile and vision tracking are possible throughout the entire retail space.

TripVector

Figure 42:
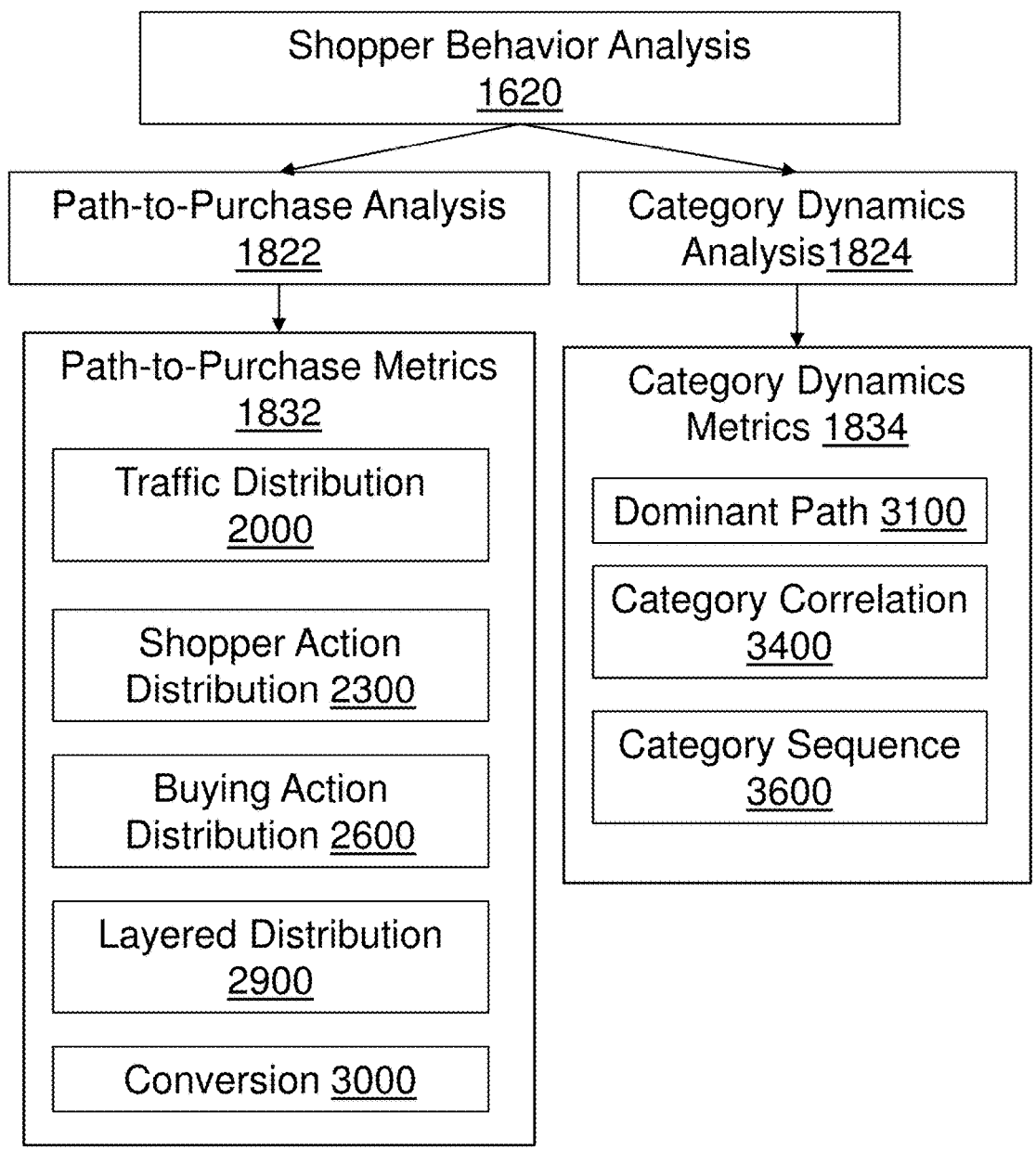
FIG. 42 shows a preferred method for calculating shopper behavior metrics in a full mobile and full video sensor coverage configuration.

In this configuration, mobile and vision sensors are deployed so as to track shopper activity throughout the entire retail space. Because tracking is possible throughout the store using the two sensing modalities, the TripVector 1810 for this configuration contains the most information possible about the physical 1812 and contextual 1814 attributes of a shopper trajectory and the unique shopper ID 1816, which is the unique MAC identification in this configuration. The aggregate TripVectors 1810 of shoppers comprise the input data for the shopper behavior analysis modules 1620. From the shopper behavior analysis module 1620, shopper metrics including path-to-purchase shopper metrics 1822 and category-specific shopper metrics 1824 are calculated as described in FIG. 42.

Path-to-Purchase Analysis

This configuration has the benefit of the relative accuracy of vision-based tracking 210 and the consistent identification of mobile signal-based tracking 220 throughout the entire retail store. Therefore, all store-wide metrics pertaining to traffic 2000, shopping action 2300, and buying action 2600 distributions are possible as outlined in FIG. 42.

Traffic Distribution

In this configuration, it is possible to obtain and aggregate the required TripVector 1810 information, i.e. the physical attributes 1812 of the shopper trajectories to generate both maps and quantitative measurements for store-level and category-level traffic distributions 2000 using the methods described previously in FIG. 20.

Shopping Action Distribution

Shopping action distribution 2300 measurement requires the collection of TripVector 1810 information comprising its contextual attributes 1814 or at least detection of detailed shopping actions with no tracking identification. Because the contextual attributes 1814 of TripVectors 1810 essentially consist of a set of pre-defined detailed shopping actions, measuring shopping action distributions 2300 requires an involvement of vision-based tracking or detection at least partially as mentioned in FIG. 23. Given that vision-based tracking 210 is possible for persons throughout the store, it is possible to calculate shopping action distributions 2300 on the store-2612 and category-levels 2614 in this configuration. The shopping action distributions 2300 can be represented on a map 2622 or through quantitative measurements 2624.

Buying Action Distribution

In this configuration, buying activity can be determined using the trajectory-transaction association (TT Association) 710 module since the configuration has full coverage in both modalities. Through the association of transactions, or final purchases, with the shopping fixation points along the trajectory, or point of pickup for purchase, the present invention can measure the buying action distributions 2600 and represent that metric either through a generated map 2622 or quantitative measurements 2624 on the store-2612 and category-levels 2614 as found in the buying action distribution 2600 method described in FIG. 26.

Layered Map Generation

Layered distributions refer to overlaying different types of distribution such as traffic 2000, shopping 2300, or buying action 2600 distributions on a same store layout for comparative purposes. In this configuration, layered maps such as that described in FIG. 29 may be generated on either the store- or category-levels because traffic 2000, shopping action 2300, and buying action 2600 distributions can be calculated and represented on a map for both store- and category-levels.

Conversion Calculation

Conversion is possible in this configuration. Conversion 3000 is a comparative method which indicates the percentage of persons converted from traffic to shopping to buying or any combination thereof. In this configuration, conversion calculation 3010 can be completed on the store-level 3012 or category-level 3014 because traffic 2000, shopping action 2300 and buying action 2600 distributions can be measured. Store-level 3012 conversion refers to the percentage of people converted from traffic to shopping to buying or any combination thereof throughout the entire retail space. Category-level conversion 3014 refers to the percentage of people converted from traffic to shopping to buying or any combination thereof in a particular category of interest.

Category Dynamics Analysis

This configuration has the benefit of the relative accuracy of vision-based tracking 210 and the consistent identification of mobile-signal based tracking 220 throughout the entire retail store. Therefore, all category-specific metrics pertaining to dominant path 3100, category correlation 3400, and category sequence 3600 are possible as outlined in FIG. 42.

Dominant Path

In this configuration, dominant path 3100 is calculated using the method described in FIG. 31. Measuring dominant path 3100 requires either vision-tracking 210 or mobile signal-based tracking 220 of shopper paths in a particular category of interest. The TripVector 1810 information collected from vision-tracking 210 or mobile signal-based tracking 220 is the input data for dominant path 3100 analysis. The method to calculate dominant path 3100 in this configuration follows an identical approach to the one found in FIG. 31. Because of the full coverage of both vision and Wi-Fi sensors, dominant path 3100 can be calculate for any category or categories within the retail space.

Category Correlation

In this configuration, category correlation 3400 is measured using the method described in FIG. 24. Category correlation 3400 requires TripVector 1810 information generated from either vision-210 or mobile signal-based 220 tracking.

In the case of mobile signal-based 220 tracking, the physical location or presence of a shopper can be detected in categories of interest by tracking the shopper ID 1816 or the unique MAC address of the shopper across multiple categories. The categories for which a single MAC address is detected are collected and stored for later analysis according to the method described in FIG. 34. In the case of vision-tracking 220, it is possible to derive category correlation 3400 using a HMM model trained with the past histories of the TripVectors 1810 of visitors stored in the database according to the method described in FIG. 34.

In one embodiment, the output of the category correlation 3400 analysis module is a table which shows the frequency of category groupings as outlined in FIG. 35. In another embodiment, an output of the category correlation 3400 analysis module is a table which ranks the frequency of category groupings as discussed in FIG. 35.

Category Sequence

In this configuration, category sequence 3600 is measured using the method described in FIG. 36. Category sequence measurement requires TripVector 1810 information generated from either vision-210 or Wi-Fi based 220 tracking.

In the case of Wi-Fi based tracking 220, the physical location or presence of a shopper can be detected in categories of interest by tracking the shopper ID 1816 or the unique MAC address of the shopper across multiple categories along with loose timestamps. The categories for which a single MAC address is detected and the associated timestamps are collected and stored for later analysis. In the case of vision-tracking 220, it is possible to derive category correlation 300 using a HMM model trained with the past histories of the TripVectors 1810 of visitors stored in the database.

In one embodiment, the output of the category sequence analysis 3600 module is a table which shows the frequency of category groupings in a particular order as outlined in FIG. 36. In another embodiment, an output of the category sequence analysis 3600 module is a table which ranks the frequency of ordered category groupings as discussed in FIG. 36.

Filtering and Segmentation

FIG. 41 shows a preferred embodiment of filtering and segmenting capabilities in the full mobile and full video coverage configuration. In cases where both mobile signal-based 220 and vision-based tracking 210 are possible, the shopper trajectories and the resulting TripVector 1810 information is uniquely identified by the unique shopper ID 1816, in this case, the unique MAC address. Because of this unique identification, other datasets including loyalty data, demographics, purchase history, and transaction data can be associated with the MAC address and the associated trajectory. In the present invention has the ability to filter and segment the trajectories in the filtering and segmentation module 4110. The method for filtering and segmentation is the same method as discussed in FIGS. 39 and 40 respectively. The filtered trajectories are then analyzed in the shopper behavior analysis 1620 modules according to desired characteristics found in these datasets. Because mobile signal-based tracking 220 is possible throughout the store, it is possible to segment or filter all trajectories used for shopping behavior analysis 1620 to then generate path-to-purchase metrics 1822 and category-specific shopper metrics 1824.

Partial Video and Full Mobile Configuration

Figure 43:
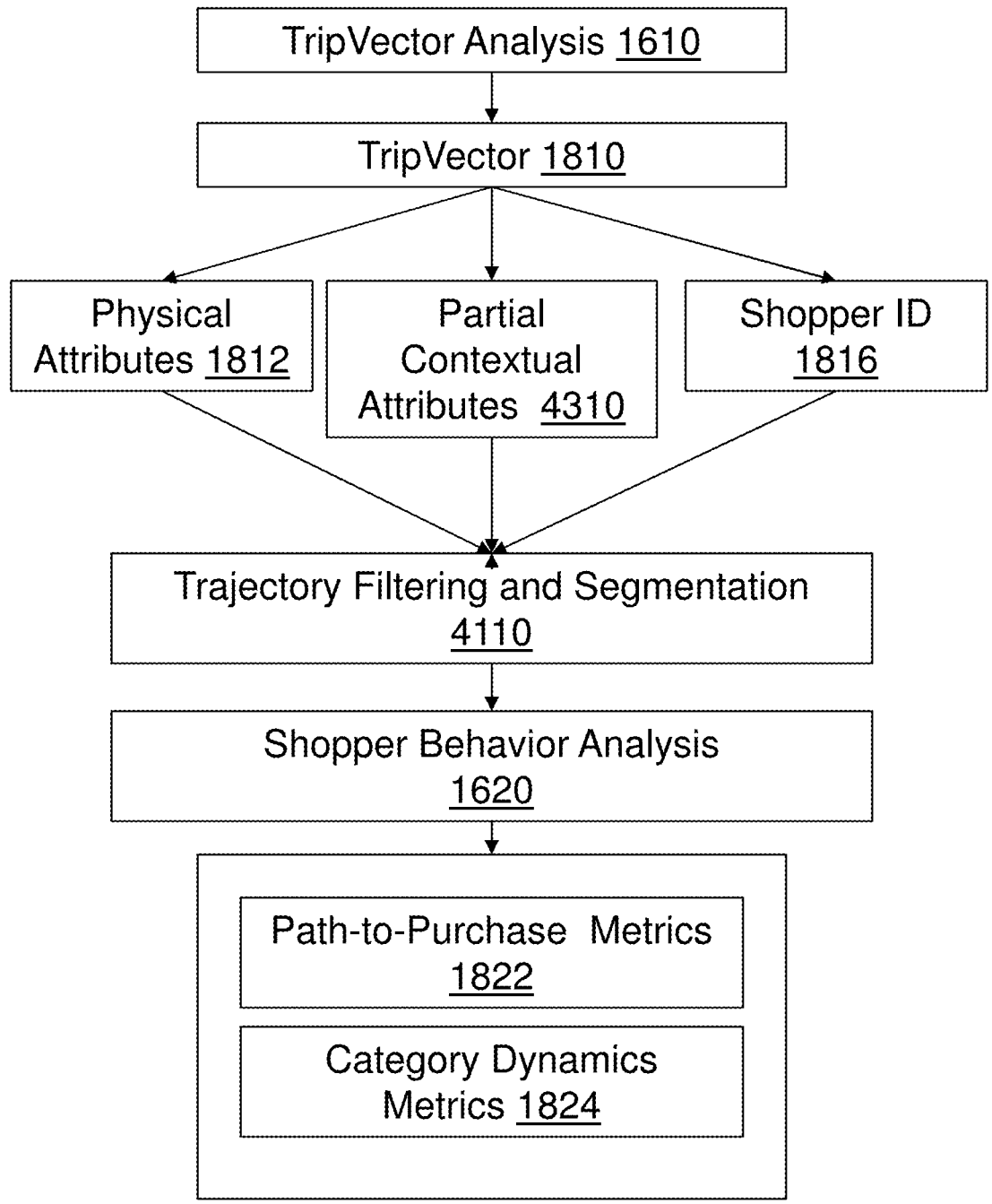
FIG. 43 shows an exemplary method for shopper behavior analysis in a full mobile and partial video sensor coverage configuration.

FIG. 43 shows a preferred embodiment of the path-to-purchase metrics 1820 overview for a configuration of sensors where mobile tracking 220 are possible throughout the entire retail space and vision tracking 210 is possible in areas of interest where vision sensors are deployed.

TripVector

In this configuration, Wi-Fi and vision sensors are deployed with a level of density so as to cover the entire retail space with Wi-Fi sensing and predetermined areas of interest with vision-sensing. Mobile-signal based tracking 220 occurs throughout the store for persons while vision-tracking 210 occurs in areas of interest where both vision and Wi-Fi sensors are deployed. The resulting fused trajectory comprises parts where only Wi-Fi tracks are used and parts where both Wi-Fi tracks and vision tracks are fused using the method described in FIG. 2.

The TripVector 1810 information is collected for the fused trajectory. For the parts of the trajectory where only the Wi-Fi trajectory is used, contextual attributes 1814 cannot be collected while physical attributes can be collected for the shopper for the entire trajectory. For the parts of the trajectory where it is fused using vision and Wi-Fi trajectories, TripVector 1810 information comprising physical 1812 and contextual attributes 1814 may be collected. Therefore, only partial contextual attributes 4310 can be collected for the shopper trajectory.

Path-to-Purchase Analysis

Figure 44:
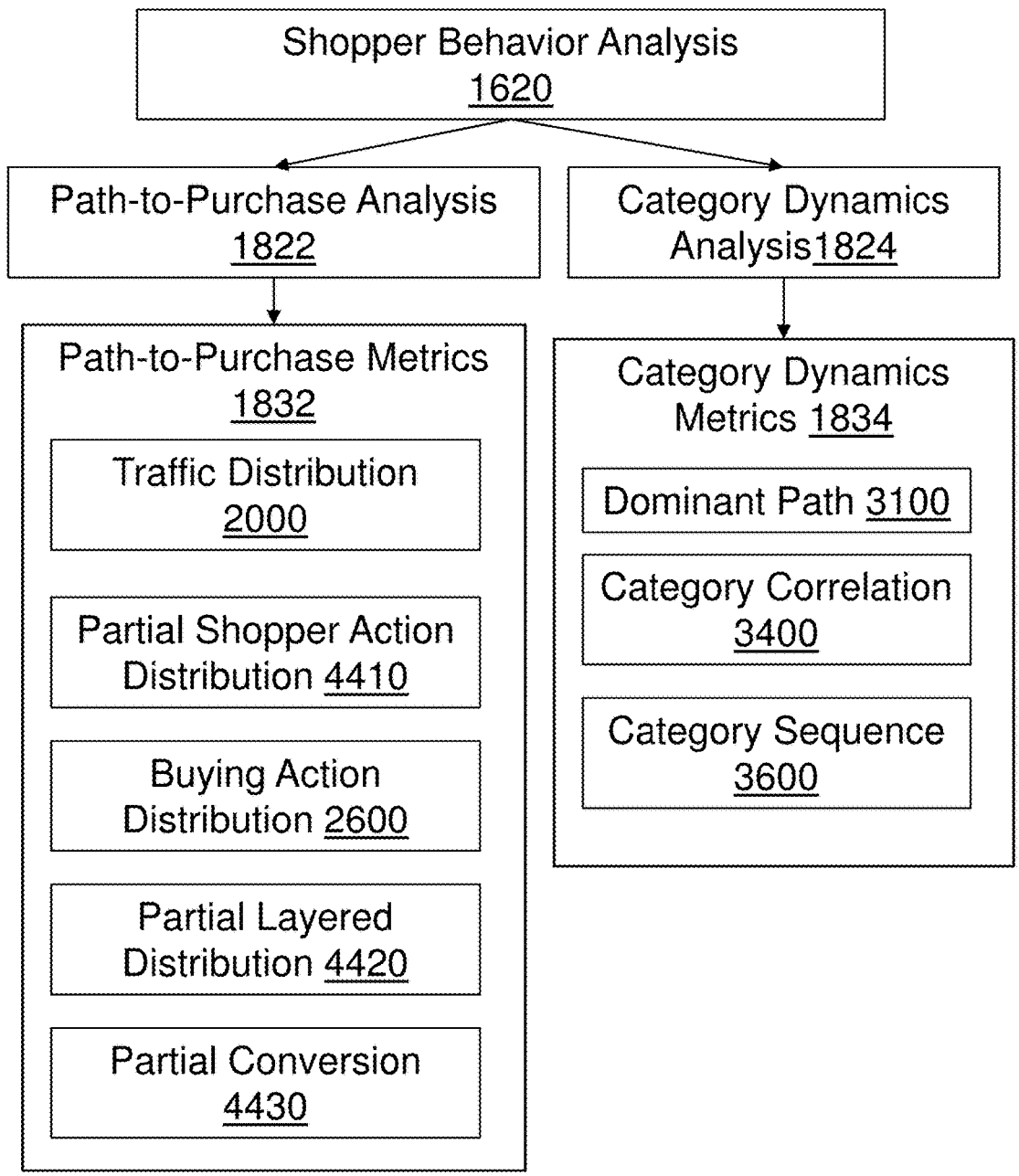
FIG. 44 shows a preferred method for calculating shopper behavior metrics in a full mobile and partial video sensor coverage configuration.

FIG. 44 describes the behavior analytics applications overview and the possible path-to-purchase metrics 1822 and category dynamics metrics 1824 in the full mobile and partial vision configuration. In this configuration, the present invention is able to measure traffic distribution 2000 using the same method as described in FIG. 20. Partial shopper action distribution 4410 can be measured in the present configuration for areas where vision sensors are deployed. Buying action 2600 can be measured using the same method as described in FIG. 26. Partial layered distribution 4420 and partial conversion 4430 are possible for areas where vision sensors are deployed.

Traffic Distribution

In this configuration, it is possible to measure traffic distribution 2000 using TripVector 1810 information collected from mobile-signal based tracking 220 or vision-tracking 210. TripVector 1810 information from mobile signal-based tracking 220 comprises physical attributes 1812 such as physical locations of the shopper and loose timestamps for said physical locations. Although the sampling frequency and accuracy is lower relative to that of vision-based tracking 210, if there are enough samples presents and there is no bias in one direction, traffic distribution 2000 can be accurately measured.

In this configuration, it is possible to obtain the required TripVector 1810 information for store-level 2002 and category-level 2004 traffic distribution measurements as described in FIG. 20. Traffic distributions 2000 can be represented by map generation 2012 or quantitative measurements 2014 as described in FIG. 20.

Shopping Action Distribution

Shopping action distributions 2300 require vision-tracking because shopping activity requires a higher degree of detail in tracking than is possible through mobile signal-based tracking 220 as mentioned previously. In this configuration, partial shopping action distribution 4410 measurements are possible in particular areas or categories of interest where vision sensors are deployed. The partial shopping action distributions 4410 can be represented on a map or through quantitative measurements using the same methods described in FIGS. 24 and 25 respectively.

Buying Action Distribution

In this configuration, buying action distributions 2600 can be measured on the store-2612 and category-levels 2614 and represented by map generation 2622 or quantitative measurements 2624 according to the same method as described in FIG. 26. Mapping buying action distributions requires an association of trajectory and transaction data 710, which is possible in this configuration. For a given shopper, the present invention uses the synthetic trajectory 1404 most closely associated with the fused trajectory of that shopper as described in FIG. 14. The synthetic trajectory 1404 is a trajectory that includes the locations of all purchased items for a transaction.

A buying action distribution 2600 for a given shopper path can be represented by overlaying the synthetic trajectory 1404 over a store layout or a category layout. Quantitative measurements 2624 can also be calculated on the store- and category-levels including total count of buyers, count of buyers by category, or ratios comparing buyers by category to total buyers or buyers by another category using the method described in FIG. 28.

Layered Map Generation

Layered distribution 2900 refer to overlaying different types of distribution such as traffic, shopping, or buying action distributions on the same store layout for comparative purposes. In this configuration, partial layered distribution 4410 is possible. Partial layered distribution means that on the store level, layers can comprise store-level traffic 2002 and store-level buying action distributions 2612. For categories where vision sensors are not deployed, layers comprise category-level traffic 2004 and category-level buying action distributions 2614 for that particular category. For categories where vision sensors are deployed, layers comprise category-level traffic 2004, shopping action 2314, and buying action distributions 2614 for that particular category.

Conversion Calculation

Conversion 3000 is a comparative method which indicates the percentage of persons converted from traffic to shopping to buying or any combination thereof. In this configuration, partial conversion 4430 can be completed on the store-level or category-level. On the store-level, conversion can be calculated for store-level traffic 2002 and buying 2012, i.e. the percentage of traffic converted to buyers. Shopping action counts are not available on the store-level because vision sensors are not deployed throughout the entire store.

On the category-level where vision sensors are not deployed, conversion can be calculated for category-level traffic 2004 and buying action 2014 distributions. On the category-level where vision sensors are deployed, conversion can be calculated for category-level traffic 2004, shopping action 2314, and buying action 2614 distributions. For example, in a particular category with vision-sensing, the percentage of traffic converted to shopping, shopping converted to buying, or traffic converted to buying can be calculated.

Category Dynamics Analysis

Category-specific metrics require at least mobile signal-based tracking 220 capabilities for measurement. Because mobile-signal based tracking 220 is possible throughout the entire retail space in the full mobile and partial video configuration, all category-specific metrics pertaining to dominant path 3100, category correlation 3400, and category sequence 3600 are possible as outlined in FIG. 44.

Dominant Path

In this configuration, dominant path 3100 is calculated using the method described in FIG. 31. Measuring dominant path 3100 requires either vision-tracking 210 or mobile tracking 220 of shopper paths in a particular category of interest. The TripVector 1810 information collected from vision-tracking 210 or mobile tracking 220 is the input data for dominant path 3100 analysis. The method to calculate dominant path 3100 in this configuration follows an identical approach to the one found in FIG. 31. Because of the full coverage Wi-Fi sensors, dominant path 3100 can be calculate for any category or categories within the retail space.

Category Correlation

In this configuration, category correlation 3400 is measured using the method described in FIG. 24. Category correlation 3400 requires TripVector 1810 information generated from either vision-210 or mobile-signal based tracking 220. In this configuration, TripVectors are generated from mobile-signal based tracking 220.

In the case of mobile-signal based tracking 220, the physical location or presence of a shopper can be detected in categories of interest by tracking the shopper ID 1816 or the unique MAC address of the shopper across multiple categories. The categories for which a single MAC address is detected are collected and stored for later analysis.

In one embodiment, the output of the category correlation 3400 analysis module is a table which shows the frequency of category groupings as outlined in FIG. 35. In another embodiment, an output of the category correlation 3400 analysis module is a table which ranks the frequency of category groupings as discussed in the FIG. 35.

Category Sequence

In this configuration, category sequence 3600 is measured using the method described in FIG. 36. Category sequence measurement requires TripVector 1810 information generated from either vision-210 or Wi-Fi based 220 tracking. In this configuration, TripVectors are generated from mobile-signal based tracking 220.

In the case of Wi-Fi based tracking 220, the physical location or presence of a shopper can be detected in categories of interest by tracking the shopper ID 1816 or the unique MAC address of the shopper across multiple categories along with loose timestamps. The categories for which a single MAC address is detected and the associated timestamps are collected and stored for later analysis.

In one embodiment, the output of the category sequence analysis 3600 module is a table which shows the frequency of category groupings in a particular order as outlined in FIG. 36. In another embodiment, an output of the category sequence analysis 3600 module is a table which ranks the frequency of ordered category groupings as discussed in FIG. 36.

Filtering and Segmentation

FIG. 43 shows a preferred embodiment of filtering and segmenting capabilities in the full mobile and partial video coverage configuration. In cases where mobile-signal based tracking 220 is possible, the shopper trajectories and the resulting TripVector 1810 information is uniquely identified by the unique shopper ID 1816, in this case, the unique MAC address. Because of this unique identification, other datasets including loyalty data, demographics, purchase history, and transaction data can be associated with the MAC address and the associated trajectory. In the present invention has the ability to filter and segment the trajectories in the filtering and segmentation module 4110. The method for filtering and segmentation is the same method as discussed in FIGS. 39 and 40 respectively. The filtered trajectories are then analyzed in the shopper behavior analysis 1620 modules according to desired characteristics found in these datasets. Because Wi-Fi based tracking 220 is possible throughout the store, it is possible to segment or filter all trajectories used for shopping behavior analysis 1620.

Full Video and Partial Mobile Configuration

TripVector

Figure 45:
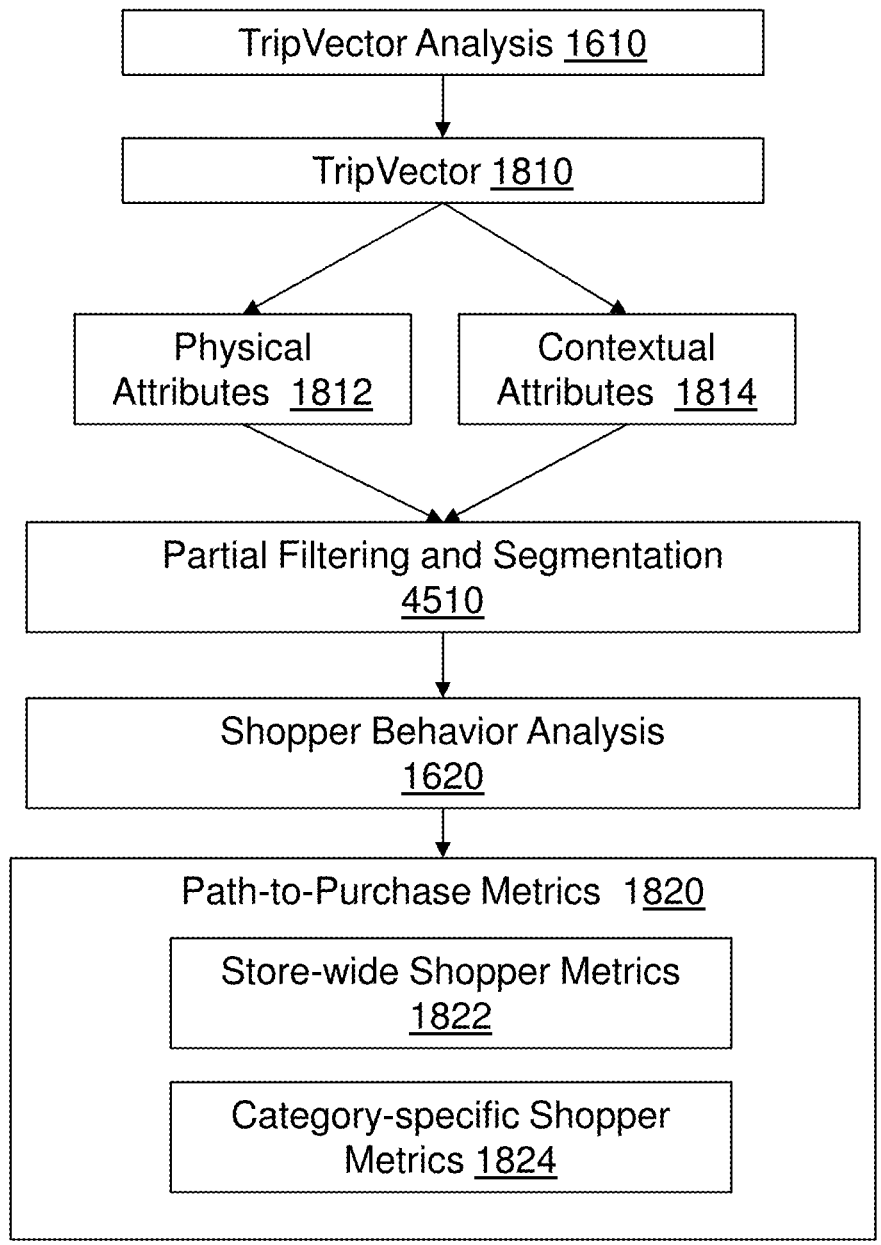
FIG. 45 shows an exemplary method for shopper behavior analysis in a partial mobile and full video sensor coverage configuration.

FIG. 45 shows a preferred embodiment of the shopper behavior analytics overview of the partial mobile and full video coverage configuration. In this configuration, visions sensors are deployed with sufficient density to track persons throughout the retail store, and Wi-Fi sensors are deployed with sufficient density to track persons within areas or categories of interest. Wi-Fi based tracking yields a partial Wi-Fi based trajectory for areas where Wi-Fi sensors are deployed. Because of the lack of a complete Wi-Fi trajectory, the vision-based trajectories for persons are collected for the entire store but do not have a consistent identification. However, mobile signal-based tracking 220 in areas of interest including entrance/exit, checkout, aisles of interest, etc. allows for the association of the transaction data with the unique identification, the MAC address as described in FIG. 15.

From the collection of vision-trajectories, the TripVector 1810 information comprises physical attributes 1812 including location, timestamp, head orientation, etc. and contextual attributes 1814 which represent shopper interactions with the retail elements. However, as mentioned, a unique identification cannot be associated with the TripVector information.

Path-to-Purchase Analysis

Figure 46:
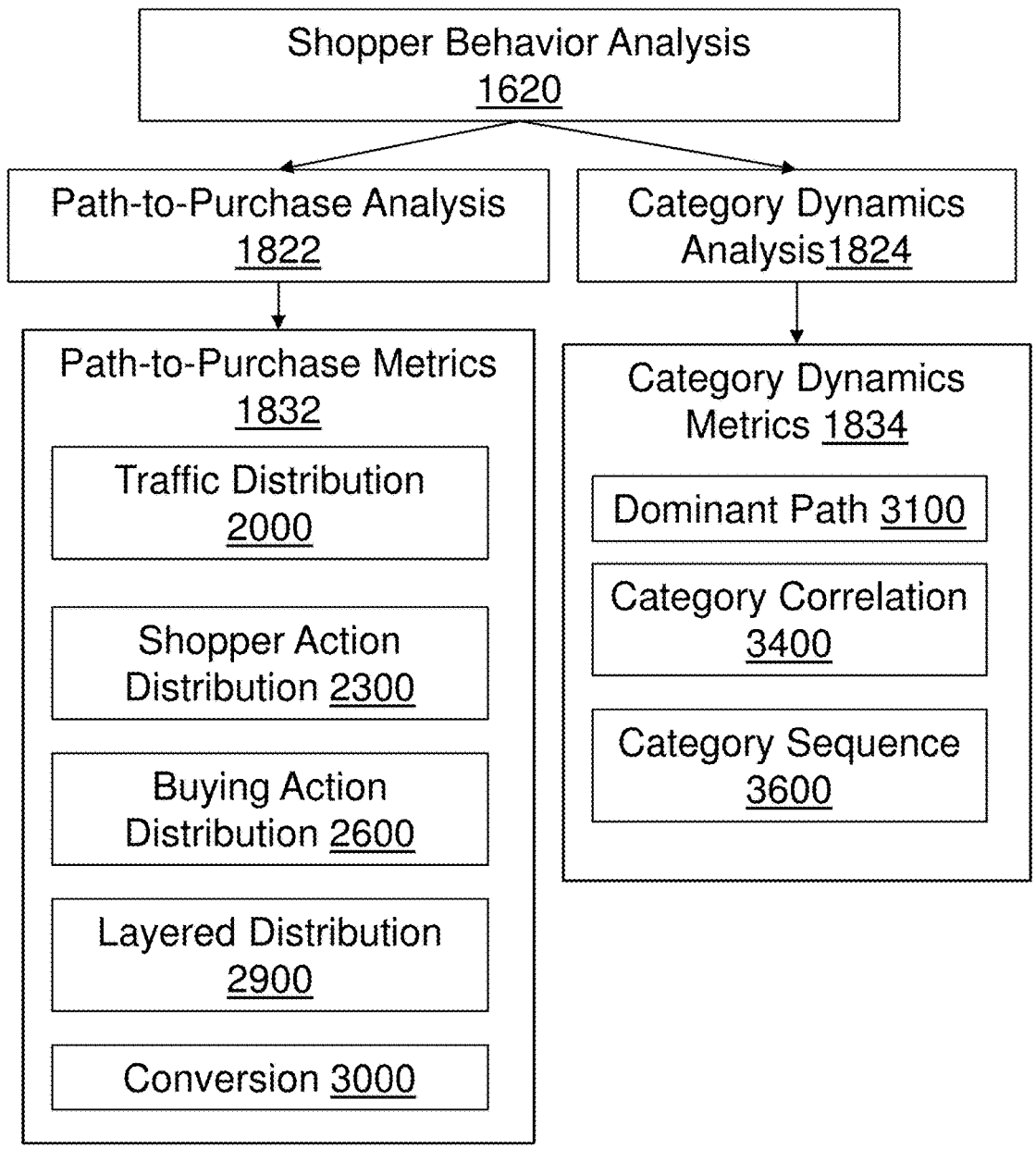
FIG. 46 shows a preferred method for calculating shopper behavior metrics in a partial mobile and full video sensor coverage configuration.

FIG. 46 describes the behavior analytics applications overview and the possible path-to-purchase metrics 1820 in the present configuration.

Traffic Distribution

In this configuration, it is possible to obtain the required TripVector 1810 information from the vision-trajectories including physical locations and timestamps in order to measure traffic distribution 2000 on the store-2002 and category-levels 2004 using the same method described in FIG. 20.

The trajectories are either overlaid on a store layout for visual map representation of traffic distribution through map generation 2012 or analyzed for quantitative measurements 2014 such as total traffic count, count by category, etc. The methods for map generation 2012 and quantitative measurements are the same as described in FIGS. 21 and 22 respectively. In another embodiment, for more granular analysis, relevant trajectories and the corresponding TripVector 1810 information may be overlaid on a category map or maybe be analyzed for quantitative measurements such as category traffic, traffic by sub-category, etc.

Shopping Action Distribution

Shopping action distributions 2300 require vision-tracking because shopping activity requires a higher degree of accuracy and detail in tracking than is possible through mobile-signal based tracking 220. In the present configuration, vision sensors are deployed so as to cover the entire store. Therefore, shopping action distribution 2300 measurement is possible for store-wide 2312 or category-specific 2314 shopping activity in the form of maps 2322 or quantitative measurements 2324. Shopping action distributions 2300 are measured and calculated using the methods found in FIG. 23-25.

Buying Action Distribution

In this configuration, complete trajectory-transaction association is not possible due to limited Wi-Fi tracking; however, aggregate buying action distribution 2600 measurements are still possible using only the transaction log data 2602 using a method similar to that found in FIG. 26. Using transaction log data 2602 over a given length of time and the store planogram 2604, purchased items 2606 differentiated by category in the category classification module 208 can represent buying actions 2610 and can be aggregated onto a map through map generation 2622 or into quantitative measurements 2624 to represent buying action distributions 2600.

Layered Map Generation

While maps may be generated as individual visual representations of traffic, shopping, and buying action distributions, a map can also be generated to compare traffic 2000, shopping 2300, and buying action 2600 distributions or layered distributions 2900. Layers representing the aggregation of traffic, shopping, and buying actions for a predetermined period of time are overlaid a map of the store layout. Because it is possible to measure traffic 2000, shopping action 2300, and buying action 2600 distributions in this configuration, layered distribution 2900 is possible to calculate on the store- and category-levels using a method identical to the one described in FIG. 29.

Conversion Calculation

In the present configuration, conversion 3000 or the share of traffic converted to shoppers and the share of shoppers converted to buyers can be calculated using the method described in FIG. 30. The conversion ratios can be calculated on the store-level 3012 or the category-level 3012 using the traffic 2000, shopping action 2300, and buying action 2600 distributions already measured by the invention in the configuration.

Category Dynamics Analysis

The category-specific shopping metrics 1824 comprise dominant path 3100, category correlation 3400, and category sequence 3600 measurements. In this configuration, all category-specific shopping metrics 1824 are calculated using vision-generated TripVector 1810 information.

Dominant Path

Dominant path 3100 measurement calculates the most frequent category destination of shoppers leaving a particular category of interest. Given the full vision-sensing capability in this configuration, dominant path 3100 measurement is possible for any category in the store and uses the same methods as described in FIG. 31-33.

Category Correlation

Category correlation 3400 can be calculated using vision-generated TripVector 1810 information. In the present configuration, since vision-tracking is possible throughout the store, category correlation 3400 can be measured for all categories. Category correlation 3400 can be derived from a trained HMM model as described in FIG. 34 and can be represented in terms of quantitative measurements using the same method described in FIG. 35.

Category Sequence

Category sequence 3600 can be calculated using vision-generated TripVector 1810 information. In the present configuration, since vision-tracking is possible throughout the store, category sequence 3600 can be measured for all categories. Category sequence 3600 can be derived from a trained HMM model as described in FIG. 36 and can be represented in terms of quantitative measurements using the same method described in FIG. 37-38.

Filtering and Segmentation

FIG. 45 shows an exemplary embodiment of the filtering and segmentation method for this configuration. In this configuration, partial filtering and segmentation 4510 are possible. In cases where both mobile-signal based 220 and vision-based 210 tracking is possible, the shopper trajectories and the resulting TripVector 1810 information is uniquely identified by the MAC address. Because Wi-Fi based tracking 220 is possible only in areas of interest, it is only possible to segment or filter trajectories used for category-level shopping behavior analysis for areas where mobile-signal based tracking 220 is possible.

Partial Video and Partial Mobile Configuration

Figure 47:
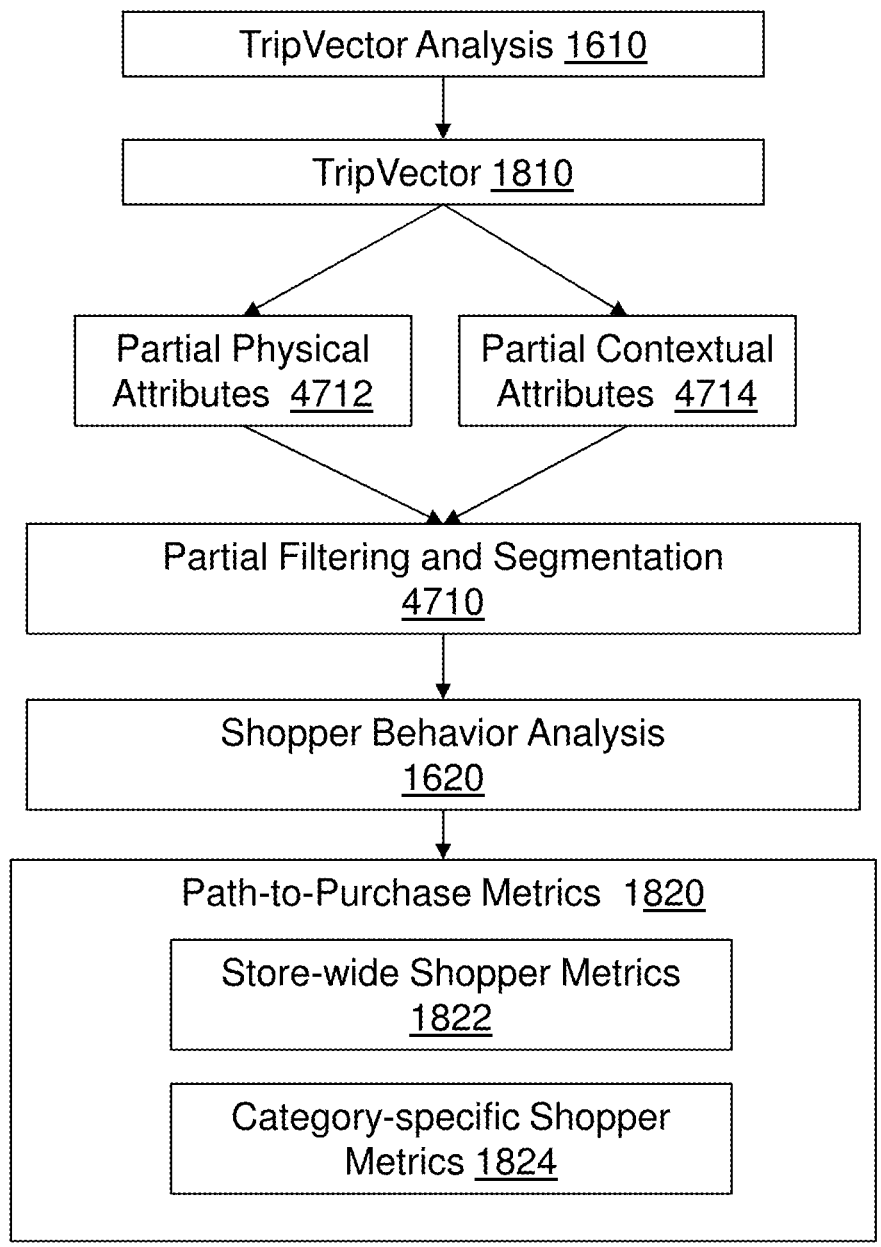
FIG. 47 shows an exemplary method for shopper behavior analysis in a partial mobile and partial video sensor coverage configuration.

FIG. 47 describes an exemplary overview of the shopper behavior analytics process for a configuration where there is partial mobile and video coverage.

TripVector

In this configuration, vision- and Wi-Fi sensors are deployed in overlapping areas of interest including entrance, exit, checkout, and categories of interest. Vision 210 and mobile-signal based 220 tracking occurs in areas of interest where sensors are deployed. The resulting vision trajectories and partial Wi-Fi signals cannot be associated into a fused trajectory. However, as mentioned previously the unique identification, or the MAC address, can be detected in areas of interest and associated with the visual tracks of the corresponding shopper using the method described in FIG. 2.

TripVector 1810 information is generated from the tracking including partial physical 4712 and partial contextual 4714 attributes. The TripVector 1810 information is only available in those areas of interest and not throughout the store due to the partial deployment of Wi-Fi and vision-sensors. Therefore, store-wide metric calculation is not possible except for buying action distributions and traffic counts at entrance and exits. However, partial path-to-purchase metrics 4810 can be calculated for the categories of interest where tracking is possible.

Path-to-Purchase Analysis

Figure 48:
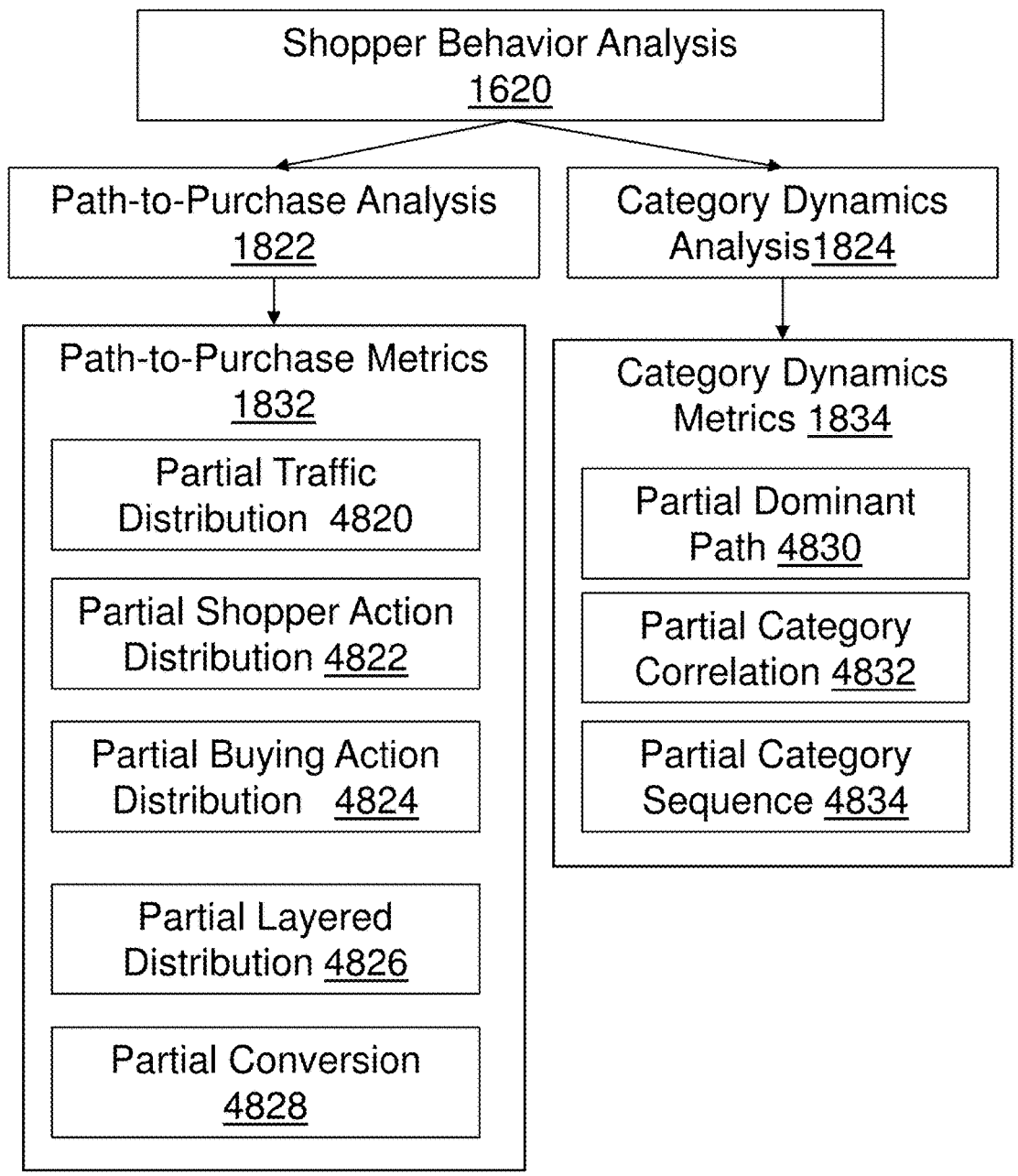
FIG. 48 shows a preferred method for calculating shopper behavior metrics in a partial mobile and partial video sensor coverage configuration.

FIG. 48 describes the behavior analytics applications overview and the possible path-to-purchase metrics 1820 in the present configuration.

Traffic Distribution

Partial traffic distribution 4820 can be measured in categories of interest where Wi-Fi or vision sensors are deployed. The TripVector 1810 information derived from the vision trajectories include physical locations and associated timestamps. The trajectories and the generated TripVector 1810 information are aggregated and placed on a store or category layout similar to the map generation method found in FIG. 21 or the measurements are aggregated into a set of quantitative measurements similar to the method found in FIG. 22. Partial traffic distribution 4820 can be mapped onto a store layout to capture traffic distribution across the multiple areas of interest, but it should be noted that areas where sensors are not deployed will not have traffic distributions mapped onto them. The generated map should reflect the lack of sensors in those areas for clarification purposes. Partial traffic distribution 4820 in particular areas of interest can then be analyzed for further insight into traffic flow and its impact on store plan optimization and marketing efforts.

Shopping Action Distribution

Partial shopping action distribution measurement 4822 requires the collection of vision-generated TripVector 1810 information comprising partial contextual attributes 4714 as seen in FIG. 47. The partial contextual attributes 4714 which comprise shopping activity is defined and filtered according to predefined specifications as described in FIG. 23. Because vision-tracking 210 is possible in areas of interest, it is possible to calculate shopping action distributions in said areas of interest.

Partial shopping action distributions 4822 can be visually presented in a map format as described in the FIG. 24. In this configuration, there could be multiple areas of interest covered by vision sensors. Shopping actions can be mapped onto a store layout to capture shopping action distribution across the multiple areas of interest, but it should be noted that areas where vision sensors are not deployed will not have shopping actions mapped onto them. The generated map should reflect the lack of vision sensors in those areas for clarification purposes. Shopping action distributions 4822 can also be mapped onto a category layout for a category of interest where vision sensors are deployed.

Partial shopping action distributions 4822 can be calculated in the form of quantitative measurements using the same method detailed in FIG. 25. Quantitative measurements 2324 include shopping count by category and sub-category or ratios of category shopping counts, sub-category counts, etc. Quantitative measurements 2324 on the category-level 2314 can only be calculated for categories where vision-sensing is possible.

Buying Action Distribution

In this configuration, it is possible to measure buying action distribution using the same method found in the partial mobile/full vision configuration. Purchased items found in the transaction data can represent buying actions. Using the store planogram and the transaction data, it is possible to map purchased items by category on the store layout. Purchased items can also be mapped by sub-category onto a category layout.

The present invention can also calculate quantitative measurements for buying action distributions using the purchased items using the same method found in the partial mobile/full vision configuration. Quantitative measurements include total buying count, buying count by category and buying count by sub-category.

Layered Map Generation

While maps may be generated as individual visual representations of traffic, shopping, and buying action distributions, a map can also be generated to compare partial traffic 4820, shopping action 4822, and buying action 4824 distributions. Partial layered distribution 4826 representing the aggregation of traffic, shopping, and buying actions for a predetermined period of time are overlaid a map of the store layout. Because it is possible to measure partial traffic 4820, shopping action 4822, and buying action 4824 distributions in areas of interest in this configuration, layered map generation is possible only for maps of those particular areas of interest.

Conversion Calculation

In the present configuration, the share of traffic converted to shoppers and the share of shoppers converted to buyers can be calculated for areas or categories where sensors are deployed in the partial conversion module 4828. The method for calculating conversion is the same method as detailed in FIG. 30.

Category Dynamics Analysis

Category-specific metrics 1824 comprise dominant path 3100, category correlation 3400, and category sequence 3600 measurements. In this configuration it is possible to calculate partial category-specific shopper metrics 4814 measurements only in areas where sensors are deployed. The methods for calculating partial dominant path 4830, category correlation 4832, and category sequence 4834 measurements are the same as described in FIGS. 31, 34, and 36.

Dominant Path

Partial dominant path 4830 is measured using the TripVector 1810 information from either vision-based 210 or mobile signal-based tracking 220. In this configuration, vision sensors are deployed in specific areas of interest. In the areas of interest, it is possible to calculate the partial dominant path 4830 using methods detailed in FIG. 31.

Category Correlation

Partial category correlation 4832 can be calculated using either Wi-Fi based or vision-based TripVector 1810 information. In the present configuration, since tracking is possible in certain areas of interest, partial category correlation 4832 can be measured for categories of interest where Wi-Fi and/or vision sensors are deployed. Partial category sequence 4834 can be derived from a trained HMM model as described in the general overview or from detection of the MAC address in the categories of interest as detailed in FIG. 34.

Category Sequence

Partial category sequence 4834 can be calculated using either Wi-Fi based or vision-based TripVector 1810 information. In the present configuration, since tracking is possible in certain areas of interest, Partial category sequence 4834 can be measured for categories of interest where Wi-Fi and/or vision sensors are deployed. Partial category sequence 4834 can be derived from a trained HMM model as described in the general overview or from detection of the MAC address in the categories of interest as detailed in FIG. 36.

Filtering and Segmentation

Although trajectory association is not possible due to the limited sensing deployment, it is still possible to associate the MAC address with the visual tracks in the areas of interest where sensors are deployed. Therefore it is possible to segment or filter vision tracks used for category-level shopping behavior analysis for areas where mobile signal-based tracking 220 is possible in the partial filtering and segmentation 4710.

What is claimed is:

1. A method for automatically and unobtrusively analyzing in-store behavior of people visiting a physical space based on a fusion of a set of mobile signal- and vision-based person trajectories, an association of the set of mobile signal- and vision-based trajectories with a set of transaction data, and automatic recognition of a set of pre-defined shopping actions, using at least a computing machine, a set of mobile signal and vision sensors, and a set of computer vision and mobile signal processing algorithms, comprising:
   a. setting-up a plurality of types of vision and mobile signal sensors in an area of interest such as a retail store,
   b. tracking a plurality of persons individually using a set of cameras and a set of mobile signal sensors and a set of corresponding computer vision and mobile signal processing algorithms and yielding a set of vision-based trajectories and a set of mobile signal-based trajectories,
   c. fusing a mobile signal-based trajectory to a set of corresponding vision-based trajectories through a matching method and generating a fused trajectory for a person, further comprising:
      i. retrieving a pool of candidate vision-based trajectories from a database wherein the pool of candidate vision-based trajectories are generated in a similar time frame during which the mobile signal-based trajectory is generated,
      ii. identifying a set of vision-based trajectories among the pool of candidate vision-based trajectories by comparing the distance statistics of the set of vision-based trajectories to the mobile signal-based trajectory of the mobile-carrying person and comparing the motion dynamics of the set of vision-based trajectories and the mobile signal-based trajectory, which includes direction and speed,
      iii. integrating the set of vision-based trajectories to generate a fused trajectory and to account for a plurality of vision measurements for a same target at a same time instance,
      iv. interpolating the missing segments of the fused trajectory by excerpting the missing segments from the mobile signal-based trajectory stored in a database based on a set of point-to-point correspondence information between the set of vision-based trajectories and the mobile signal-based trajectory, and
      v. refining the fused trajectory by incorporating a store floor plan and a set of layout information that describes an occupancy map of a set of fixtures and other facilities or equipments where a set of shopper trajectories can not exist,
   d. associating a transaction data set among a pool of candidate transaction data to the fused trajectory based on a set of purchased items and the locations of said set of purchased items,
   e. extracting an intermediate shopper behavior representation, called a TripVector, from the fused trajectory and the transaction data set associated to said fused trajectory through detecting and recognizing a set of pre-defined shopping actions,
   f. generating a set of pre-defined shopper metric measurements and behavior analyses based on the TripVector, wherein the transaction data set includes a set of items purchased in a trip by a shopper.

2. The method according to claim 1, wherein said method further comprises a step of setting-up a plurality of types of vision and mobile-signal sensors in an area of interest, further comprising:
   a. deploying a plurality of cameras and a plurality of mobile signal sensors in the area of interest,
   b. calibrating a set of predetermined intrinsic and extrinsic camera calibration parameters using a set of camera calibration patterns,
   c. calibrating a set of mobile signal sensors by generating a mobile signal map for the area of interest,
      wherein said mobile signal map is a received signal strength-to-distance mapping or a radio fingerprint-to-location mapping,
      wherein a radio fingerprint is a vector of received signal strength values of a set of nearby access points for a specific location.

3. The method according to claim 1, wherein said method further comprises a step of tracking a plurality of persons using a set of cameras and a set of corresponding computer vision algorithms and yielding a set of vision-based trajectories, further comprising:
   a. capturing a set of images by one or more cameras,
   b. learning and building a background model,
   c. segmenting the foreground of a set of images using the background model,
   d. detecting a plurality of objects using an object detection algorithm,
   e. tracking the plurality of objects using a stochastic tracker,
   f. fusing one or more measurements of a same object from one or more cameras.

4. The method according to claim 1, wherein said method further comprises a step of tracking a set of persons using a set of mobile signal sensors and a set of corresponding mobile signal processing algorithms and yielding a set of mobile signal-based trajectories, further comprising:
   a. detecting a set of MAC addresses from a set of received packets,
   b. collecting a set of received signal strength values to distance measures and a set of timestamps of the set of received packets,
   c. converting the set of received signal strength values to distance measures based on a learned mobile signal map,
   d. detecting a measured location of a set of objects using a trilateration method,
   e. estimating a true location of the set of objects using a tracking method.

5. The method according to claim 1, wherein said method further comprises a step of tracking a set of persons using a set of mobile signal sensors and a set of corresponding mobile signal processing algorithms and yielding a set of mobile signal-based trajectories, further comprising:
   a. detecting a set of MAC addresses from a set of received packets,
   b. collecting a set of received signal strength values and a set of timestamps of said set of received packets,
   c. converting the set of received signal strength values into a set of distance measures based on a learned mobile signal map,
   d. comparing a set of generated radio fingerprints with a learned fingerprint-to-location mapping,
   e. detecting a measured location of a set of objects using a trilateration method,
   f. estimating a true location of the set of objects using a tracking method.

6. The method according to claim 1, wherein said method further comprises a step of fusing a mobile signal-based trajectory to a set of corresponding vision-based trajectories through a matching method and generating a fused trajectory for a mobile-carrying person,
   wherein the method includes a sensing configuration wherein sensing by a set of mobile signal sensors and cameras covers the entirety of a store.

7. The method according to claim 1, wherein said method further comprises a step of fusing a mobile signal-based trajectory to a set of corresponding vision-based trajectories through a matching method and generating a fused trajectory for a mobile-carrying person,
   wherein the method includes a sensing configuration wherein sensing by a set of mobile signal sensors covers the entirety of a store and sensing by a set of cameras partially covers the store.

8. The method according to claim 1, wherein said method further comprises a step of fusing a mobile signal-based trajectory to a set of corresponding vision-based trajectories through a matching method and generating a fused trajectory for a mobile-carrying person,
   wherein the method includes a sensing configuration wherein sensing by a set of mobile signal sensors partially covers a store and sensing by a set of cameras covers the entirety of a store.

9. The method according to claim 1, wherein said method further comprises a step of fusing a mobile signal-based trajectory to a set of corresponding vision-based trajectories through a matching method and generating a fused trajectory for a mobile-carrying person,
   wherein the method includes a sensing configuration wherein sensing by a set of mobile signal sensors and a set of cameras partially cover a store,
   whereby individual shopper-based tracking can be carried out for a set of areas of interest that are covered.

10. The method according to claim 1, wherein said method further comprises a step of associating a transaction data set among a pool of candidate transaction data to a fused trajectory based on a set of purchased items and the locations of said set of purchased items, further comprising:
   a. creating a pool of candidate transaction data wherein the pool of candidate transaction data occur in a timeframe when the person of the fused trajectory checked out,
   b. performing an initial matching between a set of transaction data among the pool of candidate transaction data and the fused trajectory by marking the locations of a set of purchased items in the set of transaction data on a store layout and laying down the fused trajectory on said store layout,
   c. estimating the purchase order of the set of purchased items based on a timestamp of a closest shopping fixation in the fused trajectory, wherein the shopping fixation refers to an event whereby a change in a behavior of a shopper occurs and a retail elements triggers said behavior of said shopper,
   d. generating a synthetic trajectory wherein said synthetic trajectory passes through the set of purchased items in the estimated purchase order,
   e. computing a dissimilarity measure between the synthetic trajectory and the fused trajectory while smoothing the synthetic trajectory with a set of different smoothing factors,
   f. finding a minimum dissimilarity measure in the scale space of the synthetic trajectory,
   g. finding a set of transaction data with the minimum dissimilarity measure in the scale space from the pool of candidate transaction data,
   h. associating the set of transaction data to the fused trajectory.

11. The method according to claim 10, wherein said method further comprises a step of computing a dissimilarity measure between a synthetic trajectory and a fused trajectory,
   wherein the computation of the dissimilarity measure uses a probabilistic framework,
   wherein the probabilistic framework estimates a likelihood that a person picks up a purchased item along the fused trajectory and a likelihood that a person picks up a set of purchased items along the fused trajectory.

12. The method according to claim 10, wherein said method further comprises a step of computing a dissimilarity measure between a synthetic trajectory and a fused trajectory,
   wherein the computation of the dissimilarity measure uses a geometric framework,
   wherein the geometric framework represents a likelihood that a person picks up a purchased item along the fused trajectory and a likelihood that a person picks up a set of purchased items along the fused trajectory.

13. The method according to claim 1, wherein said method further comprises a step of associating a transaction data set among a pool of candidate transaction data to the fused trajectory based on a set of purchased items and the locations of said set of purchased items,
   wherein the method includes a sensing configuration wherein sensing by a set of mobile signal sensors and a set of cameras covers the entirety of a store.

14. The method according to claim 1, wherein said method further comprises a step of associating a transaction data set among a pool of candidate transaction data to a fused trajectory based on a set of purchased items and the locations of said set of purchased items,
   wherein the method includes a sensing configuration wherein sensing by a set of mobile signal sensors covers the entirety of a store and sensing by a set of cameras partially covers the store,
   wherein a trajectory-transaction data association process comprises:
   a. laying down a fused trajectory on a store floor plan and marking a set of locations of a set of purchased items, b. associating each purchased item with a timestamp of a closest shopping fixation point in the fused trajectory,
c. creating a synthetic trajectory by connecting the set of locations of the set of purchased items in a time order,
d. computing a similarity measure between the fused trajectory and the synthetic trajectory in the scale space of the synthetic trajectory,
e. finding a minimum distance between the fused trajectory and the synthetic trajectory, wherein the minimum distance functions as a dissimilarity measure between each pair of the fused trajectory and the synthetic trajectory in the scale space of the synthetic trajectory,
f. performing the trajectory-transaction data association process for a set of candidate synthetic trajectories with a set of different smoothing factors,
g. finding a set of transaction data corresponding to the synthetic trajectory with a minimum dissimilarity with the fused trajectory.

15. The method according to claim 1, wherein said method further comprises a step of associating a transaction data set among a pool of candidate transaction data to the fused trajectory based on a set of purchased items and the locations of said set of purchased items,
wherein the method includes a sensing configuration wherein sensing by a set of mobile signal sensors partially covers a store and sensing by a set of cameras covers the entirety of the store,
wherein a trajectory-transaction data association process comprises:
a. constructing and storing a visual feature model of a shopper for each vision trajectory segment a set of associated timestamps and storing a MAC address of a device of a shopper and an associated timestamp,
b. creating the visual feature model of the shopper and collecting a list of the MAC addresses of mobile devices present around a checkout,
c. searching the visual feature model of the shopper through a set of visual feature models whereby the set of visual feature models are already created in a set of areas of interest,
d. finding a set of matched visual feature models in the checkout and the set of areas of interest,
e. listing a set of MAC addresses of a plurality of mobile devices detected in a set of similar time frames in the checkout and the set of areas of interest,
f. finding a single MAC address that appears in the checkout and the set of areas of interest or most of the set of areas of interest,
g. storing all MAC addresses that appear the checkout and the set of areas of interest or most of the set of areas of interest.

16. The method according to claim 1, wherein said method further comprises a step of associating a transaction data set among a pool of candidate transaction data to the fused trajectory based on a set of purchased items and the locations of said set of purchased items,
wherein the method includes a sensing configuration wherein sensing by a set of mobile signal sensors and a set of cameras partially cover a store.

17. The method according to claim 1, wherein said method further comprises a step of extracting a TripVector based on a trajectory of a person and a set of transaction data wherein the set of transaction data is associated with the trajectory, further comprising:
a. assigning a shopper identification to the TripVector,
b. extracting a set of pre-defined physical attributes of the person,
c. extracting a set of pre-defined contextual attributes of the person,
wherein the set of pre-defined physical attributes comprises a set of locations of the person, a set of associated timestamps, and a set of measurements comprising head orientation, gesture, and visual appearance,
wherein the set of pre-defined contextual attributes comprises visual attention of the person, physical approaching or contact to a product or a display, a set of pre-defined shopping actions comprising holding a product, comparing a plurality of different products, and purchasing a product.

18. The method according to claim 1, wherein said method further comprises a step of generating a set of pre-defined shopper metric measurements and behavior analyses based on a TripVector,
wherein the set of pre-defined shopper metric measurements and behavior analyses comprises a path-to-purchase analysis, a category dynamics analysis, a filtering-based shopper metric analysis and a segmentation-based shopper metric analysis,
wherein the path-to-purchase analysis comprises computing a traffic distribution, a shopping action distribution, and a buying action distribution, a layered map generation, and a conversion calculation,
wherein the category dynamics analysis comprises computing a dominant path, a category correlation, and a category sequence,
whereby the filtering-based shopper metric analysis and the segmentation-based shopper metric analysis comprises performing said analysis for a part of a population whereby the part of the population is filtered or segmented based on a pre-determined set of criteria.

19. The method according to claim 1, wherein said method further comprises a step of generating a set of pre-defined shopper metric measurements and behavior analyses based on a TripVector from a configuration wherein the configuration comprises sensing by a set of mobile signal sensors and cameras which covers the entirety of a store,
wherein the set of behavior analyses comprises a path-to-purchase analysis, a category dynamics analysis, a filtering-based shopper metric analysis and a segmentation-based shopper metric analysis,
wherein said method performs the path-to-purchase analysis, the category dynamics analysis, the filtering-based shopper metric analysis and the segmentation-based shopper metric analysis for a plurality of shopper trajectories throughout the entirety of a store.

20. The method according to claim 1, wherein said method further comprises a step of generating a set of pre-defined shopper metric measurements and behavior analyses based on a TripVector, from a configuration wherein the configuration comprises sensing by a set of mobile signal sensors which covers an entirety of a store and by a set of cameras which partially covers the store,
wherein the set of pre-defined shopper metric measurements and behavior analyses comprise a path-to-purchase analysis, a category dynamics analysis, a filtering-based shopper metric analysis and a segmentation-based shopper metric analysis,
wherein said method performs the path-to-purchase analysis, the category dynamics analysis, the filtering-based shopper metric analysis and the segmentation-based shopper metric analysis for a plurality of shopper trajectories throughout an entirety of a store, wherein the path-to-purchase analysis computes a traffic distribution and a buying action distribution for the entirety of the store and computes a partial shopping action distribution for a part of the store wherein the part of the store contains a set of cameras, wherein the path-to-purchase analysis computes a layered map generation and a conversion calculation which incorporates the traffic distribution and the buying action distribution for the entirety of the store and a partial shopping action distribution.

21. The method according to claim 1, wherein said method further comprises a step of generating a set of pre-defined shopper metric measurements and behavior analyses based on a TripVector, from a configuration wherein the configuration comprises sensing by a set of mobile signal sensors which partially covers a store and by a set of cameras which covers the entirety of the store, wherein the set of pre-defined shopper metric measurements and behavior analyses comprise a path-to-purchase analysis, a category dynamics analysis, a filtering-based shopper metric analysis and a segmentation-based shopper metric analysis, wherein said method performs the path-to-purchase analysis and the category dynamics analysis, throughout an entirety of a store, wherein said method performs the filtering-based shopper metric analysis and the segmentation-based shopper metric analysis for a plurality of shopper trajectories in a set of areas in the store wherein the set of areas contain a set of mobile signal sensors.

22. The method according to claim 1, wherein said method further comprises a step of generating a set of pre-defined shopper metric measurements and behavior analyses based on a TripVector, from a configuration wherein the configuration comprises sensing by a set of mobile signal sensors and the set of cameras which partially cover a store, wherein the set of behavior analyses comprises a path-to-purchase analysis, a category dynamics analysis, a filtering-based shopper metric analysis and a segmentation-based shopper metric analysis, wherein said method performs the path-to-purchase analysis, the category dynamics analysis, the filtering-based shopper metric analysis and the segmentation-based shopper metric analysis for a plurality of shopper trajectories in a set of areas in the store wherein the set of areas contain a set of mobile signal sensors and cameras.

23. An automatic and unobtrusive system that analyzes in-store behavior of a plurality of people visiting a physical space based on a fusion of a set of mobile signal- and vision-based person trajectories, an association of the set of mobile signal- and vision-based trajectories with a set of transaction data, and automatic recognition of a set of pre-defined shopping actions, using at least a computing machine, a set of mobile signal and vision sensors, and a set of computer vision and mobile signal processing algorithms, comprising:

a. a computer and a set of human operators that set-up a plurality of types of vision and mobile signal sensors in an area of interest such as a retail store, b. the computer that tracks a plurality of persons individually using a set of cameras and a set of mobile signal sensors and a set of corresponding computer vision and mobile signal processing algorithms and yielding a set of vision-based trajectories and a set of mobile signal-based trajectories, c. the computer that fuses a mobile signal-based trajectory to a set of corresponding vision-based trajectories through a matching method and generating a fused trajectory for a person, further comprising:

i. retrieving a pool of candidate vision-based trajectories from a database wherein the pool of candidate vision-based trajectories are generated in a similar time frame during which the mobile signal-based trajectory is generated, ii. identifying a set of vision-based trajectories among the pool of candidate vision-based trajectories by comparing the distance statistics of the set of vision-based trajectories to the mobile signal-based trajectory of the mobile-carrying person and comparing the motion dynamics of the set of vision-based trajectories and the mobile signal-based trajectory, which includes direction and speed, iii. integrating the set of vision-based trajectories to generate a fused trajectory and to account for a plurality of vision measurements for a same target at a same time instance, iv. interpolating the missing segments of the fused trajectory by excerpting the missing segments from the mobile signal-based trajectory stored in a database based on a set of point-to-point correspondence information between the set of vision-based trajectories and the mobile signal-based trajectory, and v. refining the fused trajectory by incorporating a store floor plan and a set of layout information that describes an occupancy map of a set of fixtures and other facilities or equipments where a set of shopper trajectories can not exist, d. the computer that associates a transaction data set among a pool of candidate transaction data to the fused trajectory based on a set of purchased items and the locations of said set of purchased items, e. the computer that extracts an intermediate shopper behavior representation, called a TripVector, from the fused trajectory and the transaction data set associated to said fused trajectory through detecting and recognizing a set of pre-defined shopping actions, f. the computer that generates a set of pre-defined shopper metric measurements and behavior analyses based on the TripVector, wherein a transaction data set includes a set of items purchased in a trip by a shopper.

24. The system according to claim 23, wherein said apparatus further comprises a computer and a set of human operators that set up a plurality of types of vision and mobile-signal sensors in an area of interest, further comprising:

a. a set of human operators who deploy a plurality of cameras and a plurality of mobile signal sensors in the area of interest, b. a computer that calibrates a set of predetermined intrinsic and extrinsic camera calibration parameters using a set of camera calibration patterns, c. a computer that calibrates a set of mobile signal sensors by generating a mobile signal map for the area of interest, wherein said mobile signal map is a received signal strength-to-distance mapping or a radio fingerprint-to-location mapping, wherein a radio fingerprint is a vector of received signal strength values of a set of nearby access points for a specific location.

25. The system according to claim 23, wherein said apparatus further comprises a computer that tracks a plurality of persons using a set of cameras and a set of corresponding computer vision algorithms, further comprising:
   a. a set of cameras that captures a set of images,
   b. a computer that learns and builds a background model,
   c. the computer that segments the foreground of a set of images using the background model,
   d. the computer that detects a plurality of objects using an object detection algorithm,
   e. the computer that tracks the plurality of objects using a stochastic tracker,
   f. the computer that fuses one or more measurements of a same object from one or more cameras.

26. The system according to claim 23, wherein said apparatus further comprises a computer that tracks a plurality of persons using a set of mobile signal sensors and a set of corresponding mobile signal processing algorithms, further comprising:
   a. a set of mobile signal sensors that detects a set of MAC addresses from a set of received packets,
   b. a computer that collects a set of received signal strength values to distance measures and a set of timestamps of the set of received packets,
   c. the computer that converts the set of received signal strength values to distance measures based on a learned mobile signal map,
   d. the computer that detects a measured location of a set of objects using a trilateration method,
   e. the computer that estimates a true location of the set of objects using a tracking method.

27. The system according to claim 23, wherein said apparatus further comprises a computer that tracks a set of persons using a set of mobile signal sensors and a set of corresponding mobile signal processing algorithms, further comprising:
   a. a set of mobile signal sensors that detects a set of MAC addresses from a set of received packets,
   b. a computer that collects a set of received signal strength values and a set of timestamps of the set of received packets,
   c. the computer that converts the set of received signal strength values into a set of distance measures based on a learned mobile signal map,
   d. the computer that compares a set of generated radio fingerprints with a learned fingerprint-to-location mapping,
   e. the computer that detects a measured location of a set of objects using a trilateration method,
   f. the computer that estimates a true location of the set of objects using a tracking method.

28. The system according to claim 23, wherein said apparatus further comprises a computer that fuses a mobile signal-based trajectory to a set of corresponding vision-based trajectories through a matching method and generating a fused trajectory for a person.

29. The system according to claim 23, wherein said apparatus further comprises a computer that fuses a mobile signal-based trajectory to a set of corresponding vision-based trajectories through a matching method and generating a fused trajectory for a person.

30. The system according to claim 23, wherein said apparatus further comprises a computer that fuses a mobile signal-based trajectory to a set of corresponding vision-based trajectories through a matching method and generating a fused trajectory for a person,
   wherein said computer carries out the method under a sensing configuration wherein sensing by a set of mobile signal sensors partially covers a store and sensing by a set of cameras covers the entirety of the store.

31. The system according to claim 23, wherein said apparatus further comprises a computer that fuses a mobile signal-based trajectory to a set of corresponding vision-based trajectories through a matching method and generating a fused trajectory for a person,
   wherein individual shopper-based tracking occurs for a set of covered areas of interest.

32. The system according to claim 23, wherein said apparatus further comprises a computer that associates a transaction data set among a pool of candidate transaction data to a fused trajectory based on a set of purchased items and the locations of said set of purchased items, further comprising:
   a. the computer that creates a pool of candidate transaction data wherein the pool of candidate transaction data occur in a time-frame when the person of the fused trajectory checked out,
   b. the computer that performs an initial matching between a set of transaction data among the pool of candidate transaction data and the fused trajectory by marking the locations of a set of purchased items in the set of transaction data on a store layout and laying down the fused trajectory on said store layout,
   c. the computer that estimates the purchase order of the set of purchased items based on a timestamp of a closest shopping fixation in the fused trajectory, wherein the shopping fixation refers to an event where a change in a behavior of a shopper occurs and a retail element triggers said behavior of said shopper,
   d. the computer that generates a synthetic trajectory wherein said synthetic trajectory passes through the set of purchased items in the estimated purchase order,
   e. the computer that computes a dissimilarity measure between the synthetic trajectory and the fused trajectory while smoothing the synthetic trajectory with a set of different smoothing factors,
   f. the computer that finds a minimum dissimilarity measure in the scale space of the synthetic trajectory,
   g. the computer that finds a set of transaction data with the minimum dissimilarity measure in the scale space from the pool of candidate transaction data,
   h. the computer that associates the set of transaction data to the fused trajectory.

33. The system according to claim 32, wherein said apparatus further comprises a computer that computes a dissimilarity measure between a synthetic trajectory and a fused trajectory,
   wherein the computation of the dissimilarity measure uses a probabilistic framework,
   wherein the probabilistic framework estimates a likelihood that a person picks up a purchased item along the fused trajectory and a likelihood that a person picks up a set of purchased items along the fused trajectory.

34. The system according to claim 32, wherein said apparatus further comprises a computer that computes a dissimilarity measure between a synthetic trajectory and a fused trajectory,
   wherein the computation of the dissimilarity measure uses a geometric framework, wherein the geometric framework represents a likelihood that a person picks up a purchased item along the fused trajectory and a likelihood that a person picks up a set of purchased items along the fused trajectory.

35. The system according to claim 23, wherein said apparatus further comprises a computer that associates a transaction data set among a pool of candidate transaction data to a fused trajectory based on a set of purchased items and the locations of said set of purchased items.

36. The apparatus system according to claim 23, wherein said apparatus further comprises a computer that associates a transaction data set among a pool of candidate transaction data to a fused trajectory based on a set of purchased items and the locations of said set of purchased items,
   wherein said computer carries out the method according to claim 1 under a sensing configuration wherein sensing by a set of mobile signal sensors covers the entirety of a store and sensing by a set of cameras partially covers the store,
   wherein said computer that carries out a trajectory-transaction data association process comprises:
      a. the computer that lays down a fused trajectory on a store floor plan and marking a set of locations of a set of purchased items,
      b. the computer that associates each purchased item with a timestamp of a closest shopping fixation point in the fused trajectory,
      c. the computer that creates a synthetic trajectory by connecting the set of locations of the set of purchased items in a time order,
      d. the computer that computes a similarity measure between the fused trajectory and the synthetic trajectory in the scale space of the synthetic trajectory,
      e. the computer that finds a minimum distance between the fused trajectory and the synthetic trajectory, wherein the minimum distance functions as a dissimilarity measure between each pair of the fused trajectory and the synthetic trajectory in the scale space of the synthetic trajectory,
      f. the computer that performs the trajectory-transaction data association process for a set of candidate synthetic trajectories with a set of different smoothing factors,
      g. the computer that finds a set of transaction data corresponding to the synthetic trajectory with a minimum dissimilarity with the fused trajectory.

37. The system according to claim 23, wherein said apparatus further comprises a computer that associates a transaction data set among a pool of candidate transaction data to a fused trajectory based on a set of purchased items and the locations of said set of purchased items,
   wherein said computer carries out the method according to claim 1 under a sensing configuration wherein sensing by a set of mobile signal sensors partially covers a store and sensing by a set of cameras covers the entirety of the store,
   wherein said computer that carries out a trajectory-transaction data association process comprises:
      a. the computer that constructs and stores a visual feature model of a shopper for each vision trajectory segment and a set of associated timestamps and storing a MAC address of a device of a shopper and an associated timestamp,
      b. the computer that creates the visual feature model of the shopper and collecting a list of the MAC addresses of a plurality of mobile devices present around a checkout,
      c. the computer that searches the visual feature model of the shopper through a set of visual feature models wherein the set of visual feature models are already created in a set of areas of interest,
      d. the computer that finds a set of matched visual feature models in the checkout and the set of areas of interest,
      e. the computer that lists a set of MAC addresses of a plurality of mobile devices detected in a set of similar time frames in the checkout and the set of areas of interest,
      f. the computer that finds a single MAC address that appears in the checkout and the set of areas of interest or most of the set of areas of interest,
      g. the computer that stores all MAC addresses that appear the checkout and the set of areas of interest or most of the set of areas of interest.

38. The system according to claim 23, wherein said apparatus further comprises a computer that associates a transaction data set among a pool of candidate transaction data to a fused trajectory based on a set of purchased items and the locations of said set of purchased items.

39. The system according to claim 23, wherein said apparatus further comprises a computer that extracts an intermediate shopper behavior representation, called a TripVector, from a fused trajectory and a transaction data set associated to said fused trajectory through detecting and recognizing a set of pre-defined shopping actions, further comprising:
   a. the computer that assigns a shopper identification to the TripVector,
   b. the computer that extracts a set of pre-defined physical attributes of the person,
   c. the computer that extracts a set of pre-defined contextual attributes of the person,
   wherein the set of pre-defined physical attributes includes a set of locations of the person, a set of associated timestamps, and a set of measurements comprising head orientation, gesture, and visual appearance,
   wherein the set of pre-defined contextual attributes comprises visual attention of the person, physical approaching or contact to a product or a display, a set of pre-defined shopping actions comprising holding a product, comparing different products, and purchasing a product.

40. The system according to claim 23, wherein said apparatus further comprises a computer that generates a set of pre-defined shopper metric measurements and behavior analyses based on a TripVector,
   wherein the set of pre-defined shopper metric measurements and behavior analyses comprises a path-to-purchase analysis, a category dynamics analysis, a filtering-based shopper metric analysis and a segmentation-based shopper metric analysis,
   wherein the path-to-purchase analysis comprises computing a traffic distribution, a shopping action distribution, and a buying action distribution, a layered map generation, and a conversion calculation,
   wherein the category dynamics analysis comprises computing a dominant path, a category correlation, and a category sequence,
   whereby the filtering-based shopper metric analysis and the segmentation-based shopper metric analysis comprises performing said analysis for a part of the population wherein the part of the population is filtered or segmented based on a pre-determined set of criteria.

41. The system according to claim 23, wherein said apparatus further comprises a step of generating a set of pre-defined shopper metric measurements and behavior analyses based on a TripVector,
- wherein said computer carries out said set of pre-defined shopper metric measurements and behavior analyses from a configuration wherein sensing by a set of mobile signal sensors and cameras covers the entirety of a store,
- wherein the set of behavior analyses comprises a path-to-purchase analysis, a category dynamics analysis, a filtering-based shopper metric analysis and a segmentation-based shopper metric analysis,
- wherein said computer performs the path-to-purchase analysis, the category dynamics analysis, the filtering-based shopper metric analysis and the segmentation-based shopper metric analysis for a plurality of shopper trajectories throughout an entirety of a store.

42. The system according to claim 23, wherein said apparatus further comprises a step of generating a set of pre-defined shopper metric measurements and behavior analyses based on a TripVector,
- wherein said computer carries out said set of pre-defined shopper metric measurements and behavior analyses from a configuration wherein sensing by a set of mobile signal sensors covers the entirety of a store and sensing by a set of cameras partially covers the store,
- wherein the set of pre-defined shopper metric measurements and behavior analyses comprise a path-to-purchase analysis, a category dynamics analysis, a filtering-based shopper metric analysis and a segmentation-based shopper metric analysis,
- wherein said computer performs the path-to-purchase analysis, the category dynamics analysis, the filtering-based shopper metric analysis and the segmentation-based shopper metric analysis for a plurality of shopper trajectories throughout an entirety of a store, wherein the path-to-purchase analysis computes a traffic distribution and a buying action distribution for the entirety of the store and computes a partial shopping action distribution for a part of the store wherein the part of the store contains a set of cameras,
- wherein the path-to-purchase analysis computes a layered map generation and a conversion calculation which incorporates the traffic distribution and the buying action distribution for the entirety of the store and a partial shopping action distribution.

43. The system according to claim 23, wherein said apparatus further comprises a step of generating a set of pre-defined shopper metric measurements and behavior analyses based on a TripVector,
- wherein said computer carries out said set of pre-defined shopper metric measurements and behavior analyses from a configuration wherein sensing by a set of mobile signal sensors partially covers a store and sensing by a set of cameras covers the entirety of the store,
- wherein the set of pre-defined shopper metric measurements and behavior analyses comprise a path-to-purchase analysis, a category dynamics analysis, a filtering-based shopper metric analysis and a segmentation-based shopper metric analysis,
- wherein said computer performs the path-to-purchase analysis and the category dynamics analysis, throughout the entirety of a store,
- wherein said computer performs the filtering-based shopper metric analysis and the segmentation-based shopper metric analysis for a plurality of shopper trajectories in a set of areas in the store wherein the set of areas contain a set of mobile signal sensors.

44. The system according to claim 23, wherein said apparatus further comprises a step of generating a set of pre-defined shopper metric measurements and behavior analyses based on a TripVector,
- wherein said computer carries out said set of pre-defined shopper metric measurements and behavior analyses from a configuration wherein sensing by a set of mobile signal sensors and the set of cameras partially cover a store,
- wherein the set of behavior analyses comprises a path-to-purchase analysis, a category dynamics analysis, a filtering-based shopper metric analysis and a segmentation-based shopper metric analysis,
- wherein said computer performs the path-to-purchase analysis, the category dynamics analysis, the filtering-based shopper metric analysis and the segmentation-based shopper metric analysis for a plurality of shopper trajectories in a set of areas in the store wherein the set of areas contain a set of mobile signal sensors and cameras.

* * * * *